United States Patent
Ozvat et al.

(10) Patent No.: US 12,112,332 B2
(45) Date of Patent: Oct. 8, 2024

(54) SYSTEMS AND METHODS FOR COST ALTERING PAYMENT SERVICES

(71) Applicant: Worldpay, LLC, Symmes Township, OH (US)

(72) Inventors: Matthew D. Ozvat, Durango, CO (US); John Berkley, Durango, CO (US); Kevin Oliver, Durango, CO (US); William T. Cooper, Henderson, CO (US); Charles E. Watts, Durango, CO (US); Rachel B. Cochran, Durango, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 17/515,224

(22) Filed: Oct. 29, 2021

(65) Prior Publication Data

US 2022/0058653 A1    Feb. 24, 2022

Related U.S. Application Data

(63) Continuation of application No. 16/418,581, filed on May 21, 2019, now Pat. No. 11,195,182, which is a (Continued)

(51) Int. Cl.
*G06Q 20/38* (2012.01)
*G06Q 20/20* (2012.01)
*G06Q 20/40* (2012.01)

(52) U.S. Cl.
CPC ......... *G06Q 20/4016* (2013.01); *G06Q 20/20* (2013.01)

(58) Field of Classification Search
CPC .................................................. G06Q 20/4016
(Continued)

(56) References Cited

U.S. PATENT DOCUMENTS

| 7,343,306 B1 | 3/2008 | Bates et al. |
| 7,747,475 B1 | 6/2010 | Bowman et al. |

(Continued)

*Primary Examiner* — Chinedu C Agwumezie
(74) *Attorney, Agent, or Firm* — Bookoff McAndrews, PLLC

(57) ABSTRACT

Cost altering payment services ("CAPS") system in association with a distributed enhanced payment ("DEP") processing system includes a merchant point of sale ("POS") terminal system and a remote enhanced payment management system ("EPMS"). The remote EPMS receives payment transactions including additional risk mitigating payment transaction ("RMPT") information and based on that additional RMPT information provides altered transaction costs. The remote EPMS provides facilities for the merchant to review and revise payment management services so as to utilize additional RMPT information received from the merchant POS terminal system so as to alter transaction costs. Such facilities provide information to determine the relative potential transaction cost benefits of various payment management service sets utilizing cost profiles that represent the costs of archival, recorded and projected future transactions. The remote EPMS provides "transaction guidance" technology to be utilized by the merchant's POS terminal system to facilitate prompting for and acquiring additional RMPT information.

20 Claims, 35 Drawing Sheets

Related U.S. Application Data continuation of application No. 14/135,555, filed on Dec. 19, 2013, now Pat. No. 10,346,843, which is a continuation-in-part of application No. 13/563,534, filed on Jul. 31, 2012, now Pat. No. 10,339,524.

(58) Field of Classification Search
USPC .......................................................... 705/44
See application file for complete search history.

(56) References Cited

U.S. PATENT DOCUMENTS

| | | |
|---|---|---|
| 7,979,347 B1 | 7/2011 | Greener et al. |
| 8,452,708 B1 | 5/2013 | Birenbaum et al. |
| 10,346,843 B2 | 7/2019 | Ozvat et al. |
| 2002/0138412 A1 | 9/2002 | Englert et al. |
| 2009/0070236 A1 | 3/2009 | Cohen et al. |
| 2009/0125435 A1 | 5/2009 | Cohen et al. |
| 2010/0131764 A1* | 5/2010 | Goh ................ H04L 9/321 |
| | | 713/171 |
| 2012/0041876 A1 | 2/2012 | Nosek et al. |
| 2012/0041881 A1* | 2/2012 | Basu ............ G06Q 20/3674 |
| | | 705/64 |
| 2012/0066044 A1* | 3/2012 | Honnef ........... G06Q 30/0601 |
| | | 705/26.1 |
| 2013/0282588 A1* | 10/2013 | Hruska ............. G06Q 20/40 |
| | | 705/67 |
| 2014/0129357 A1 | 5/2014 | Goodwin et al. |
| 2014/0129424 A1* | 5/2014 | Murphy ........... G06Q 30/0283 |
| | | 705/39 |
| 2014/0289125 A1* | 9/2014 | Killian .............. G06Q 20/204 |
| | | 705/44 |

\* cited by examiner

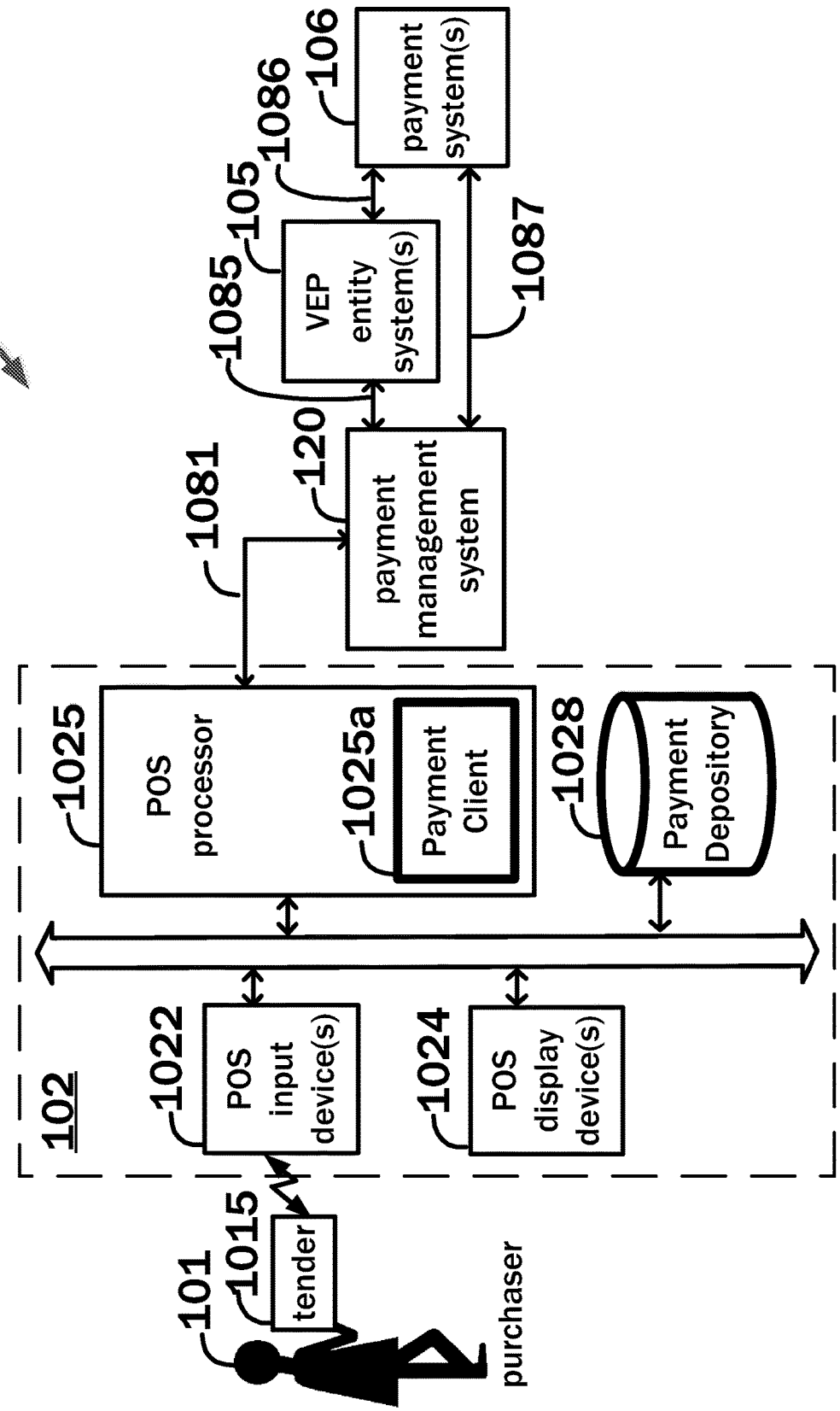

Figure 11 – Top Level Payment Process
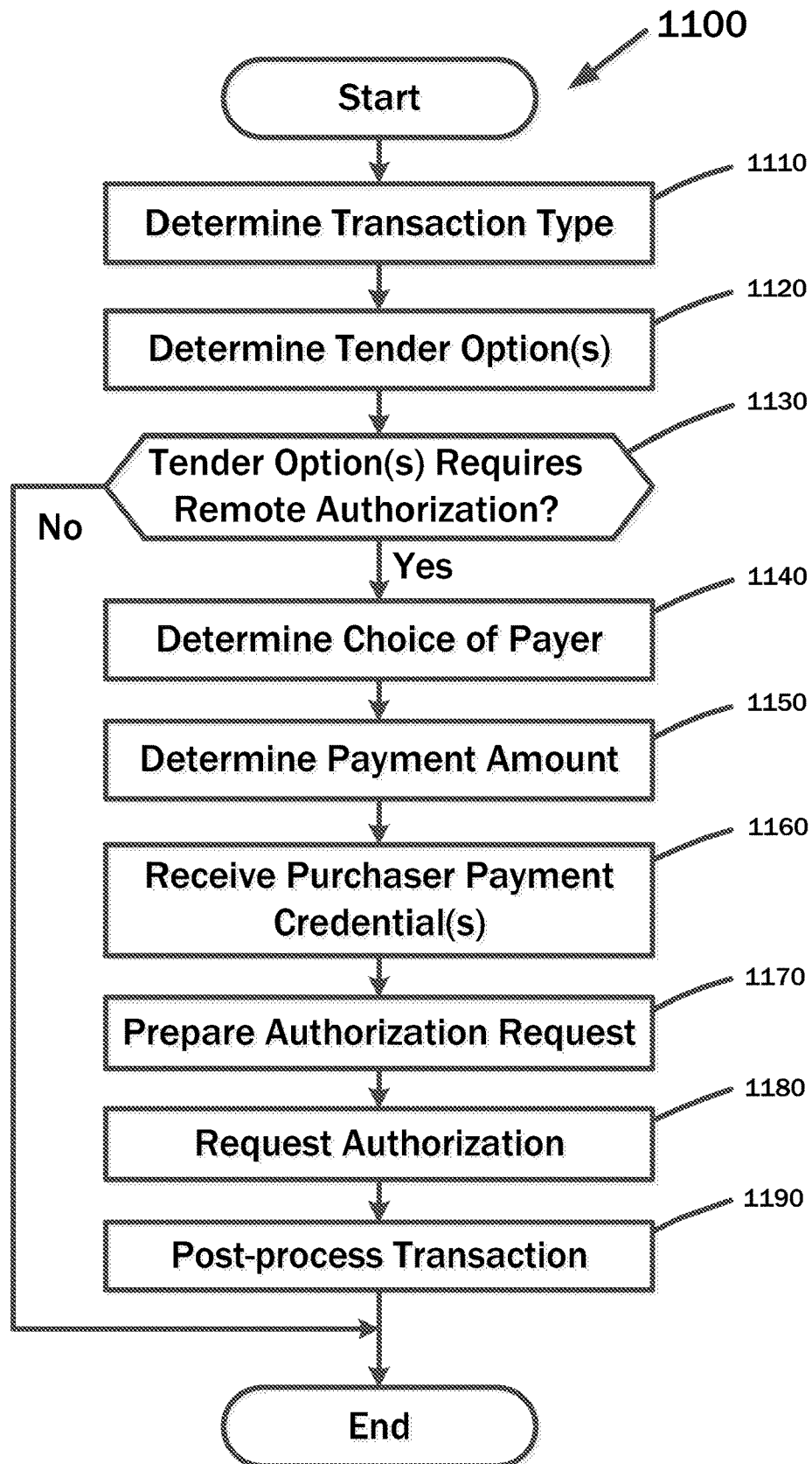

Figure 12 – Payer Choice Screen
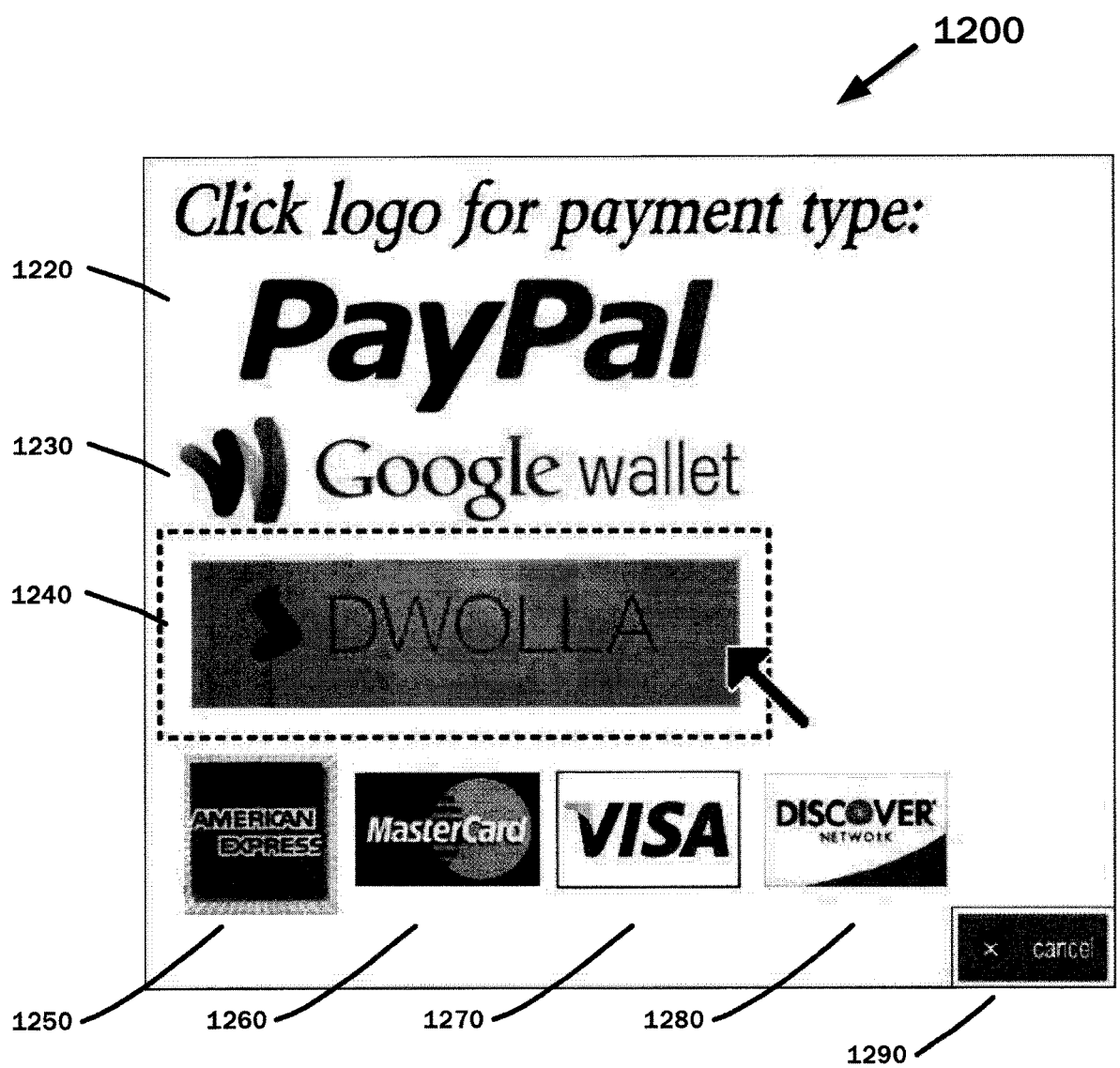

Figure 13 – POS Configuration Screen

1300

POS Configuration and Administration

☐ PayPal | User | Password
         | Signature |

☑ Google Checkout | User | Password
                  | Signature |

☑ MPS Credit | User | Password

☑ DWOLLA | User | Password
         | Signature |

☐ Loyalty | User | Password

☐ Gift | User | Password

[ Save ]

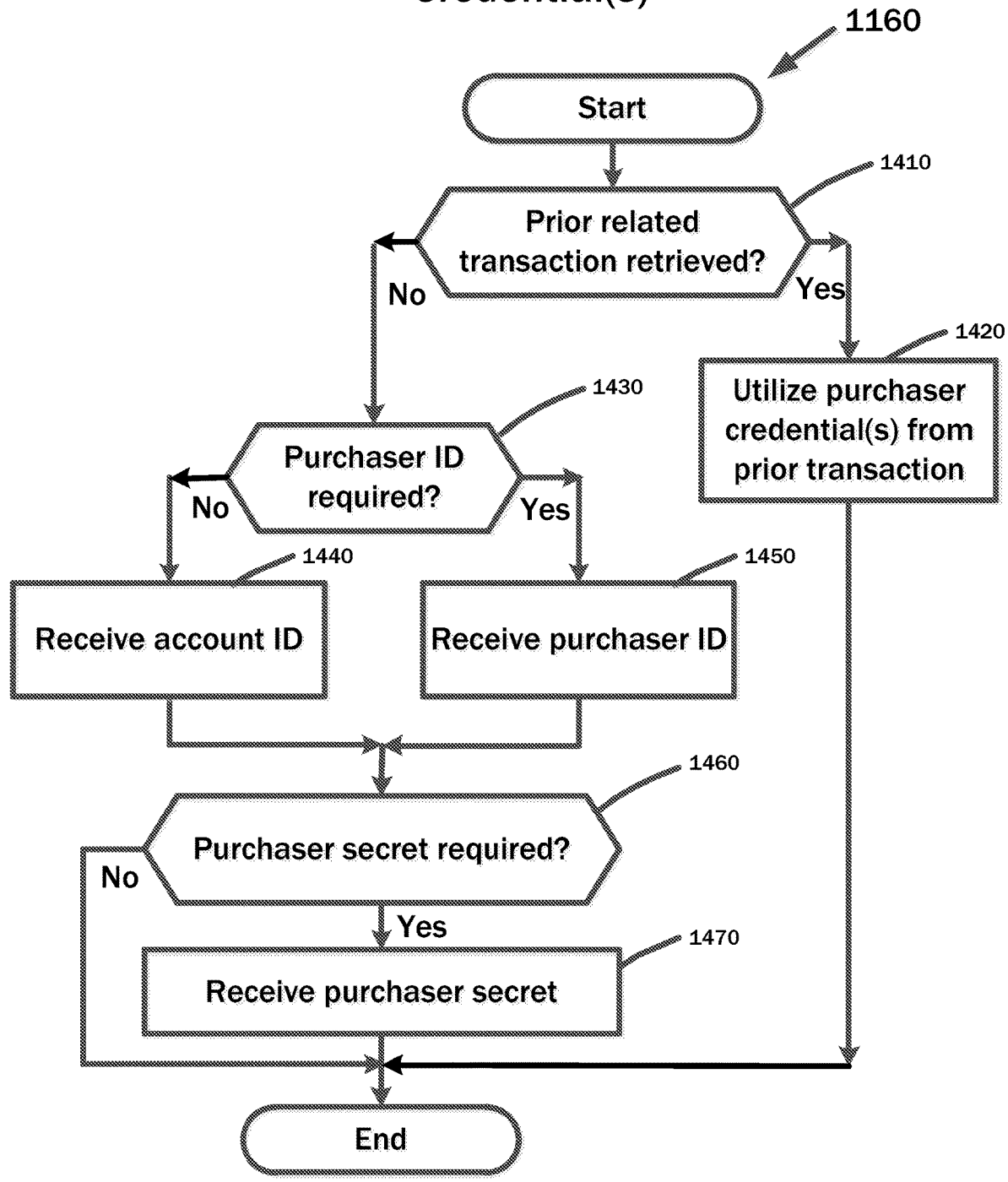

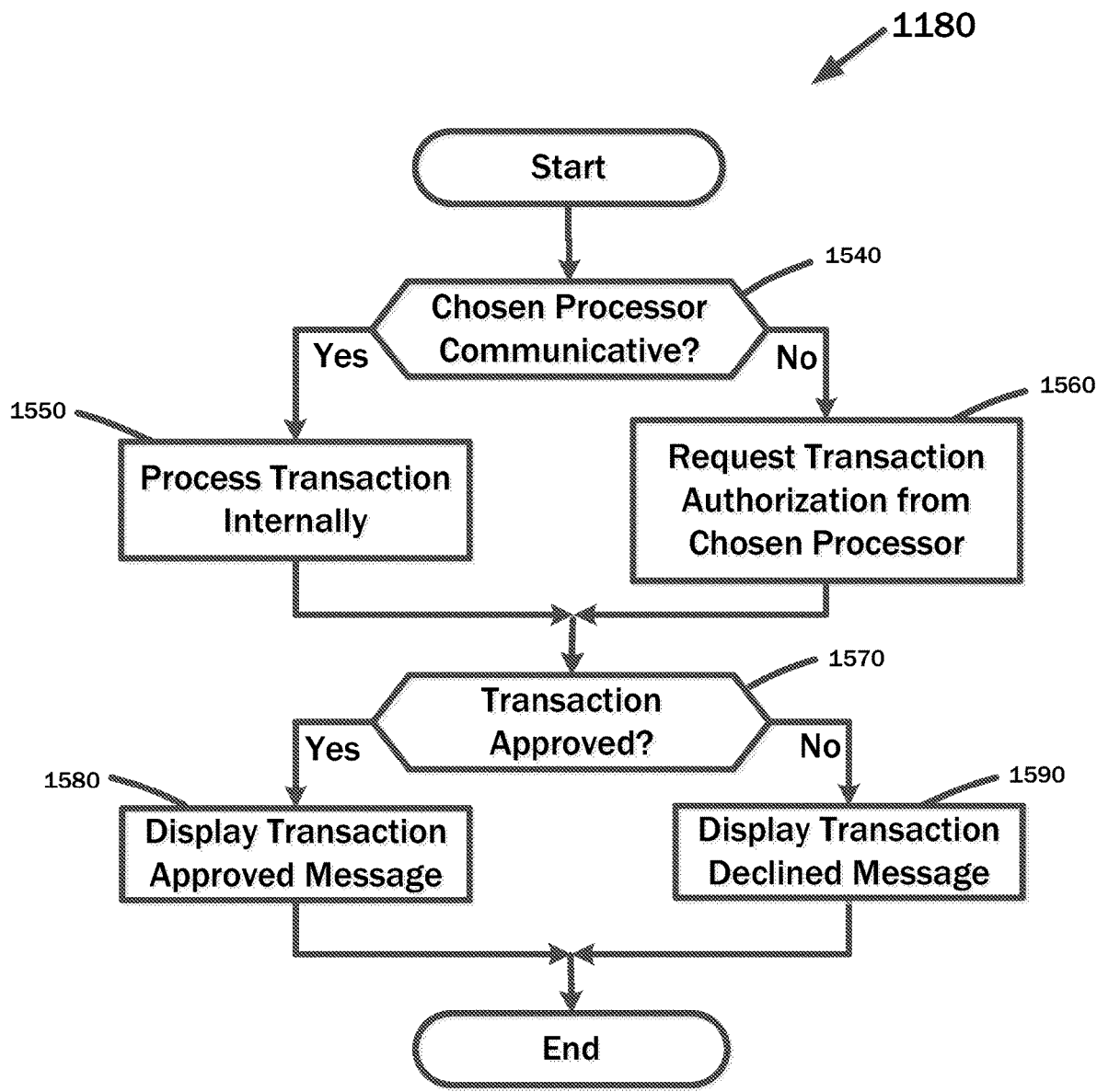

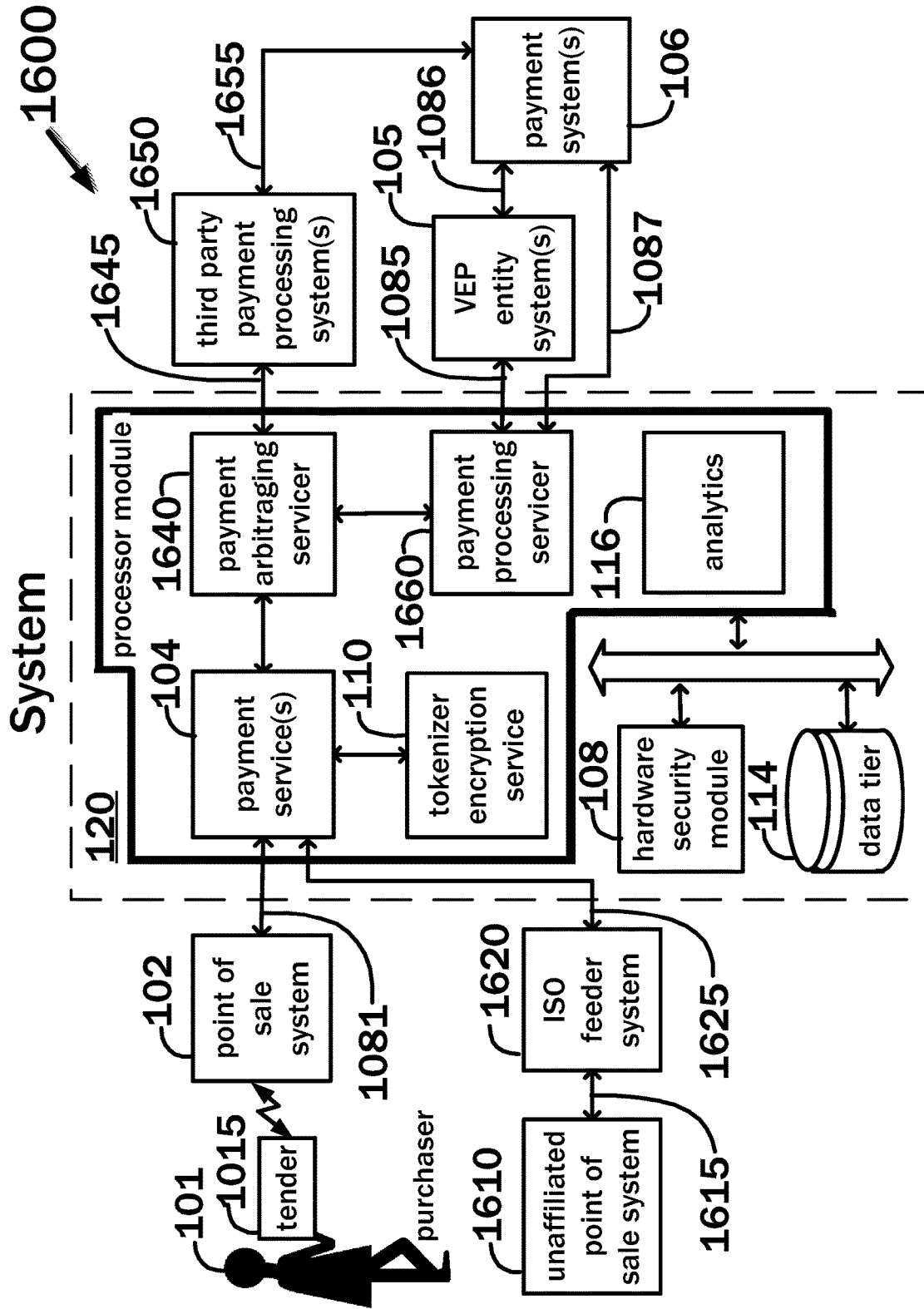
Figure 16 – Arbitraged Enhanced Payment Processing System

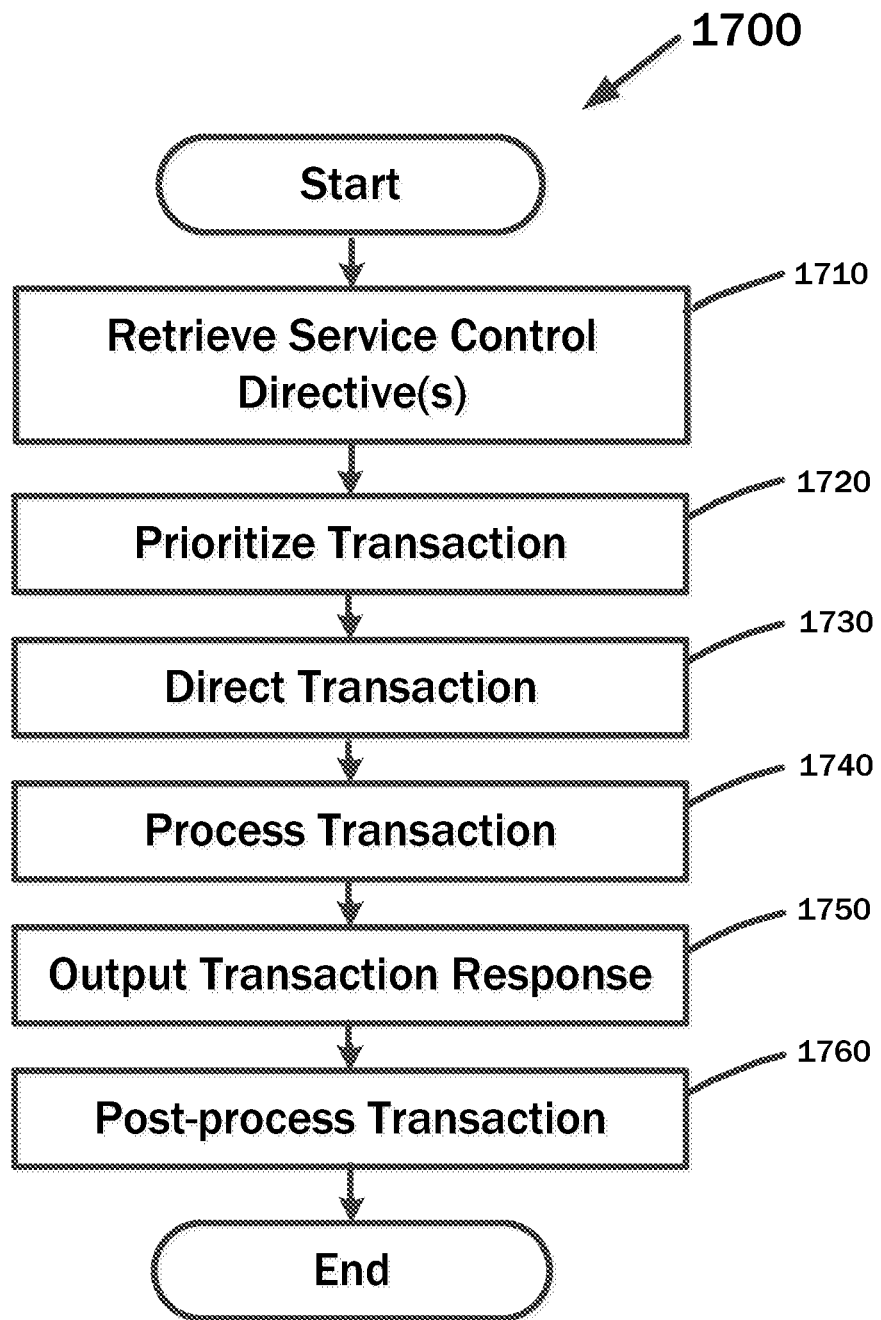
Figure 17 – Top Level Payment Arbitraging Process

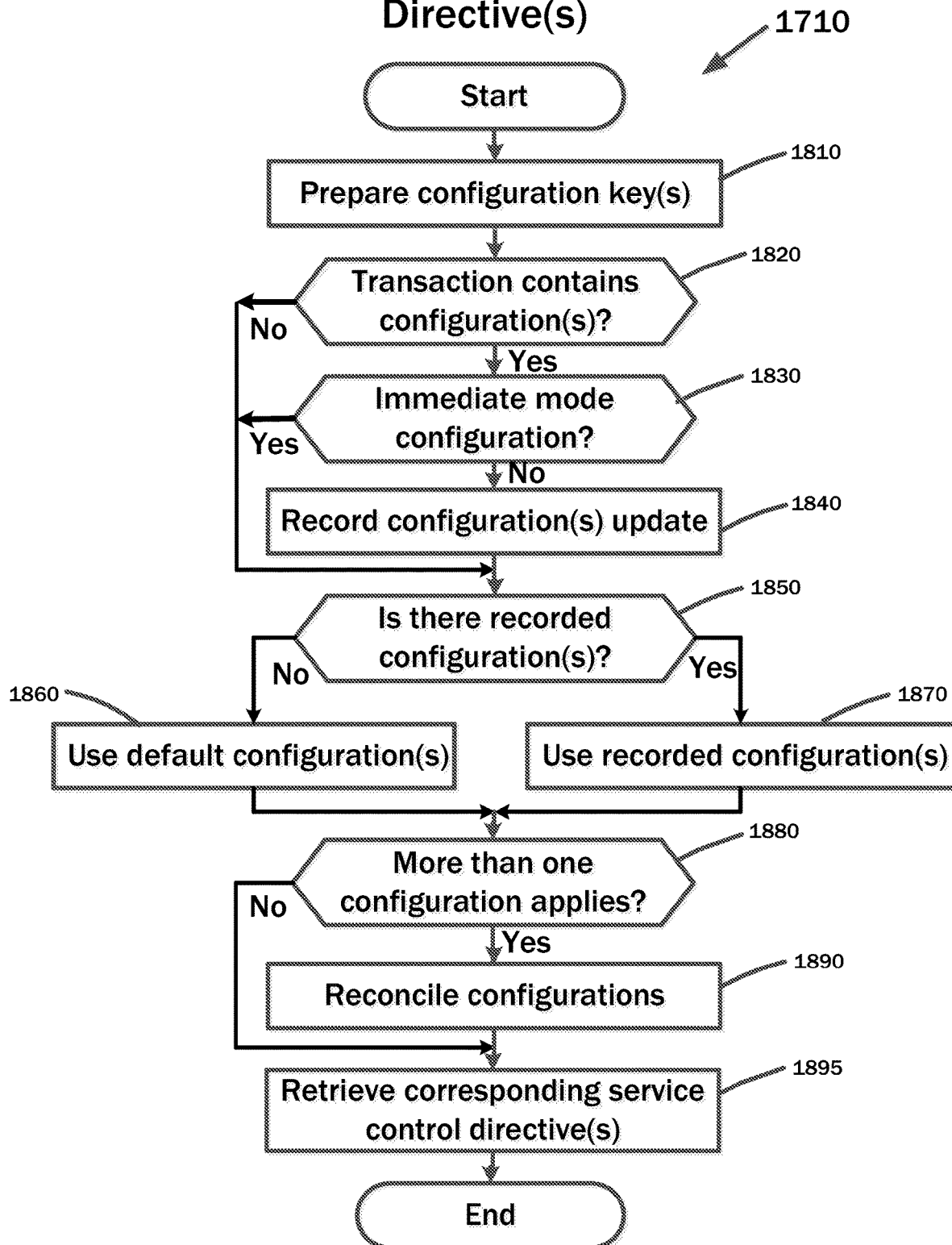

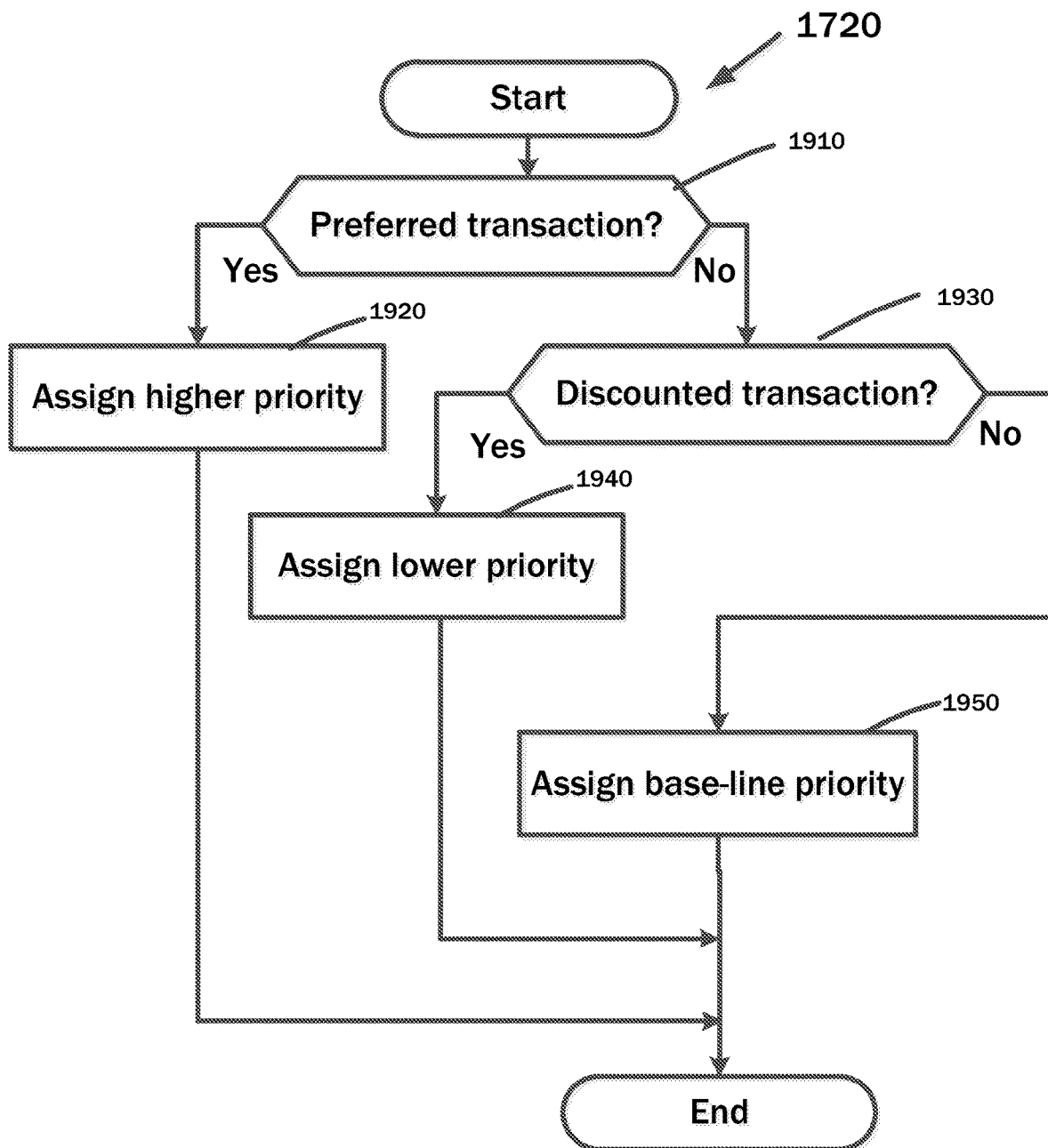

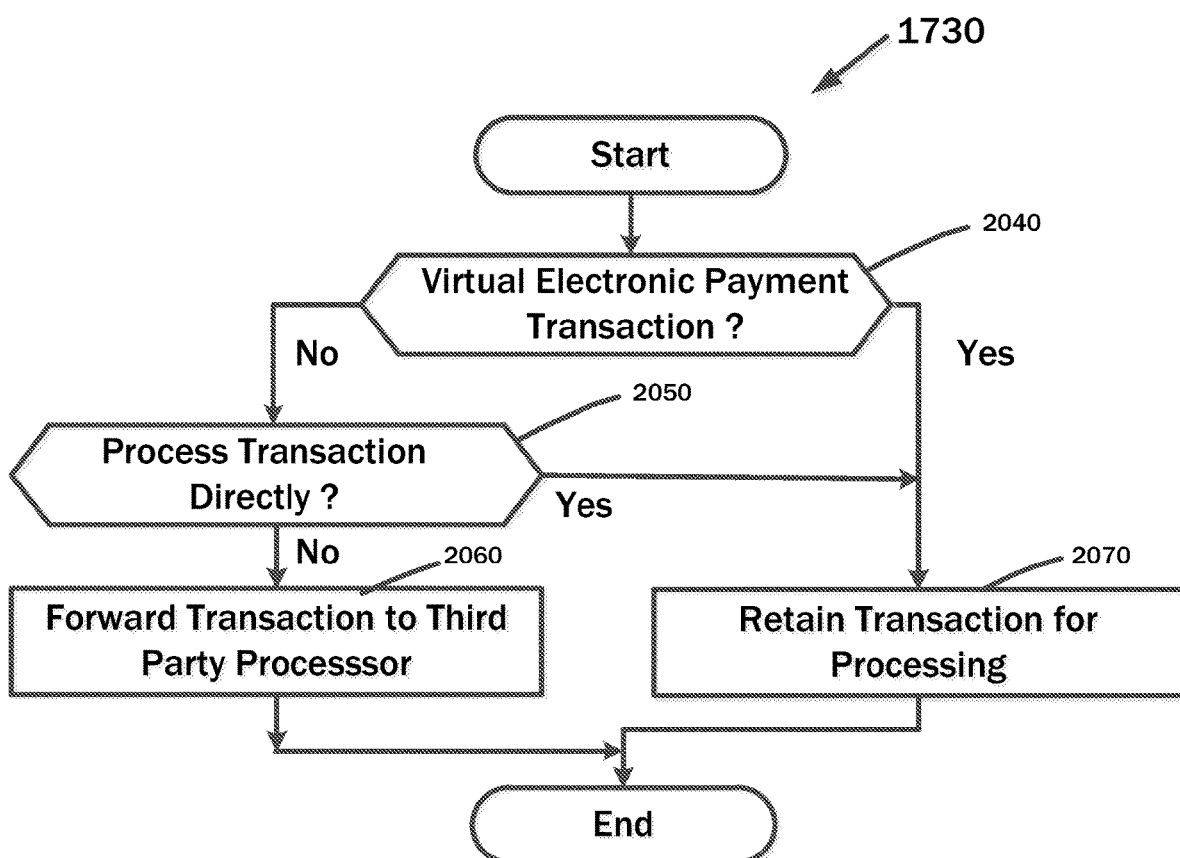
Figure 20 – Direct Transaction

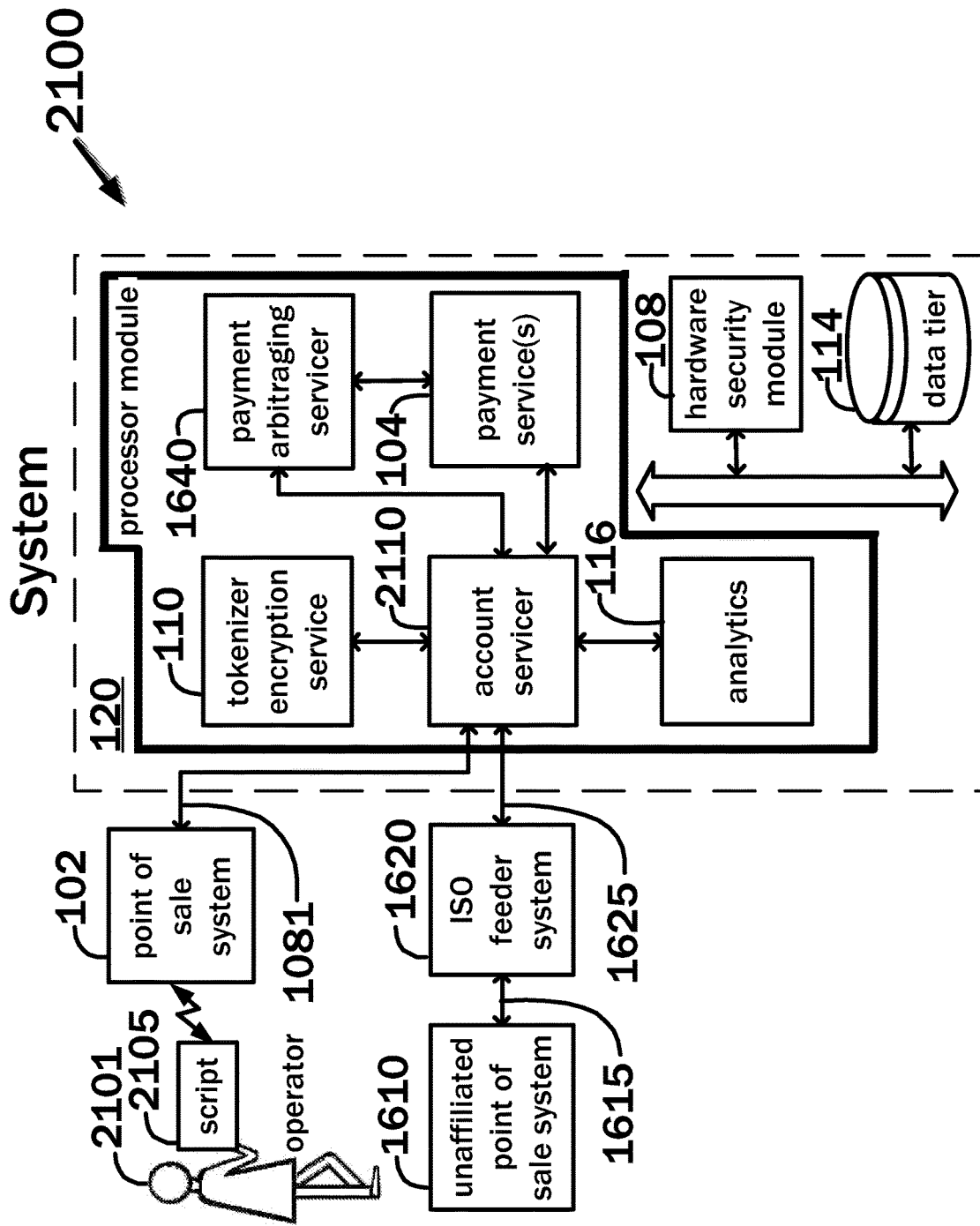
Figure 21 – Expedited Automated Merchant Boarding System

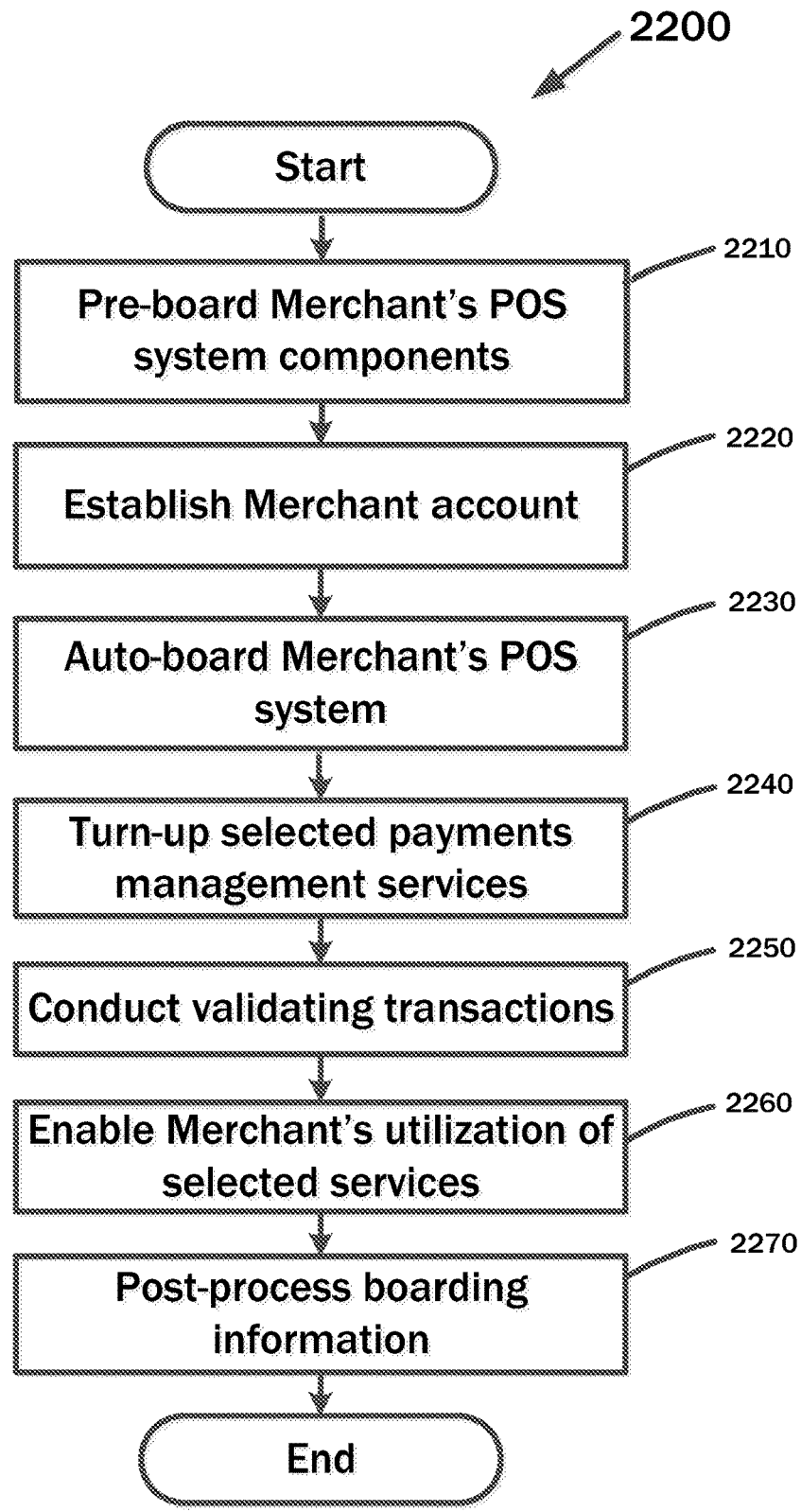

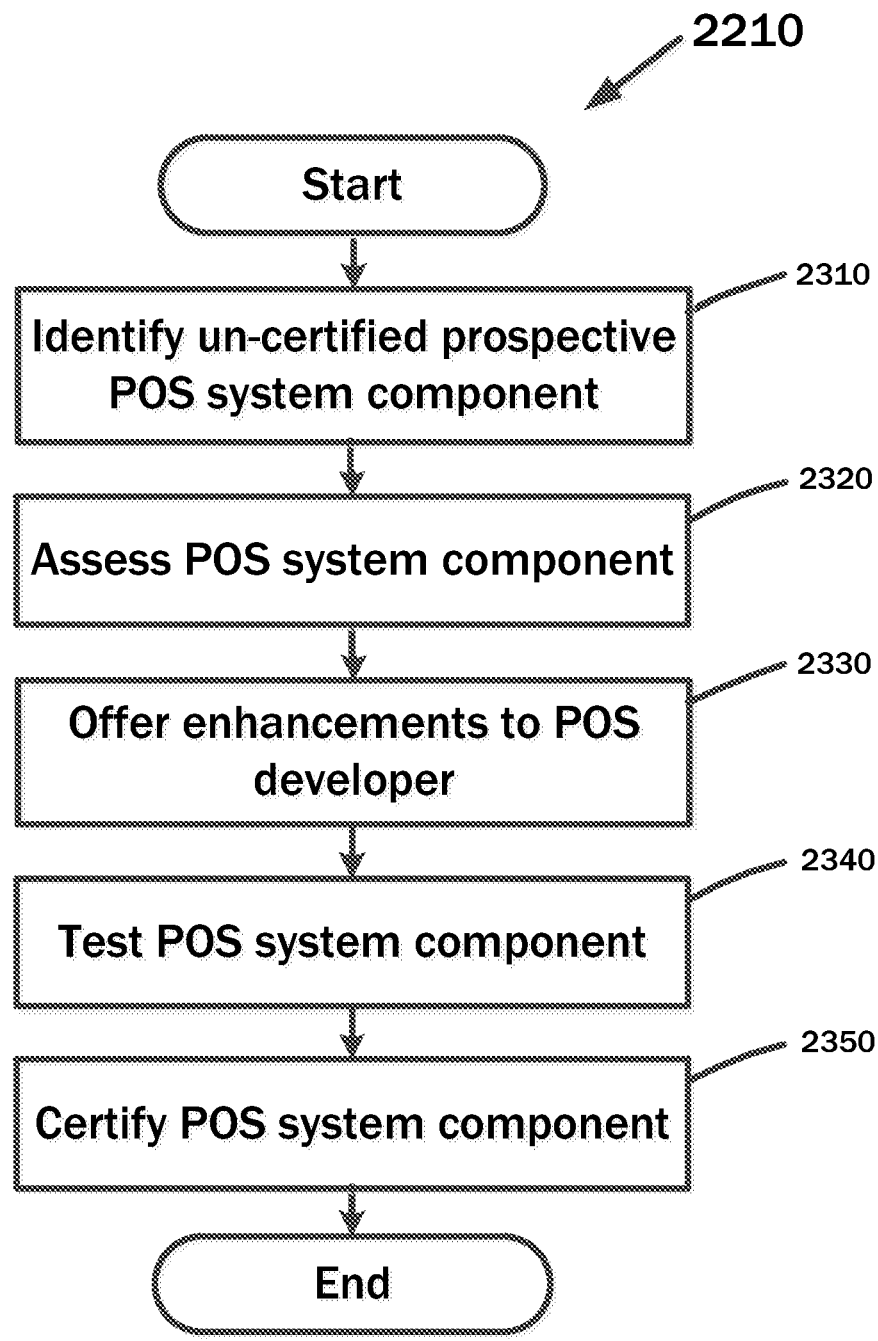
Figure 23 – Pre-board Merchant's POS System Components

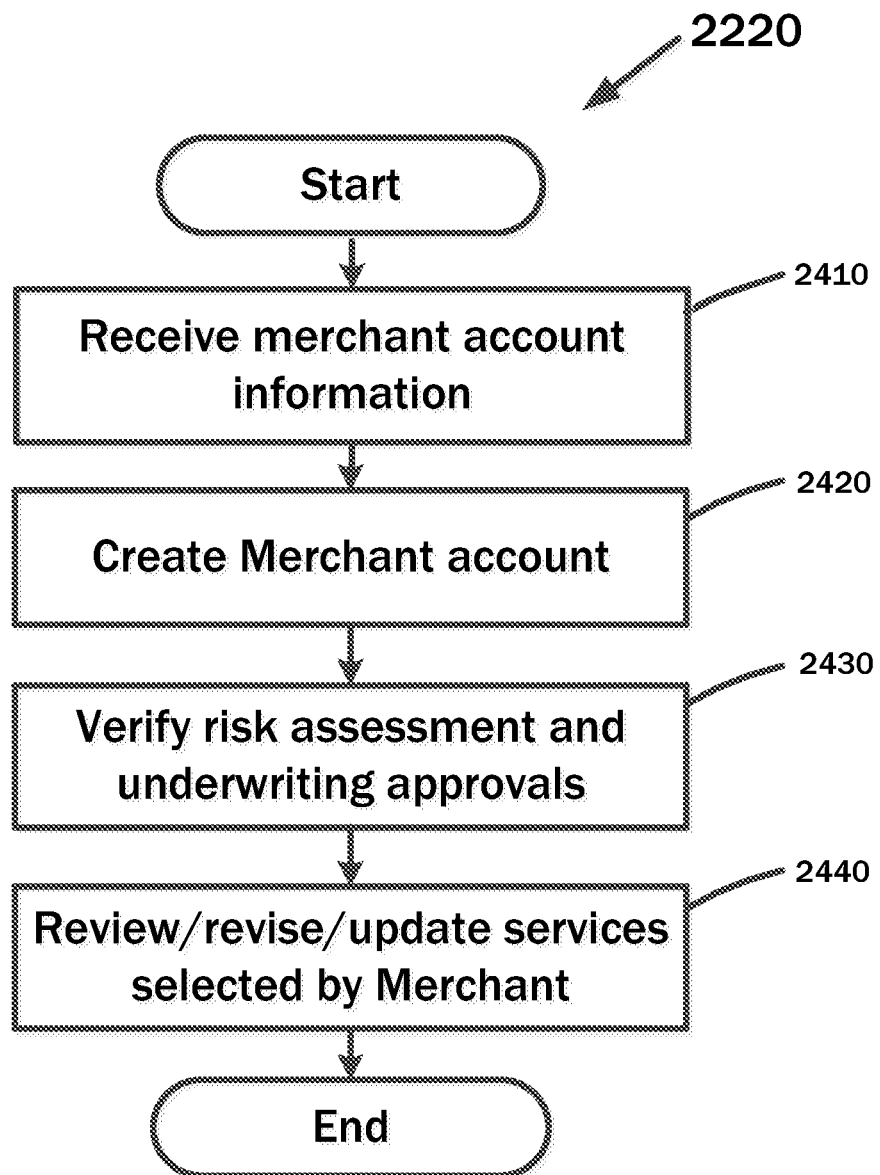

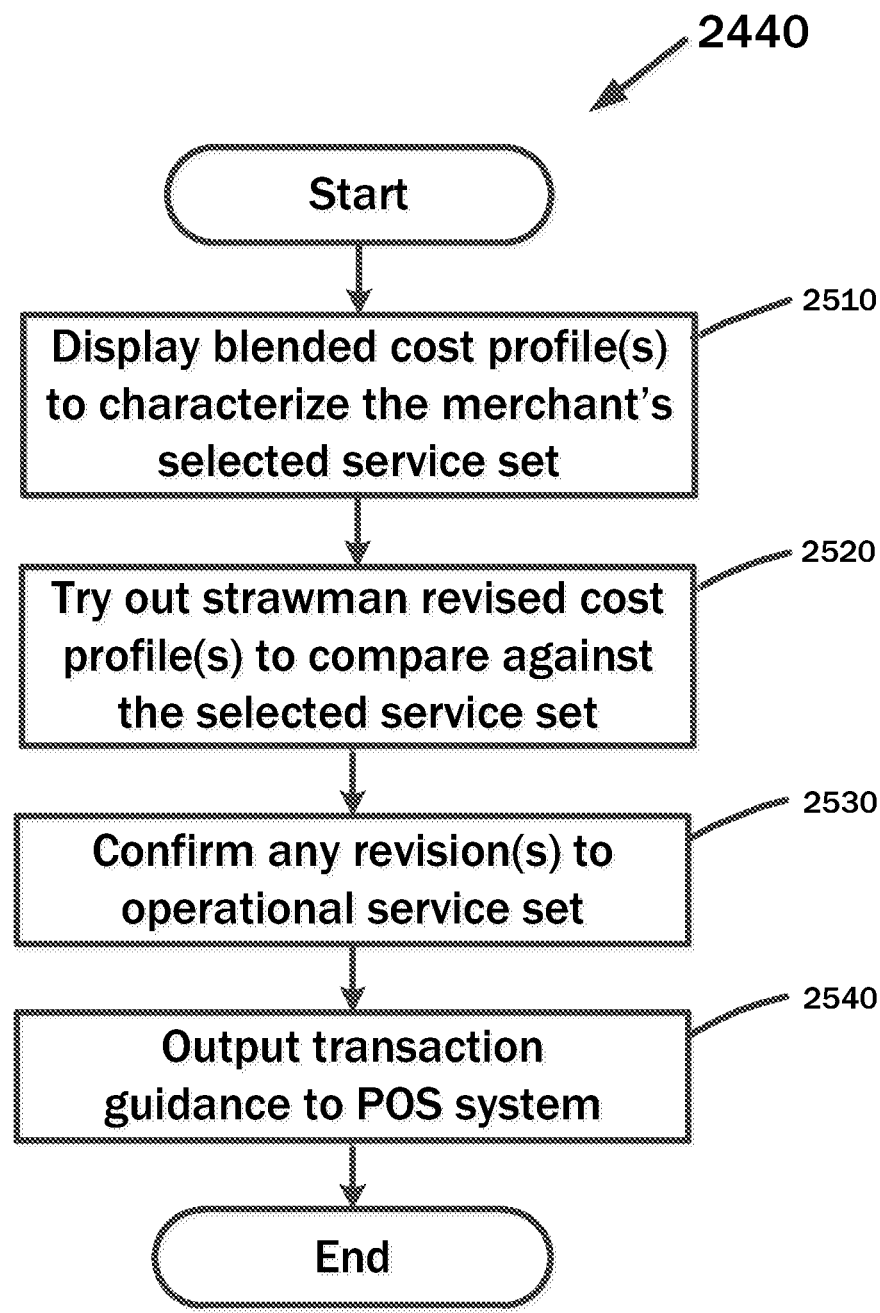

Figure 26a – Merchant Account Screen

Figure 26b – Merchant Account Screen

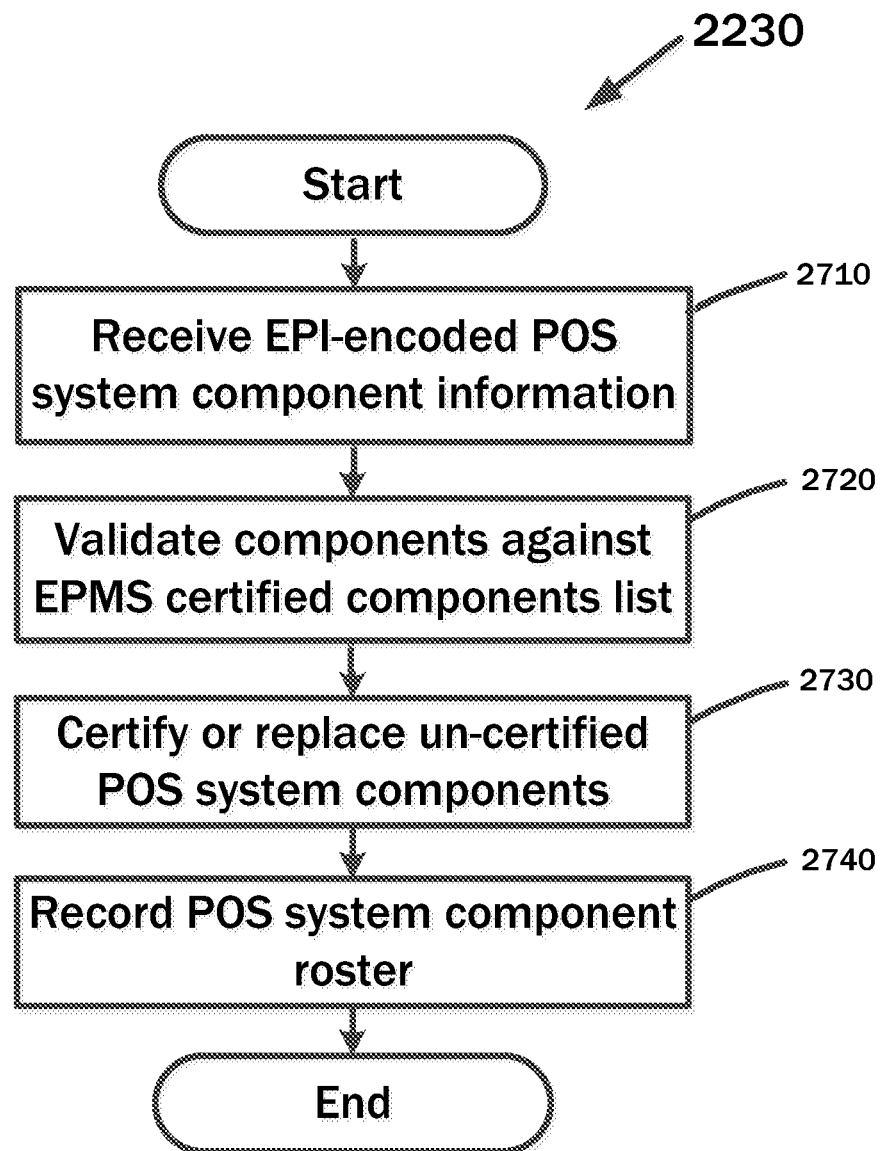
Figure 27 – Auto-board Merchant POS System

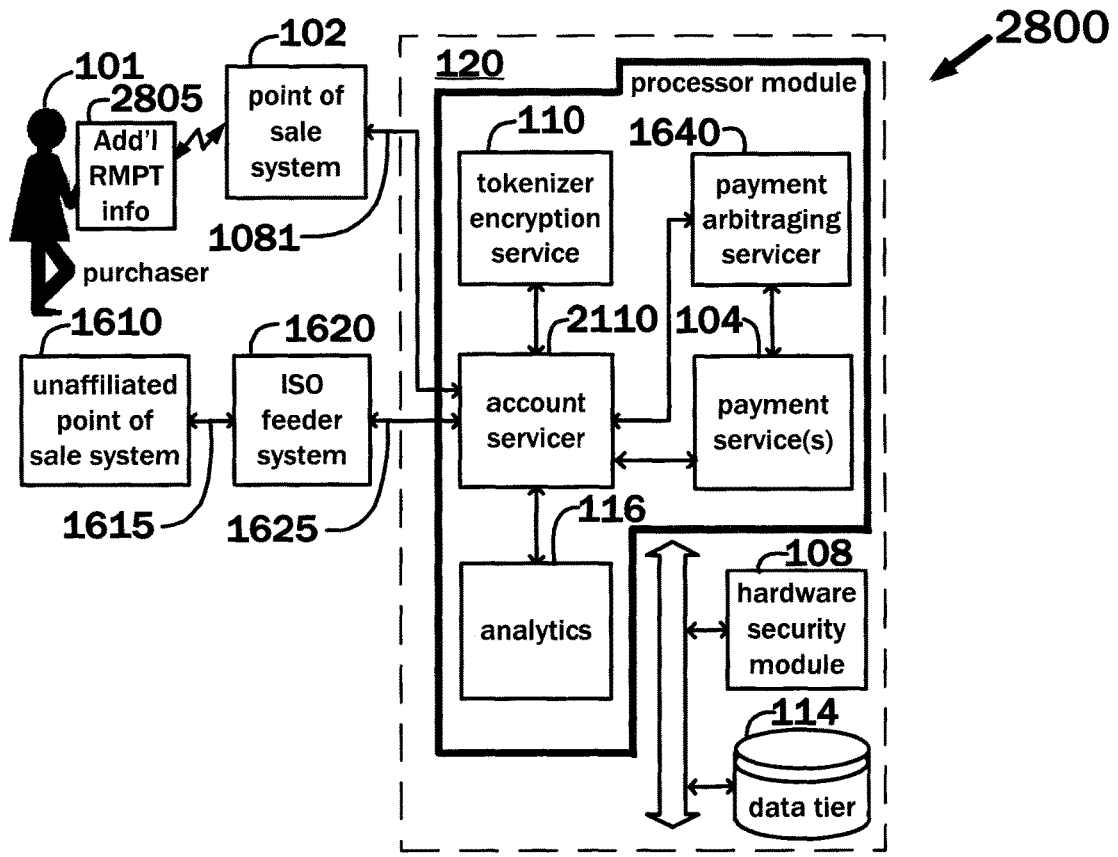
Figure 28 – Cost Altering Payments Services System

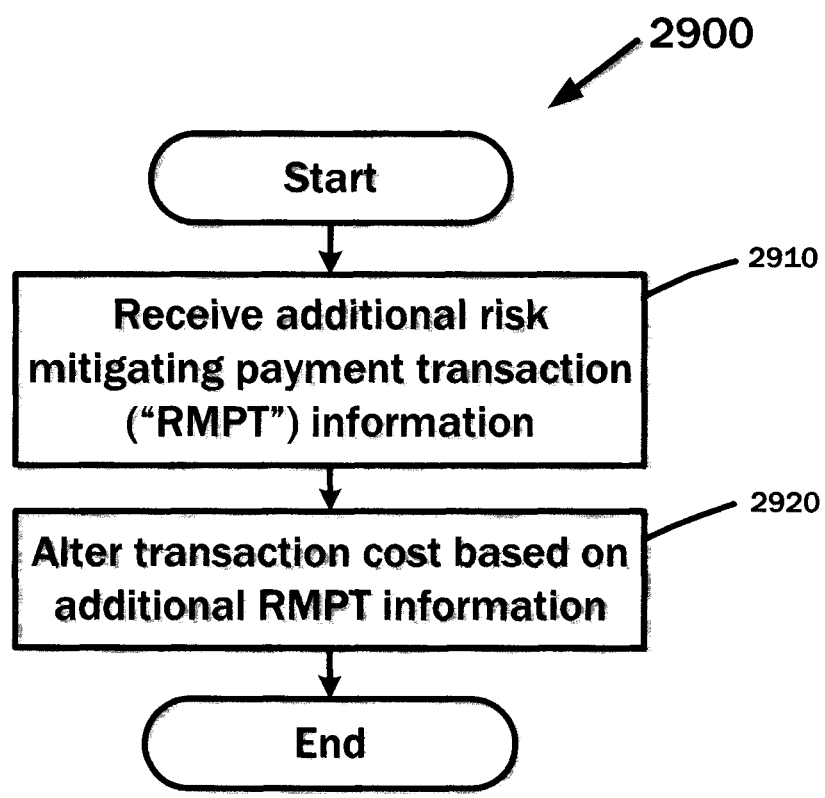
Figure 29 – Cost Altering Payment Services

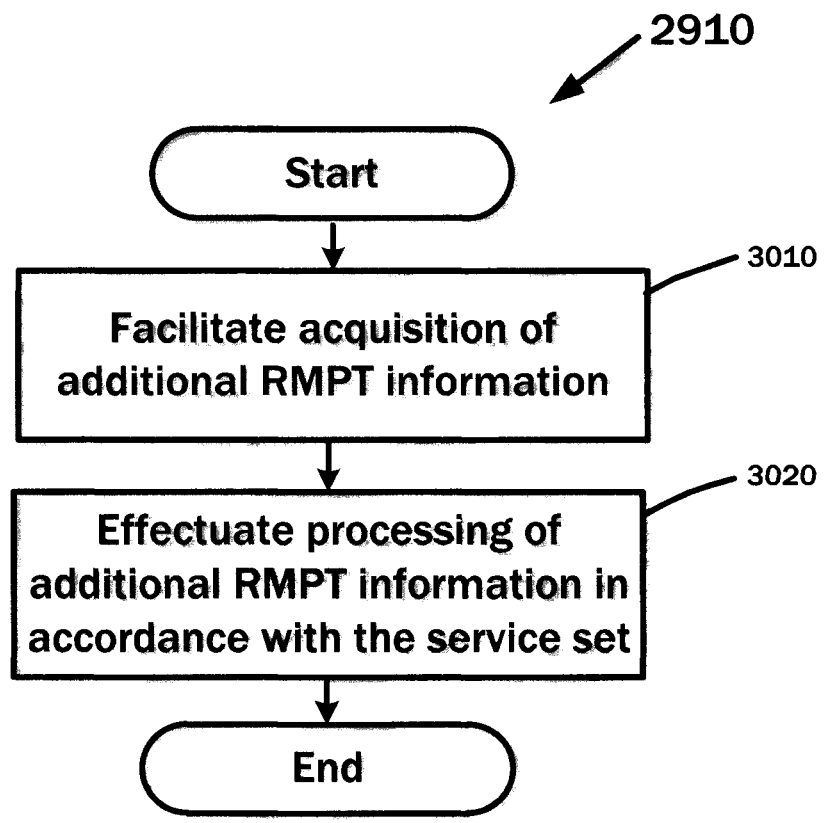
Figure 30 – Receive Additional RMPT Information

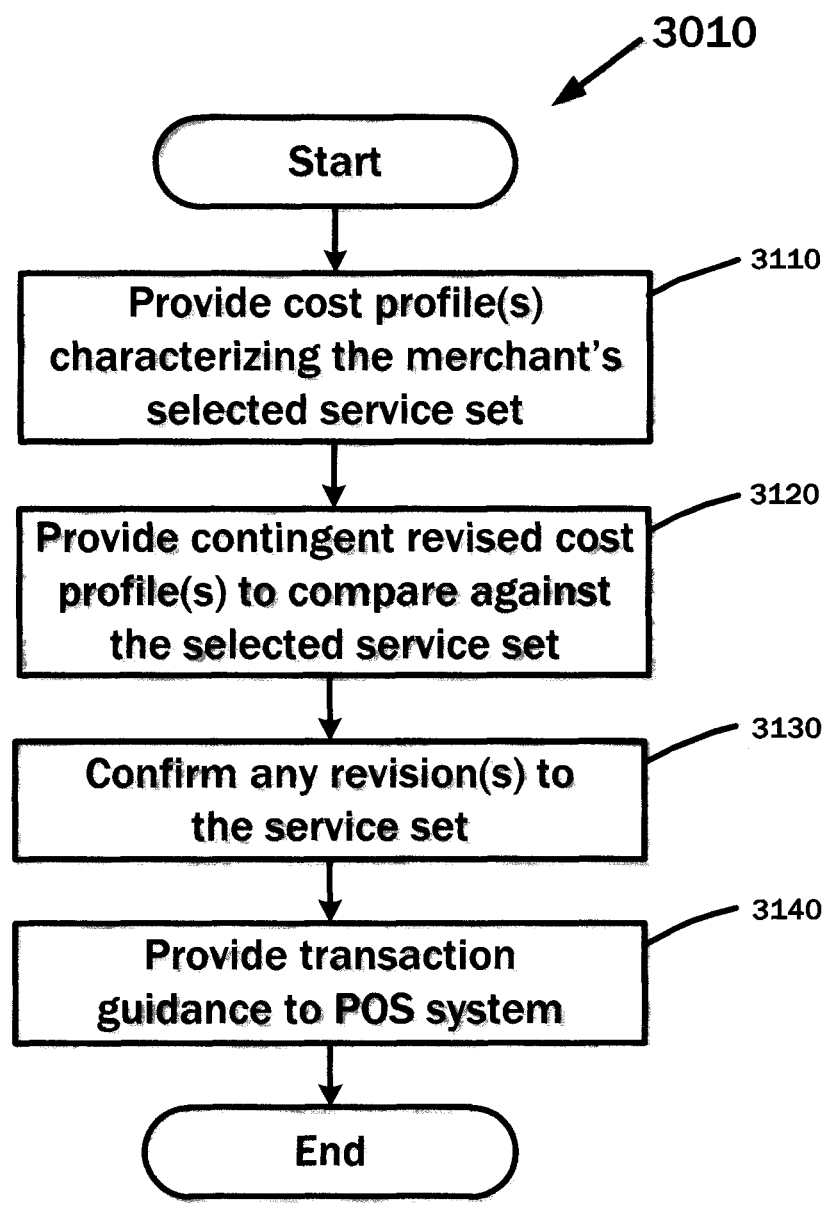
Figure 31 – Facilitate acquisition of additional RMPT information

Figure 32 – Cost profile of transaction cost components
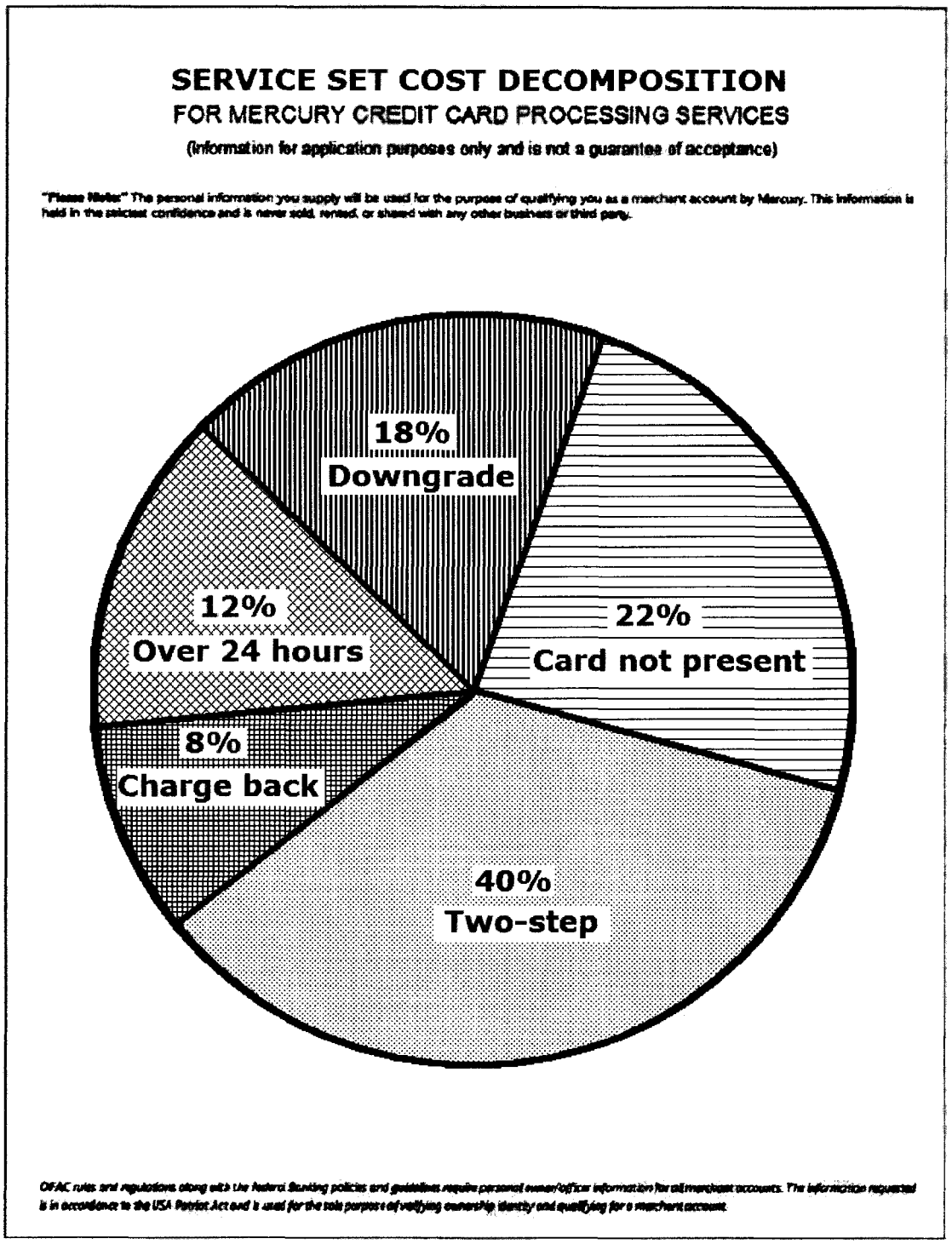

Figure 33 – Comparative cost profile
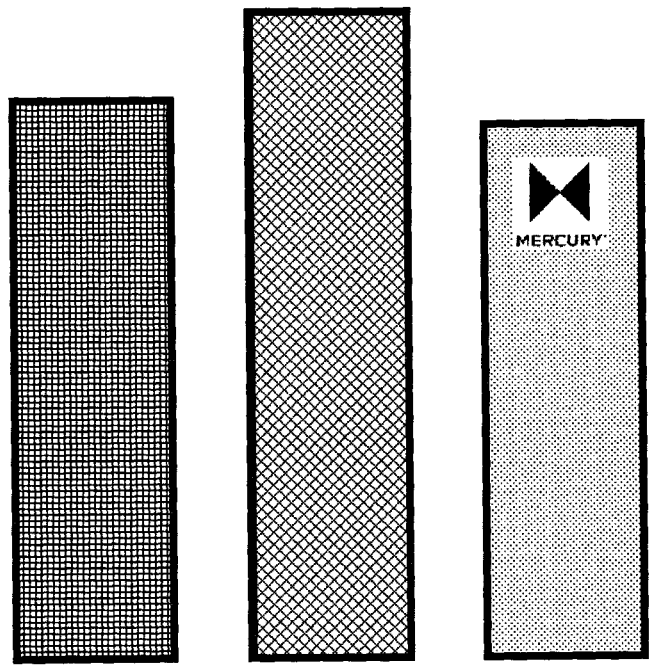

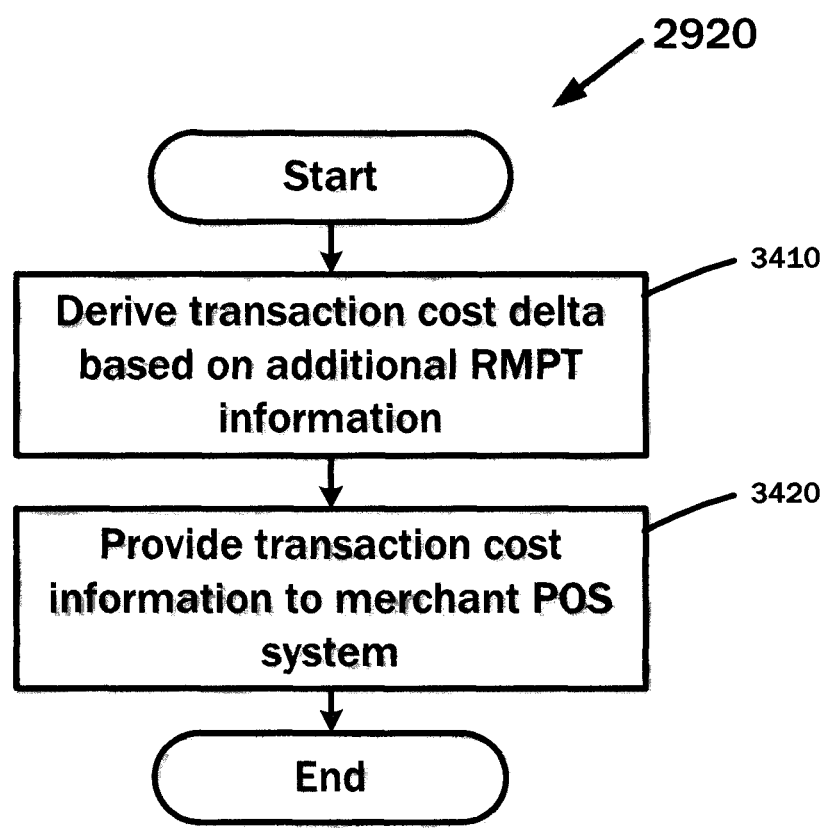
Figure 34 – Alter Transaction Cost

SYSTEMS AND METHODS FOR COST ALTERING PAYMENT SERVICES

CROSS REFERENCE TO RELATED APPLICATIONS

This application is a continuation of and claims the benefit of priority to U.S. application Ser. No. 16/418,581, filed on May 21, 2019, which is a continuation of and claims the benefit of priority to U.S. application Ser. No. 14/135,555, filed on Dec. 19, 2013, which is a continuation-in-part of and claims the benefit of priority to U.S. application Ser. No. 13/563,534, filed on Jul. 31, 2012, which are incorporated herein by reference in their entireties.

BACKGROUND

This invention relates generally to systems and methods for cost altering payment services ("CAPS"), including receiving additional risk mitigating payment transaction ("RMPT") information; and altering a payment transaction cost based on the received additional RMPT information.

Errors and fraud are key risk elements in controlling costs for payment processing. Lowering the incidence of errors and fraud may lead to lower payment processing costs, which in turn may help lower payment management service fees. Risk of error may be minimized by providing correct payment transaction information that may be substantially verifiable by the payment processor and/or the payer entity. Typically this may be done by a point of sale terminal system ("POS system") including items of information in a payment transaction that may be consistent with verifiable information pre-associated with the purchaser and/or merchant account. In order to minimize errors, the focus essentially is on the quality of the information.

Unfortunately, in the instance of fraud, the quality of the payment transaction information may be error free, but the purchaser may be someone other than the "legitimate payment account user" (i.e., the account owner or authorized account user). Therefore, to mitigate fraud risk, the quantity of payment transaction information may be important in combination with the quality of that information.

Given the increasing popularity of both on-line and telephone assisted purchasing, electronic payment information such as primary account number, account owner's name, expiration date, billing address and card verification code (e.g., three or four digit code such as CVC, CVV, etc.) are easily subject to compromise and cannot be relied upon to provide consistent account security. Shared secrets are also subject to compromise, but some forms such as a password can be changed so as to end the compromise and restore security. New technologies such as geo-location and biometrics are potential candidates to augment more traditional purchaser credentials. However, regardless of the technology, fraudsters will come up with ways to compromise or defeat new technologies. Therefore, it is increasingly clear that payment security mechanisms need to evolve to be more adaptable and more easily propagated (as opposed to being nearly static and difficult to field quickly and broadly). POS systems are essential to any such evolution of security. Some POS systems may need to be replaced outright, but many may be updated to support new security features. But in order for that to happen, merchants need to be motivated to invest both money and time.

Lowering a merchant's payment transaction costs is a powerful and effective means to motivate that merchant. However, lowering payment transaction costs can hurt the revenues of the merchant's payment management service provider. Fortunately, when payment management service is considered as a form of arbitrage, a potential win-win proposition is possible. If the payment management service provider can lower their own payment processing costs by decreasing the risk of error and fraud, they can then share a portion of that cost savings by lowering the payment transaction costs charged to the merchant.

In addition to having the means to motivate a merchant to improve payment security, the payment management service provider also needs ways to inform the merchant; and then having both informed and motivated the merchant, needs ways to enable the merchant to acquire and provide additional RMPT information. In some instances, additional RMPT information may be electronically readable from the payment implement, but in many instances, the purchaser may need to be prompted by the POS system operator (or automated terminal). To some extent this is already being done. For example, many gasoline pumps prompt for billing zip code when fuel is purchased with a credit card.

The increasing popularity of various forms of virtual electronic payment such as Google Wallet, Dwolla and PayPal may cause some merchants to update their POS systems to distributed enhanced payment compatible systems that may be updated with down-loadable technology. But many merchants, particularly sole proprietors with smaller, older and/or more primitive POS systems may be unaware that their POS systems may be providing a smaller than possible amount of RMPT information and therefore unnecessarily inflates the merchants' transaction costs. Many such merchants deal with intermediaries such as POS system developers or independent sales organizations; and therefore such intermediaries need to be informed of the cost saving potential of providing additional RMPT information and also motivated to spread information and encouragement to their merchant customers.

The enhanced payment management system ("EPMS") is a key component of a CAPS system. In addition to providing facilities to support the payment transactions of a CAPS system, the EPMS may also provide facilities for determining potential cost benefits of providing additional RMPT information prior to making changes to the merchant's payment management services ("the service set") and corresponding changes to the merchant's POS system. Given that the merchant's cash flow is at stake, the typical merchant may be loath to make changes without a strong likelihood of cost savings. Such a facility for determining potential cost benefits may be useful to both merchants and merchant-associated intermediaries such as independent sales organizations and POS system developer.

In order to communicate additional RMPT information from the POS system to the EPMS, the operation of the POS system must be adapted. The EPMS may facilitate such adaptation with "transaction guidance". Distributed enhanced payment processing system compatible POS systems may receive transaction guidance in the form of down-loadable technology. Transaction guidance may also be propagated by less immediate means, for instance utilizing specifications, sample code and API documentation.

Additionally, having revised the service set and updated the POS system to acquire and provide additional RMPT information that the EPMS may utilize so as to alter transaction costs, the merchant and any associated intermediaries may have a very strong interest in seeing a demonstrable cost benefit. Therefore, the EPMS may provide payment transaction cost information back to the merchant.

In order to acquire RMPT information so as to decrease the incidence of errors and fraud, a CAPS system may serve merchants and associated intermediaries by informing, motivating, enabling, benefiting and confirming beneficial results. Sharing additional RMPT information-based transaction cost alterations may be a major motivator. However, alternative factors, such as an increase in charge backs, may serve as motivation. Additionally, even if the merchant revises the service set and updates the POS system to acquire additional RMPT information, that does not mean purchasers will provide that additional RMPT information. Nonetheless, the costs of error and fraud will continue to increase and so chip away at the merchant's bottom line.

It is therefore apparent that an urgent need exists for systems and methods for receiving additional RMPT information; and for altering a payment transaction cost based on the received additional RMPT information. Once the merchant has selected a service set that includes transaction cost altering based on receiving additional RMPT information, transaction guidance may be provided that facilitates the acquiring of additional RMPT information by the merchant POS terminal system. Such a service set may be selected at the time of merchant boarding or subsequent to merchant boarding. Cost profiles and cost indices may be provided that facilitate merchant consideration of the potential cost altering benefits of different service sets. CAPS systems serve a need that is fundamental and undeniable by allowing merchants to alter payment transaction costs by acquiring additional RMPT information and including that information in payment transaction requests received by the EPMS within a CAPS system so as to alter payment transaction costs.

SUMMARY

To achieve the foregoing and in accordance with the present invention, systems and methods for cost altering payment services ("CAPS") in association with a system of distributed enhanced payment ("DEP") processing with multi-merchant tokenization are provided. Such systems and methods enable merchant customers of payment management service providers to select payment management services in such a way that the merchant point of sale ("POS") terminal system may potentially acquire additional risk mitigating payment transaction ("RMPT") information that may be included in payment transaction requests that are received by the payment management service provider's enhanced payment management system ("EPMS") and result in altered transaction costs.

Most any POS terminal system may interoperate as part of a CAPS system to transact payments. However, as part of a multi-merchant tokenization system, CAPS provides a more cost-efficient means to enable increased security for payments and transactions; provides for more seamless transactions across groups of related merchants; and enable groups of related merchants as well as merchants in general to provide a broader range of payment related services than those available from traditional credit and debit payment card providers alone. Additionally, such systems and methods provide merchants greater control over the processing of electronic payments via Arbitraged Enhanced Payment ("AEP") services including, but not limited to, how rapidly a given payment is processed and/or what entity processes a given payment, and therefore how much the payment processing costs.

Furthermore, as part of a distributed enhanced payment ("DEP") processing system, CAPS provides automated means to update DEP-compatible POS terminal systems to more quickly and easily adapt to revised payment management service sets and correspondingly revised facilities to acquire additional RMPT information. Additionally, as part of a DEP processing system, the benefits of CAPS apply to processing of virtual electronic payment ("VEP") such as PayPal, as well as to processing of traditional card brand ("TCB") payments (i.e., credit and debit cards).

In one embodiment, a payment management service provider's EPMS as part of a computerized. CAPS system is configured via a service set of payment management services to receive additional risk mitigating payment transaction information and to alter payment transaction costs based on the additional RMPT information.

The EPMS assists the merchant in analyzing various alternative service set configurations resulting in varying degrees of potential payment transaction cost alteration. Cost profiles and cost indices used individually or in combination provide visualization tools. Future payment transaction costs are projected using real and hypothetical payment transaction records. The merchant selects a service set. The merchant can re-analyze costs and revise the service set from time to time as desired.

The EPMS provides "transaction guidance", i.e., downloadable (and/or alternately propagated technology) that facilitates the POS terminal system to prompt for and acquire additional RMPT information.

The EPMS utilizes additional RMPT information received from the POS terminal system to effectuate processing of the payment transaction request at a preferential rate. Cost savings accrue to the payment management service provider, but can be shared with the merchant so as to motivate the merchant to attempt to acquire additional RMPT information and to improve the quality of such information.

The EPMS provides transaction cost information to the POS terminal system (and potentially to merchant intermediaries) in order to give the merchant feedback on cost alterations actually realized. Those realized cost alterations can be more or less than those projected, partially because additional RMPT information requested of a purchaser is not necessarily provided and can be of varying quality.

In some embodiments, the merchant utilizes the POS terminal system to analyze projected and/or realized costs and/or to revise the service set to adjust the amount of additional RMPT information to be acquired and utilized. In other embodiments, the merchant utilizes an alternative terminal device—such as a PC connected via the internet— to utilize cost analysis and service set revision facilities provided by the EPMS. For more primitive or more generic POS terminal systems, transaction guidance is obtained occasionally through POS developer technology updates. Also, some merchants may not be fully informed or skilled in utilizing the CAPS system. Therefore, in some embodiments, the EPMS automatically utilizes additional RMPT information that is received in order to alter payment transaction costs.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 10 is a System Level Block Diagram of a Distributed Enhanced Payment (DEP) Processing System in accordance with an embodiment of the present invention;

FIG. 11 is a Top Level Logic Flow Diagram in accordance with a DEP Processing System embodiment;

FIG. 12 is an exemplary screen shot of a payer choice payment control subscreen in accordance with a DEP Processing System embodiment;

FIG. 13 is an exemplary screen shot of a payer list configuration facility screen in accordance with a DEP Processing System embodiment;

FIG. 14 is a Logic Flow Diagram that further decomposes Step 1160 of FIG. 11 so as to describe the processing of VEP in accordance with a DEP Processing System embodiment;

FIG. 15 is a Logic Flow Diagram that further decomposes Step 1180 of FIG. 11 so as to describe the processing of VEP in accordance with a DEP Processing System embodiment;

FIG. 16 is a System Level Block Diagram of an Arbitraged Enhanced Payment (AEP) Processing System in accordance with an embodiment of the present invention;

FIG. 17 is a Top Level Logic Flow Diagram in accordance with an AEP Processing System embodiment;

FIG. 18 is a Logic Flow Diagram that further decomposes Step 1710 of FIG. 17 so as to describe the retrieval of service control directive(s) that may affect AEP processing of a given payment transaction, including but not limited to VEP, in accordance with an AEP Processing System embodiment;

FIG. 19 is a Logic Flow Diagram that further decomposes Step 1720 of FIG. 17 so as to describe the prioritization of processing of payment transactions, including but not limited to VEP transactions, in accordance with an AEP Processing System embodiment;

FIG. 20 is a Logic Flow Diagram that further decomposes Step 1730 of FIG. 17 so as to describe the selective directing of payment transactions for processing of electronic payments, including but not limited to VEP transactions, in accordance with an AEP Processing System embodiment;

FIG. 21 is a System Level Block Diagram of an Expedited Automated Merchant Boarding (EAMB) System in accordance with an embodiment of the present invention;

FIG. 22 is a Top Level Logic Flow Diagram in accordance with an EAMB System embodiment;

FIG. 23 is a Logic Flow Diagram that further decomposes Step 2210 of FIG. 22 so as to describe pre-boarding a merchant's POS terminal system components;

FIG. 24 is a Logic Flow Diagram that further decomposes Step 2220 of FIG. 22 so as to describe establishing a merchant account;

FIG. 25 is a Logic Flow Diagram that further decomposes Step 2440 of FIG. 24 so as to describe revising merchant selected services;

FIG. 26a is an exemplary screen shot of a merchant account information screen;

FIG. 26b is an exemplary screen shot of a merchant account information screen;

FIG. 27 is a Logic Flow Diagram that further decomposes Step 2230 of FIG. 22 so as to describe auto-boarding a merchant's POS terminal system;

FIG. 28 is a System Level Block Diagram of a Cost Altering Payment Services ("CAPS") System in accordance with an embodiment of the present invention;

FIG. 29 is a Top Level Logic Flow Diagram in accordance with an CAPS System embodiment;

FIG. 30 is a Logic Flow Diagram that further decomposes Step 2910 of FIG. 29 so as to describe receiving additional risk mitigating payment transaction ("RMPT") information;

FIG. 31 is a Logic Flow Diagram that further decomposes Step 3010 of FIG. 30 so as to describe facilitating acquisition of additional RMPT information;

FIG. 32 is an exemplary screen shot of a cost profile characterizing transaction cost components;

FIG. 33 is an exemplary screen shot of a cost profile comparing transaction costs associated with service sets; and FIG. 34 is a Logic Flow Diagram that further decomposes Step 2920 of FIG. 29 so as to describe altering transaction cost.

DETAILED DESCRIPTION

Figure 1:
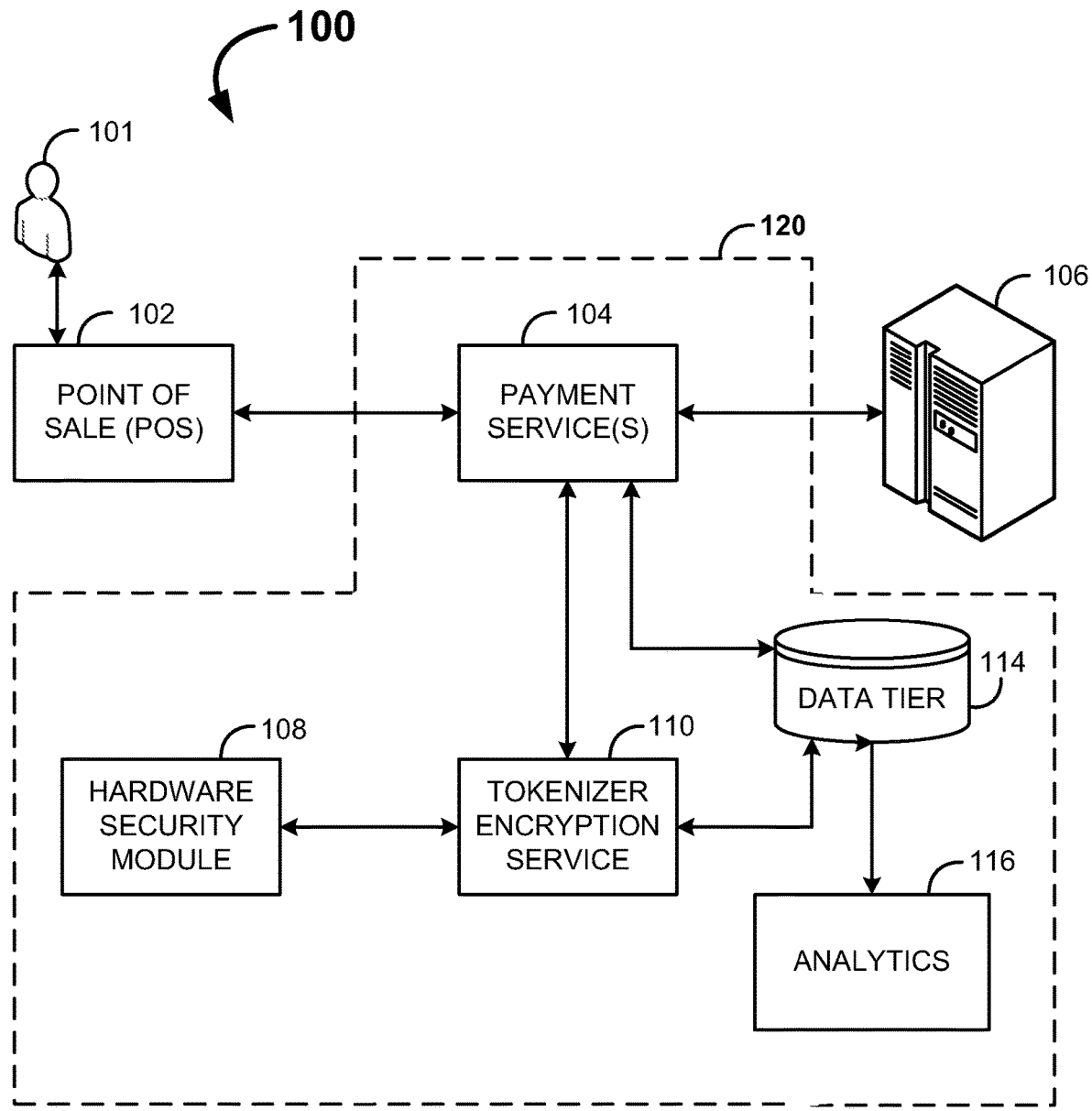
FIG. 1 is an example schematic block diagram for a system for multi-merchant tokenization, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following discussion relates to methods and systems for multi-merchant tokenization in a payment processor. Such systems and methods increase security for electronic transactions, reduce risks borne by the payment processor, and allow for seamless multi-merchant transactions without the need to repeatedly collect user account data.

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

Also note that particular consideration is made to credit card transactions due to the prevalence of these transactions. Despite this reference to credit cards, the disclosed systems and methods can apply equally well to any payment methods where sensitive information is being transferred. This may include debit transactions, gift card transactions, PayPal transactions, smart card transactions, mobile application transactions, and the usage of loyalty cards, to name but a few. Effectively, any circumstance where account numbers, or other sensitive information, is being transferred may be employed within the scope of the disclosed systems and methods.

I. Multi-Merchant Tokenization Systems

Figure 8A:
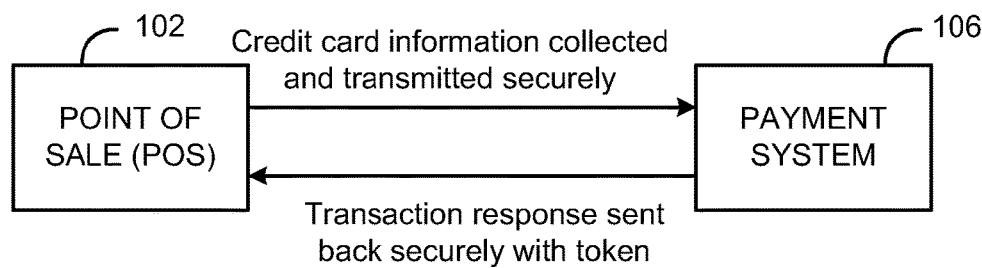
FIGS. 8A and 8B are example schematic block diagrams for mechanisms for secure transactions, in accordance with some embodiments.
Figure 8B:
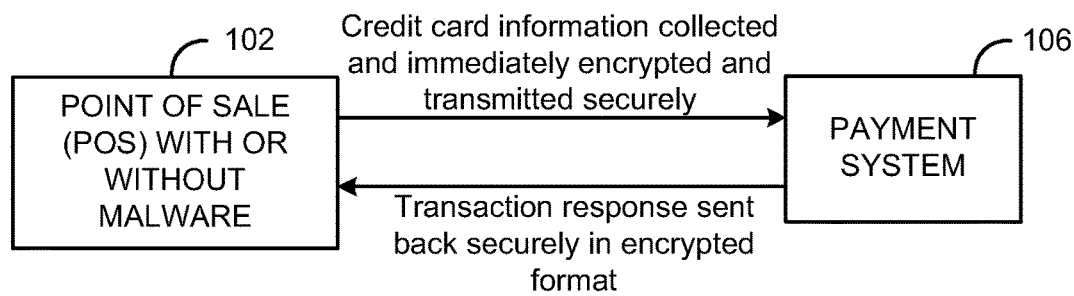

To facilitate this discussion, FIGS. 8A and 8B provide example block diagrams for methods for securely handling transaction payments, in accordance with some embodiments. In FIG. 8A, the point of sale terminal 102 may collect credit card information (or other sensitive payment information) and transfer the data securely to the payment system(s) 106, at 800a. Intermediary in this transaction is a payment processor which ensures validity of the request, and generates a multi-merchant token. The payment system(s) 106 returns a transaction response securely with the token generated by the payment processor to the merchant.

By relying upon a token, the merchant no longer has to send the credit card information for subsequent transactions and may instead utilize the token for follow-up activities. For example, a restaurant may initially run a transaction for the cost of a meal, and perform a follow-up transaction using the token for processing the tip. Another example may include recurring transactions for a gym membership. A retailer may use tokens for returns or price adjustments rather than resending sensitive transaction information.

In contrast to current tokenization systems, the presently disclosed systems and methods transfer a token with a unique makeup (including encrypted card data) that enables distributed storage of sensitive information, as well as the ability for multiple merchants to share the token for transactions. This may be of particular use in franchise or related businesses, where a customer's payment information may be processed by multiple merchants.

For example, a customer may purchase a good from location A from a franchise retailer. The customer then decides to return the item to location B which is within the same franchise, but may not be owned by the same entity. Instead of denying the transaction, or re-running the card using the presently disclosed system, the token may be leveraged to perform the transaction.

FIG. 8B illustrates a schematic block diagram illustrating end to end (E2E) encryption, at 800b. End to end encryption protects sensitive information from malware loaded upon a point of sale terminal, and may be employed in conjunction with multi-merchant tokenization.

In these systems, the card information is encrypted at the reader head, upon collection. Thus, the information conveyed from the reader to the rest of the POS system is already secure. Since the POS system may be infected by malware, this early encryption ensures that the data remains secure from the very start. While the currently disclosed systems and methods can be employed with end to end encryption, this is not a required feature to employ the tokenization disclosed herein.

The secure data is then transmitted to the payment system(s) 106, and the response may be returned in an encrypted format. Since the data is never in the clear, E2E payment methods ensures added security from potential vulnerability at the point of sale terminal 102. Further, when utilized in conjunction with multi-merchant tokens, the system's security is even more robust.

Turning to FIG. 1, an example schematic block diagram for a system for multi-merchant tokenization is provided, shown generally at 100. In this example block diagram, a purchaser 101 may be seen interacting with the point of sale terminal 102 in order to pay for a purchase, or otherwise settle a transaction. Typically the purchaser 101 provides a magnetically stored account number and expiration in the form of a credit card, but as previously discussed any form of sensitive payment information may be utilized, in some embodiments.

The point of sale 102 may include a fixed reader coupled to a terminal, an integrated cash register system, mobile payment application, or the like. As noted above, the point of sale terminal 102 may encrypt the collected data at the reader head in order to ensure security. Alternatively the initial encryption may be performed in software deeper in the point of sale terminal 102, in some embodiments. Software encryption, however, increases vulnerability to security breach if the point of sale terminal 102 has been compromised. Regardless of location of initial encryption, an encryption protocol may be employed, in some embodiments. This encryption protocol typically includes a merchant ID, amount for the transaction, passwords and an encrypted portion. The encrypted potion may be in the following format, in some embodiments:

<encryption>
  <block>
  <key>
  <serial number>
</encryption>

Note that while a specific encryption protocol is presented here, alternate known encryption schemas may be readily employed in alternate embodiments.

The point of sale terminal 102 may be capable of providing the collected account information (and other sensitive information) to a payment service(s) 104 in the tokenization and payment management system 120 (payment processor). This transfer of data may be performed over the internet or via a dial in connection. The payment service(s) 104 may include a plurality of systems for receiving the data, dependent upon transmission mechanism and data type, as will be discussed in greater detail below. The payment service(s) 104 does an initial check for encryption of the data. If the received data is not encrypted, it may be transferred immediately to payment system(s) 106 for transfer of funds, or directly to entities such as Visa, MasterCard, etc. Payment system(s) 106 may include entities such as Global Card Bank, for example. However, where encryption is present, and tokenization is desired, the payment service(s) 104 may transfer the information to a tokenizer encryption service 110 for processing. The payment service(s) 104 validates the encrypted block, encrypted key and reader serial number lengths. It also validates the merchant's ID with a stored database of terminal IDs.

The tokenizer encryption service 110 validates credentials and identifies keys for the encrypted data. The tokenizer encryption service 110 may leverage a data tier 114 populated by analytics 116 system and CRM application(s) in order to perform validation and identification of keys. The data is then submitted to a hardware security module 108 for decryption and the generation of a token. The token includes a primary account number (PAN), a group ID (GD), an expiration date for the token, and an expiration date for the card.

In some embodiments, the expiration date of the token may be varied depending upon if the token is designated as a single use token, or for recurring transactions (i.e., a subscription). For example, a 1 year and 2 year expiration may be provided for a single use and recurring token, respectively. This allows for a longer validity period where the merchant is anticipating reuse of the token, and ensures that tokens are not stored unnecessarily long for single use tokens.

The token, which is encrypted, and clear text of the data supplied by the point of sale terminal 102 are returned to the tokenizer encryption service 110, and subsequently to the payment service(s) 104. The payment service(s) 104 transfers the clear text to the payment system(s) 106 for a transaction response. The response is then provided, along with the token, back to the merchant. The merchant may then store the encrypted token in a local database for later transactions.

Unlike current tokenization technology, the PAN (primary account number) is stored as part of the token, with the merchant, in encrypted form. The merchant cannot access the PAN without the keys maintained within the hardware security module 108. Thus, for account information to be compromised, both the merchant system and the tokenization and payment management system 120 would need to be breached. In all other known token based systems, the PAN is stored exclusively upon the payment processor's system, enabling a hacker to collect account information by breaching a single system.

Additionally, unlike other token based systems, the present system includes a GID (group ID) which enables more than one merchant to utilize the token. The data tier 114 maintains a copy of merchant IDs and correlates them with one or more GIDs. When a token is supplied to the system during a later transaction, the GID in the token is compared against the merchant ID listed in the data tier 114. If they match, then the tokenization and payment management system 120 may process the token.

Figure 2:
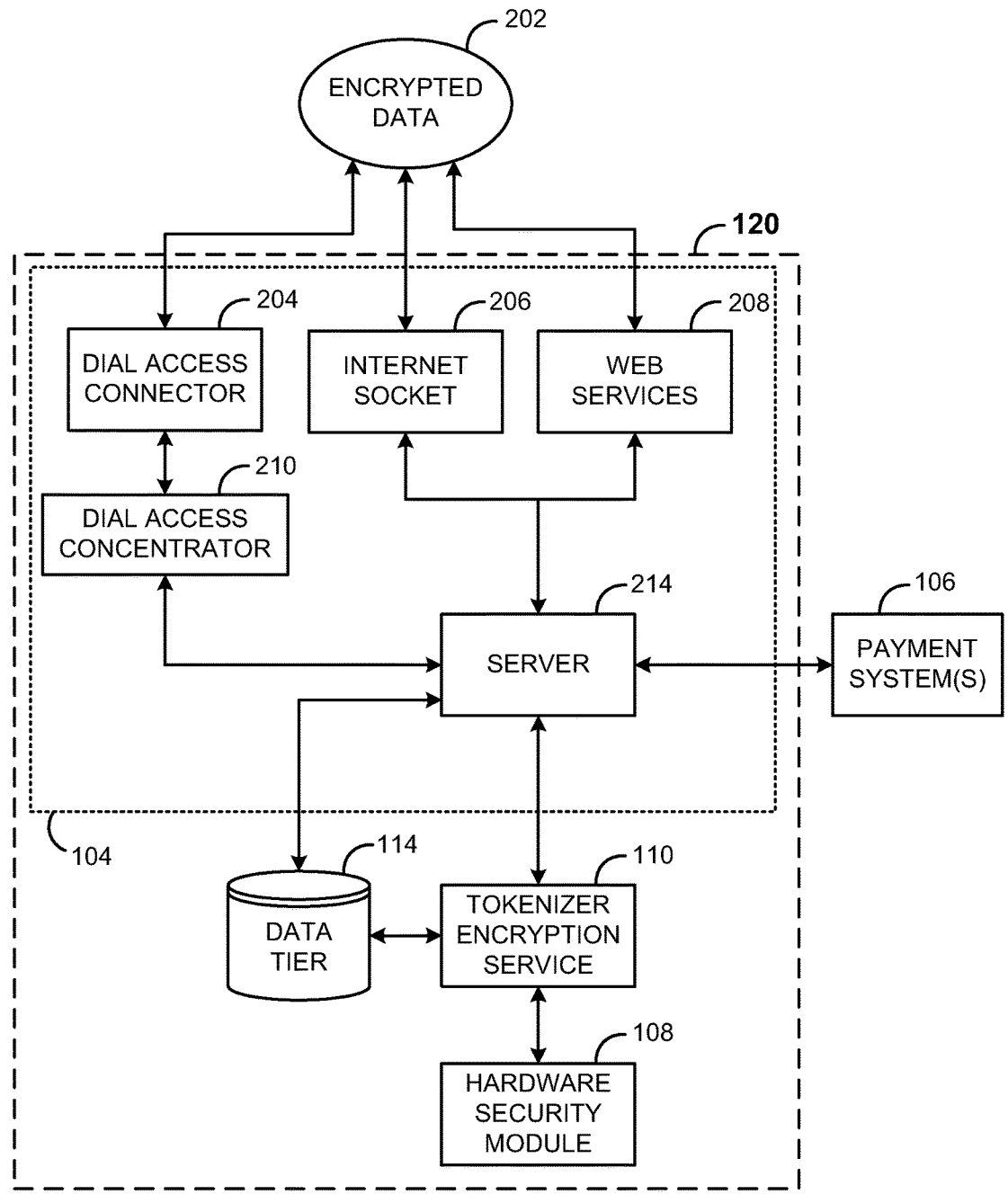
FIG. 2 is an example schematic block diagram for a more detailed view of components within the tokenization and payment management system, in accordance with some embodiments.

FIG. 2 is an example schematic block diagram for a more detailed view of components within the tokenization and payment management system, in accordance with some embodiments. In this example block diagram, encrypted data 202 from the point of sale terminal 102 is seen being delivered to the payment service(s) 104 via any of a dial access connector 204, internet socket 206 or web services 208. When data is delivered to the dial access connector 204, it may pass through a dial access concentrator 210 prior to being provided to a server 214. If data passes through the internet socket 206 or web services 208, it may be supplied to the server 214.

In addition to the server 214, other servers may be included, in alternate embodiments, in order to handle alternate inputs. For example, in embodiments where gift cards or loyalty cards are being processed, the system may include a gift card server or loyalty card server. Generally, the system is designed to be scalable to take any number of payment types, as is desirable for any particular scenario.

The server 214 determines if token is present and/or if data is encrypted. If not encrypted and the merchant is not setup for tokenization, the clear text data is transferred to the payment system(s) 106 (such as Global Card Bank, Visa, etc.) for approval or declining. Otherwise, if the data includes a token or encrypted data, it may be provided to the tokenizer encryption service 110, as previously discussed.

Figure 3:
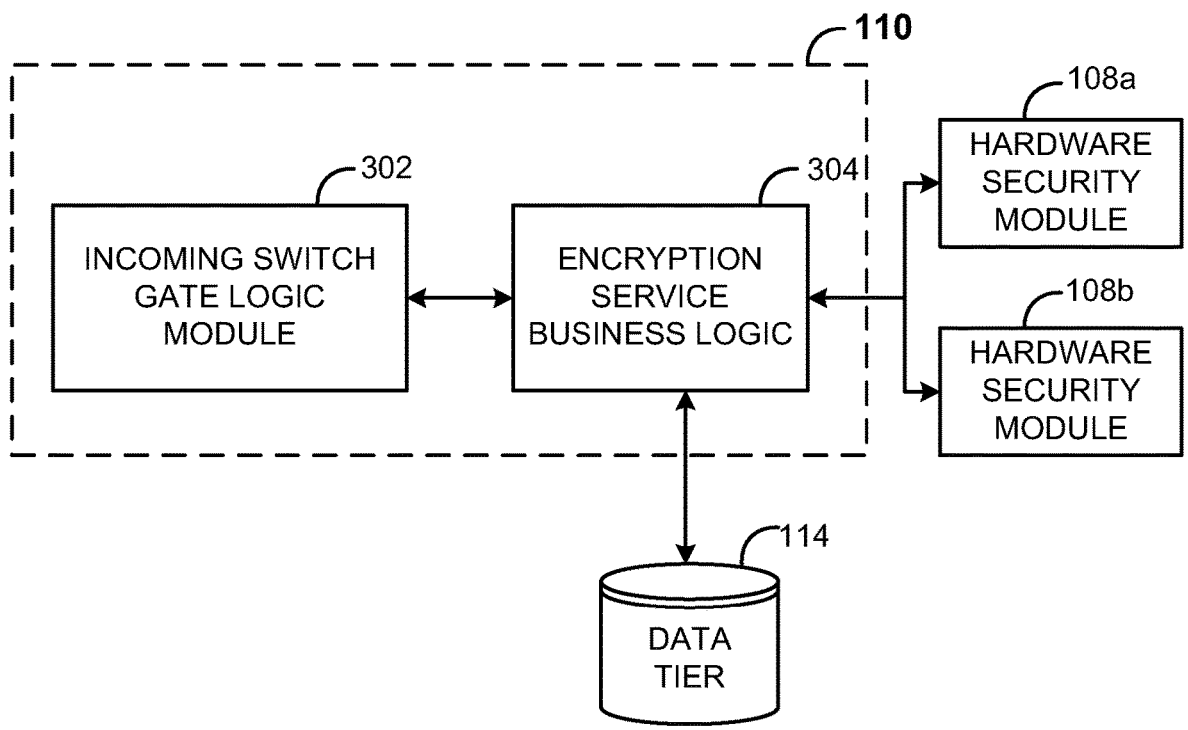
FIG. 3 is an example schematic block diagram for the tokenizer encryption service, in accordance with some embodiments.

FIG. 3 is an example schematic block diagram for the tokenizer encryption service 110, in accordance with some embodiments. This component may include two distinct modules: an incoming switch gate logic module 302 and an encryption service business logic 304. The incoming switch gate logic module 302 may validate credentials of the merchant, and the encryption service business logic 304 may identify keys for the data. The encryption service business logic 304 may access the data tier 114 and one or more hardware security module 108*a* and 108*b*. More than one hardware security module 108*a* and 108*b* may be employed for redundancy supporting failover and load balance.

Figure 4:
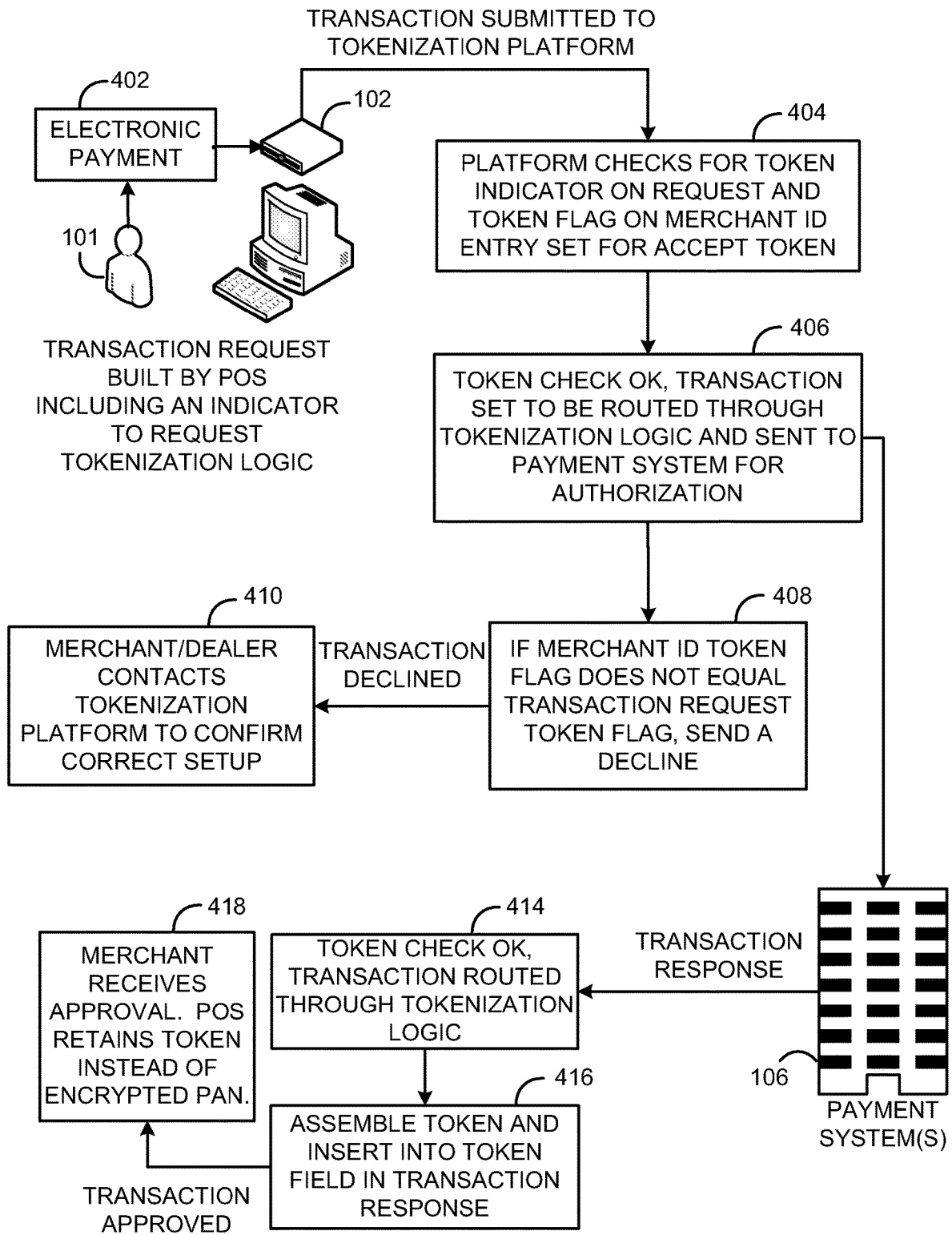
FIG. 4 is an example process flow diagram for multi-merchant tokenization, in accordance with some embodiments.

Lastly, FIG. 4 is an example process flow diagram for multi-merchant tokenization system, in accordance with some embodiments. Here it is seen that a purchaser 101 makes an electronic payment 402 via a point of sale terminal 102. The transaction request built by the point of sale terminal 102 includes an indication requesting tokenization, in this example.

The transaction is submitted to the tokenization and payment management system 120, in this example, where the transaction data is checked for the token indicator (at 404). The merchant ID included in the transaction data is also compared against records to determine if the merchant is configured for tokenization. If the token indicator is present, and the merchant ID matches the ability to perform tokenization, then the transaction is set to be routed through tokenization logic, and is sent to the payment system(s) 106 for authorization (at 406).

If the merchant ID does not match the token indicator in the transaction, then a decline is sent back to the merchant (at 408). This is a sanity check that ensures that both the transaction and merchant configuration are in alignment prior to approving a transaction. Once the transaction is declined, the merchant may contact the tokenization and payment management system 120 to confirm correct setup if they believe the decline was in error.

If the transaction is approved by the payment system(s) 106, then the transaction may be sent through the tokenization logic (at 414). In alternate embodiments, the transaction is sent through the tokenization logic prior to approval by the payment system(s) 106, and the token is attached to the response by the payment system(s) 106 regardless of approval status. As noted above, the token contemplated herein includes the primary account number, token expiration, card (or account number) expiration, and a group ID.

Once the token is assembled, it is inserted into a token field in the transaction response (at 416). The response is provided to the merchant where the approval is received, and the merchant retains the token instead of the primary account number.

II. Multi-Merchant Tokenization Methods

Figure 5:
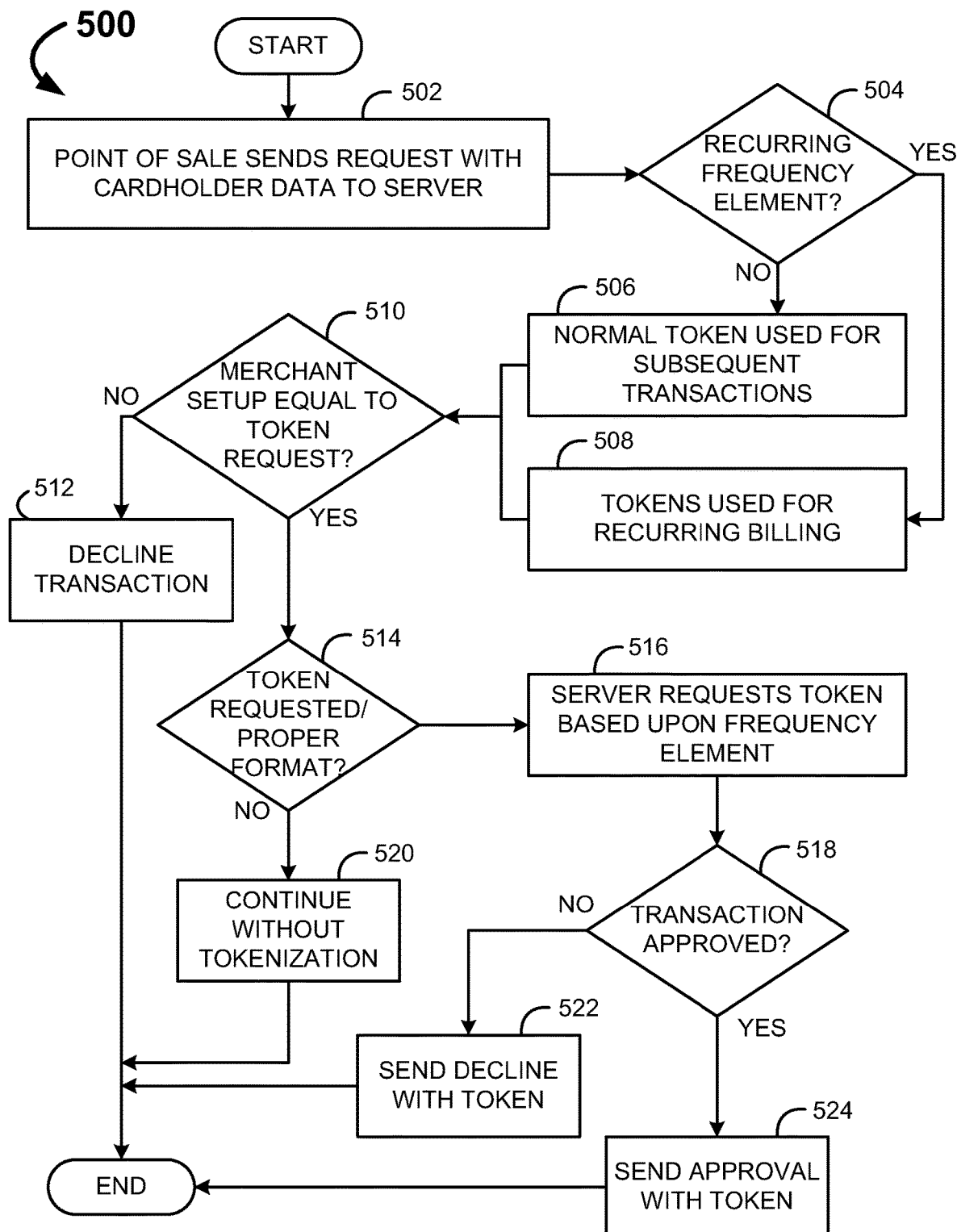
FIGS. 5-7 are example flowcharts for methods for multi-merchant tokenization, in accordance with some embodiments.

Now that embodiments of the basic system architecture have been described, FIG. 5 is presented to illustrate one embodiment of a method for multi-merchant tokenization, shown generally at 500. In this example process, the point of sale sends a request with the cardholder's data to the server (at 502). The server may determine if the request includes a recurring frequency element (at 504). If the request is for a recurring token, logic for a recurring billing token may be utilized (at 508). Alternatively, if the request is for a normal single use token, logic for this token may be utilized (at 506). Generally, recurring tokens may differ from normal tokens by having a longer period before they expire.

Next, the token request is compared against the merchant's setup (as stored in a database) to make sure that the token request is in alignment to the merchant's configuration (at 510). If the merchant does not match the token request, the transaction may be declined (at 512). Otherwise, if there is a match between the request and the merchant's configuration, the system determines if a token is being requested (at 514). If no token is requested, the entire tokenization logic may be bypassed and the system may forward the transaction to the payment system(s) 106 without tokenization (at 520). In alternate embodiments, all transactions will be processed for a token regardless if a request for tokenization is present. In these embodiments, merchants that are configured to accept tokens will receive them if they have submitted a correctly formatted transaction request. In these embodiments, only if the request is incorrectly formatted will the tokenization process be bypassed or declined.

However, if tokenization is requested, the server may request a token (at 516) from the hardware security module 108 based upon the frequency element (normal or recurring). If the transaction is approved by the card brand (at 518), then the approval is returned to the merchant (at 524), or is otherwise declined (at 522). In some embodiments, regardless of transaction approval or decline, the token will be provided to the merchant along with the transaction response.

Figure 6:
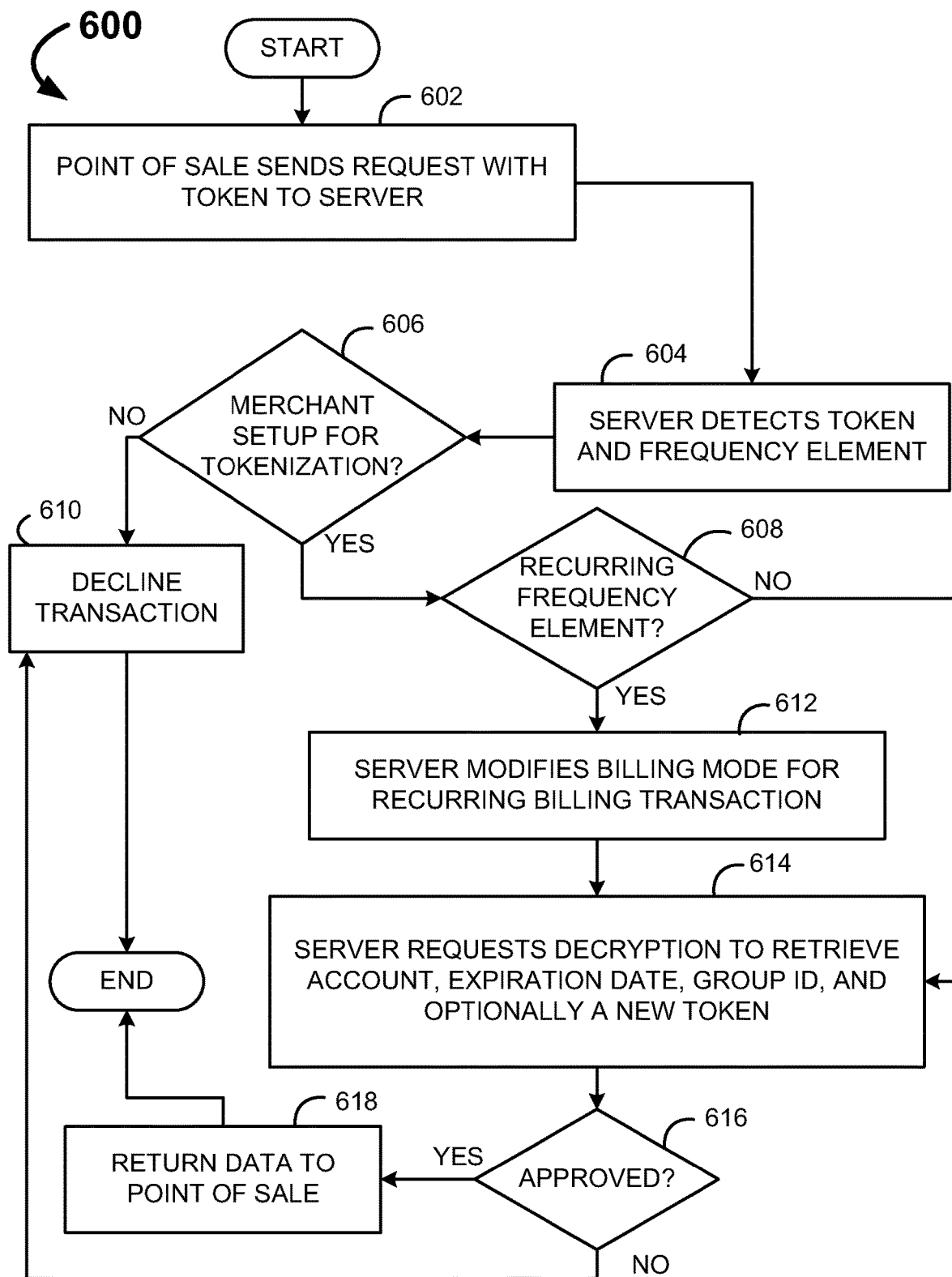

In an alternate method, as shown at 600 of FIG. 6, the point of sale terminal 102 sends a request to the tokenization and payment management system 120 with a token (at 602). The server detects the presence of the token, as well the frequency element of the token (at 604). The system next determines if the merchant is set up for tokenization by querying merchant account information (at 606). If the merchant is not set up for tokenization, the request will be denied (at 610). However, if the merchant is set up for tokenization, then the system may inquire if the frequency element is for a recurring token (at 608).

When a recurring frequency element is present, the server may modify billing mode for recurring billing transactions (at 612). After this, or if no recurring element is present, the tokenizer encryption service 110 requests decryption of the token from the hardware security module 108 to retrieve account numbers, expiration dates, group ID, and optionally the generation of an updated token (at 614). In some embodiments, every transaction may include updates of the token. This ensures tokens never become stale; however, alternate embodiments may keep existing tokens, or only update upon request, in some cases.

The decrypted token information is used to get approval from the payment system(s) 106 (at 616). An approval response (at 618) or declining response (at 610) may be provided back to the point of sale terminal 102. In cases where the token has been updated, the new token may accompany the response regardless of if it was approved. This new token may then be stored within the merchant's system for later use.

As previously noted, due to the presence of a group ID within the token, the system may also undergo a check to determine if the merchant is linked to the group ID. If so, the merchant is authorized to use the token. If not, the transaction may be declined.

Figure 7:
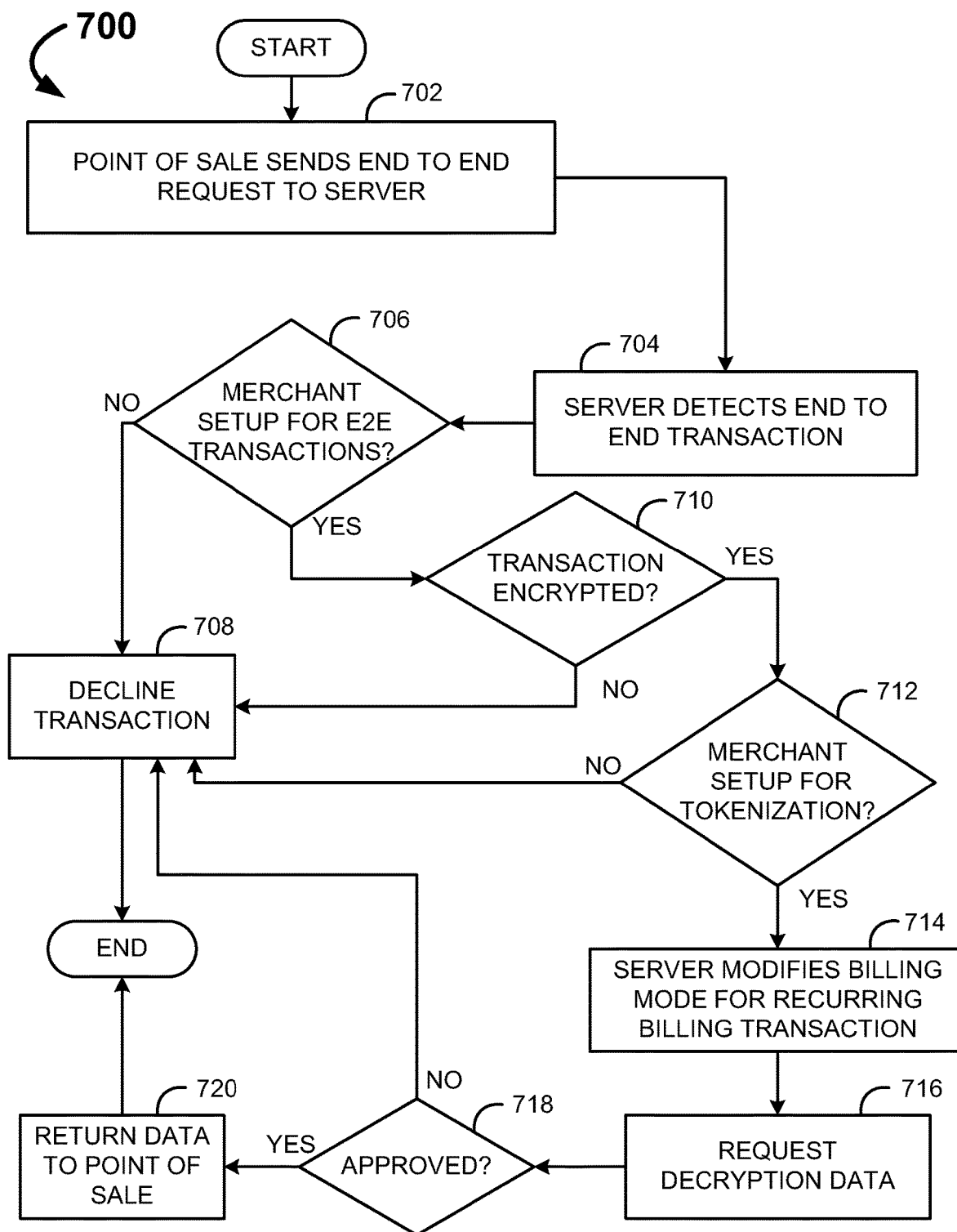

FIG. 7 provides yet another flow diagram for an embodiment for multi-merchant tokenization of transactions, shown generally at 700. In this example process, the point of sale sends an end to end request to the server (at 702). The server detects the end to end transaction (at 704) and ensures that the merchant is configured for such transactions by referencing merchant account data (at 706). If the merchant is not configured for end to end transactions, then the transaction is declined (at 708). However, if the merchant is set up for end to end transactions, the process then determines if the initial request is encrypted (at 710). Subsequently, the system determines if the merchant is configured for tokenization (at 712).

If the request was not encrypted, or if the merchant is not set up for tokenization, then the transaction is declined (at 708). However, if the merchant is configured for tokenization and the request was encrypted, the server modifies the billing mode (at 714) for recurring transactions (if the transaction is a recurring event), and the data is decrypted (at 716). The decrypted data is supplied to a payment system(s) 106 for approval (at 718) and if approved, the data may be returned to the merchant (at 720). Otherwise the transaction may be declined (at 708).

III. System Embodiments

Figure 9A:
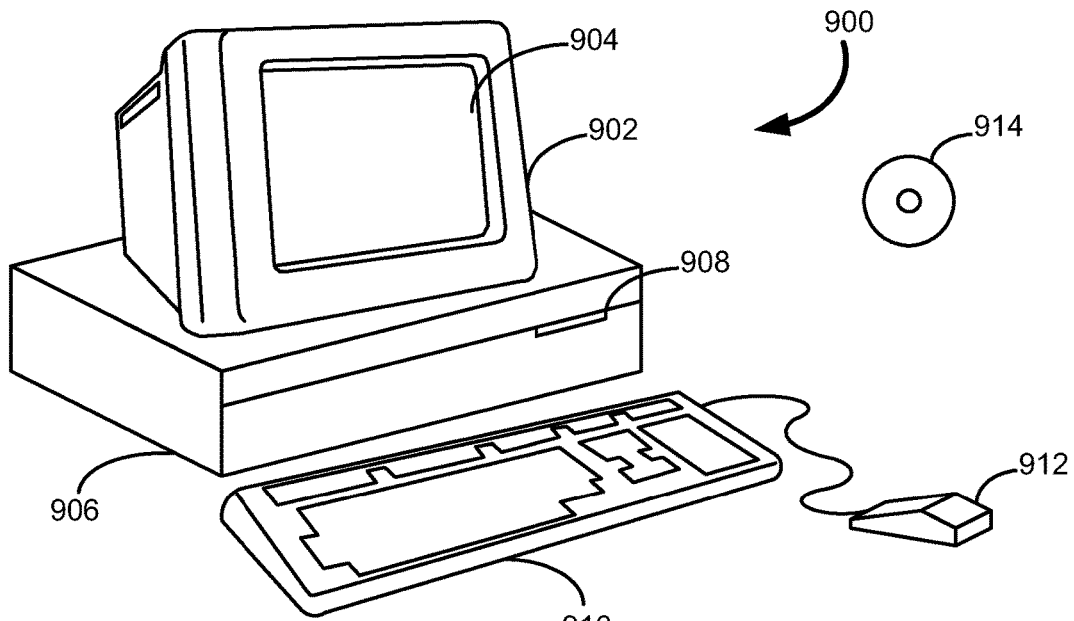
FIGS. 9A and 9B are example illustrations for computer systems configured to embody the multi-merchant tokenization system, in accordance with some embodiments.
Figure 9B:
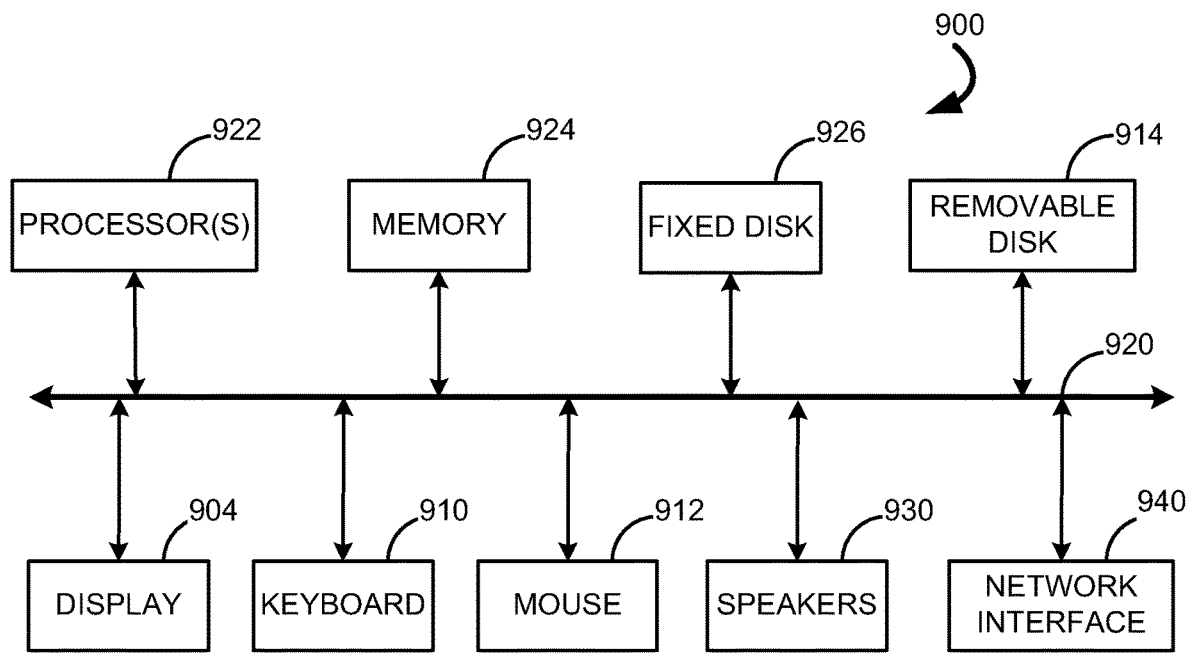

FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902, a Display 904, a Housing 906, a Disk Drive 908, a Keyboard 910, and a Mouse 912. Disk 914 is a computer-readable medium used to transfer data to and from Computer System 900.

In addition to the standard desktop, or server, computer system illustrated, it is fully within the scope of this disclosure that any computer system capable of the required storage and processing demands would be suitable for embodying the present invention. This may include tablet devices, smart phones, pin pad devices, and any other computer devices, whether mobile or even distributed on a network (i.e., cloud based).

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 926 may also be coupled bi-directionally to the Processor 922; it provides additional data storage capacity and may also include any of the computer-readable media described below. Fixed Disk 926 may be used to store programs, data, and the like and is typically a secondary storage medium (such as a hard disk) that is slower than primary storage. It will be appreciated that the information retained within Fixed Disk 926 may, in appropriate cases, be incorporated in standard fashion as virtual memory in Memory 924. Removable Disk 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 922 optionally may be coupled to another computer or telecommunications network using Network interface 940. With such a Network Interface 940, it is contemplated that the Processor 922 might receive information from the network, or might output information to the network in the course of performing the above-described multi-merchant tokenization. Furthermore, method embodiments of the present invention may execute solely upon Processor 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

IV. Enhancements—Distributed Enhanced Payment

The Distributed Enhanced Payment (DEP) Processing System—is directed to novel methods and systems for acquiring, translating, communicating, securing, storing, retrieving, aggregating and post-processing electronic payment information (EPI) pertaining to a given individual purchaser via a given merchant's POS terminal system; utilizing secure, distributed and re-usable multi-merchant tokenization (as described previously herein) to store and/or retrieve some or all of said EPI; and/or securely communicating some or all of said EPI utilizing clear text and/or tokenization included in a given payer authorization request communicated to a payer chosen by a given purchaser—with such a request transacted in such a way that creditworthiness may be verified and/or funds transferred between said purchaser's funding account and a corresponding transacting merchant's account in the amount of a "requested payment" as may be indicated by the EPI. In some authorization requests, the requested payment may be for a purchase and thus result in the debiting of funds from the purchaser's funding account and crediting to the transacting merchant's account. In some authorization requests, the requested payment may be for a full or partial refund and thus result in the debiting of funds from the transacting merchant's account and crediting to the purchaser's funding account. For a given authorization request, the amount of the requested payment may be utilized to check for the availability of credit and/or funds for an anticipated but not yet realized purchase—i.e., a pre-authorization—and result in zero change to the fund level in the purchaser's funding account due to that pre-authorization. In some authorization requests, such as for a check-in transaction, the requested payment may be left unvalued or may have a value that may be ignored.

In some embodiments, purchase payment, refund and pre-authorization authorization requests may be utilized for VEP entities as well as for TCB payers. However, processing VEP may utilize a check-in transaction to identify and authenticate a given purchaser and said purchaser with a broader range of services than TCB payer services may provide. Competition with VEP entities may cause TCB payers to also support a check-in transaction; or to acquire or be acquired by or merge with a VEP entity that does. Therefore, despite references to VEP and VEP entities, the systems and methods disclosed herein may apply equally well to any payment methods where sensitive information may be transferred. This may include debit transactions, credit card transactions, gift card transactions, PayPal transactions, smart card transactions, mobile application transactions, and the usage of loyalty cards, to name but a few.

In some embodiments, electronic payment information—EPI—required by a VEP entity and/or TCB payer may include but not be limited to: purchaser payment credential(s), transaction description, and payment request information. More specifically, EPI may include but not be limited to: purchaser's primary account identifying information and/or purchaser authenticating information; authorization request type (e.g., check-in, pre-authorization, purchase payment, refund); transacting merchant's account identifying information and/or credential(s); POS identifying information such as location and terminal number; transaction identifying information such as date, time, SKU, quantity and price; and payment request information such as requested payment amount, transacting merchant's account identifying information, as well as identifying information and/or credential(s) corresponding to payment management system 120 requesting payment as the merchant's intermediary.

In some embodiments, EPI may include TCB payer or VEP entity identifying information that may be utilized for associating a given authorization request to the appropriate payment entity such as a VEP entity or TCB payer.

In some embodiments, if the primary account identified in the EPI may be a VEP primary account from a VEP entity such as PayPal, Dwolla, or Google Wallet, the VEP primary account may reference in turn a different pre-associated purchaser funding account, for example a MasterCard account or a bank checking account, from which the requested payment may actually be debited (or credited). Some VEP entity's services may be referred to colloquially as an 'electronic wallet' or 'e-wallet' or similar term evoking the notional image of a virtual payment containing and/or dispensing entity.

In some embodiments, purchaser payment credential(s) required by a VEP entity and/or TCB payer may include but not be limited to: primary account number (PAN), personal identification number (PIN), payment card/credential(s) expiration date, purchaser's name, purchaser's billing postal code. Some VEP entities may utilize a unique purchaser identifier that may operate as a substitute for the actual PAN, i.e., a unique purchaser alias. For example, a given purchaser utilizing a given VEP entity may type in said purchaser's ten digit phone number and also a corresponding multi-digit 'secret' PIN. The VEP entity may use such purchaser authenticating information to lookup the corresponding PAN; and from that PAN determine the corresponding purchaser funding account. Depending on the VEP entity, one or more unique purchaser identifier(s) may be utilized as a substitute for the actual PAN, including but not limited to a telephone number, an email address, asocial network 'handle', a postal address, a VEP approved user name, or a third party issued account or identification number. The VEP entity may leverage the diligence of a third party, e.g., Gmail, to assure that the substituted purchaser identifier is unique to the purchaser within the identifier space of that third party. Many VEP entities may require purchaser authenticating information including a PIN or password in addition to the purchaser identifier, and may require unique identifier and PIN/password pairings. It should be noted that a purchaser potentially may use the same substitute purchaser identifier and/or PIN/password for more than one VEP entity. For example, a given purchaser may use the same pairing of phone number: 650-567-9153 and PIN: 5653 for both PayPal and Dwolla and yet be uniquely identified and authenticated for the separate purposes of each of those VEP entities. Therefore, unlike the PAN of a TCB payer account, a purchaser's payment credential(s) may not inherently identify a unique corresponding VEP entity. Also in contrast, TCB payer services operate by identifying the funding account rather than the purchaser, i.e., an essential component of purchaser payment credential(s) for TCB payers is the primary account number (PAN), which for credit cards typically may be the same as the funding account number, whereas for debit cards, the PAN typically may be utilized by the TCB payer to lookup the separate funding account number.

To facilitate discussion, FIG. 10 shows an exemplary structural block diagram of a Virtual Electronic Payment processing system 1000, which in some embodiments may be utilized by a given purchaser 101 to conduct electronic payment related transactions. Tender 1015 may be physically exchanged or may be presented in a virtual form for electronic exchange on said purchaser's behalf by third parties such as VEP entity system(s) 105 and/or payment system(s) 106. Purchaser 101 may directly utilize a POS terminal system 102; and/or another party or parties (not shown)—performing on the purchaser's behalf and/or on the transacting merchant's behalf (e.g., a checking clerk)—may utilize said POS terminal system 102 to assist said purchaser 101. To avoid reiterating the above in the description that follows, reference, to a purchaser 101 utilizing a given POS terminal system 102 may apply equally to party(s) utilizing said POS terminal system 102 on the purchaser's behalf as indicated above.

A DEP Processing System 1000 may in some embodiments utilize a distributed system facility—a Payment Client 1025a—integrated with a POS terminal system 102 and operating on a POS processor 1025 and utilizing a Payment Depository 1028 to cache and/or record information—including multi-merchant tokenized EPI as described previously—related to transaction payment and/or related to other authorization requests. Furthermore, Payment Client 1025a may in some embodiments operate POS input device(s) 1022 and POS display device(s) 1024 in coordination with—but independent of—third party POS system software (not shown) running on POS processor 1025 such that said third party sourced POS system software may be isolated from information transmitted to POS display device(s) 1024 or received from POS input device(s) 1022 by Payment Client 1025a. In this way, Payment Client 1025a may interact with a given purchaser 101 to securely process said purchaser's electronic payment and/or payment related transaction in such a way that Payment Client 1025a's functioning may appear to purchaser 101 to be part of a single fully integrated POS terminal system 102.

A DEP Processing System 1000 further may in some embodiments include a payment management system 120 accessed from a given POS terminal system 102 via a communication facility 1081. As previously detailed, such a payment management system 120 may serve as a secure information repository and tokenizer. Additionally, payment management system 120 may operate as an electronic payment transaction normalizing and aggregating intermediary between POS terminal system 102 and VEP entity system(s) 105 accessed via a communication facility 1085. Payment management system 120 may provide facilities including but not limited to storage, retrieval, validation and tracking of: tokens, decryption keys, and correlations between merchant Is and group IDs.

As well as supporting processing of VEP authorization requests, in some embodiments DEP Processing System 1000 may also support processing of TCB payer authorization requests wherein payment management system 120 may utilize a communication facility 1087 to communicate with payment system(s) 106.

In some embodiment(s), VEP entity system(s) 105, may utilize communication facility 1086 to communicate with payment system(s) 106. For example, PayPal may debit a given purchase payment from a purchaser's MasterCard credit card funding account.

In some embodiments, some or all of communication facilities 1081, 1085, 1086, and 1087 may utilize common underlying facilities. For example, one or several of said communication facilities may utilize the Internet, while other of said communication facilities may utilize a common private network.

Referring further to FIG. 10, in some embodiments, Payment Client 1025a and third party sourced POS system software may each be described as a "control entity". In some embodiments, both control entities may concurrently display information on POS display device(s) 1024 thus creating a "blended display". The portion(s) of the blended display that may be sourced from Payment Client 1025a may be referred to as "payment control subscreen(s)". In some embodiments, a payment control subscreen(s) may occupy a portion of or the entire display of a given POS display device(s) 1024 and may over-write whatever was previously displayed in the affected area of said POS display device(s) 1024. The operation of the payment control subscreen(s) may be coordinated between Payment Client 1025a and POS system software so as not to unwittingly overwrite each other's display information. In some embodiments, to make such coordination easier to implement, a 'toggling' regime may be utilized whereby one or the other control entity operates POS input and display device(s) 1022 and 1024 respectively—while the other control entity may be in a 'dormant' state awaiting control to be toggled back to it. In some embodiments, as previously described. POS input device(s) 1022 may be configured to encrypt input information—including but not limited to purchaser payment credential(s) input at the reader head—such that POS system software as well as any potential malware on a POS terminal system 102 may be incapable of directly accessing such secured input information.

In some embodiments, Payment Client 1025a may concurrently operate more than one separate POS input device(s) 1022 and/or POS display device(s) 1024 to process a given purchaser 101's transaction. For example, the checking clerk's POS display device(s) 1024 may be different than a given purchaser's and may display more or different information. Payment Client 1025*a* may thus concurrently support different versions of payment control subscreens for the checking clerk and purchaser 101 respectively. For example, the checking clerk's display screen may include a photograph to help visually verify the identity of a given purchaser 101.

In some embodiments, a single device may provide facilities of both POS input device(s) 1022 as well as POS display device(s) 1024—for example a 'pen-pad'.

In some embodiments, Payment Client 1025*a* may exclusively operate POS input device(s) 1022 and/or POS display device(s) 1024. For example, more primitive devices such as legacy pen-pads may be difficult or undesirable to operate using shared control with POS system software. In some embodiments, Payment Client 1025*a* may act in part as a proxy or as a virtual device providing an indirect means for POS system software to display information on POS display device(s) 1024 and read information from POS input device(s) 1022. Such 'virtualization' of POS input device(s) 1022 and/or POS display device(s) 1024 may make it easier for a POS system vendor to upgrade a merchant's POS terminal system with different POS input device(s) 1022 and/or POS display device(s) 1024.

In some embodiments, Payment Client 1025*a* may conduct some or all of the processing of the purchaser payment credential(s) in coordination with, but independent of POS system software. The degree to which Payment Client 1025*a* may share processing of the purchaser payment credential(s) with POS system software may be determined by a pre-configured profile—a "persona"—that may be pre-configured by the appropriate third party POS system vendor and/or POS system software developer(s) supporting a given POS terminal system 102. Depending on said pre-configuration of the persona, Payment Client 1025*a* may by varying degree share purchaser payment credential(s) with or isolate purchaser payment credential(s) from POS system software—effectively providing varying levels of Payment Client 1025*a* autonomous operation and purchaser payment credential(s) security. Additionally, said persona may be pre-configured to establish the degree of coordination of control of POS processor 1025, POS input device(s) 1022, and POS display device(s) 1024 between Payment Client 1025*a* and POS system software. The levels of security provided by various Payment Client 1025*a* personas may be devised so as to be compliant with third party security audit requirements including from organizations such as PCI (not shown) as well as operators of VEP entity system(s) 105 and/or payment system(s) 106.

In some embodiments, POS terminal system 102 may obtain some or all of the EPI from the purchaser 101 utilizing POS display device(s) 1024 and/or POS input device(s) 1022 and/or from previously stored transaction information and/or other records. For example, such EPI may be stored at POS terminal system 102 within a multi-merchant token, as described previously. POS system software may provide said EPI to Payment Client 1025*a* such that Payment Client 1025*a* may acquire EPI for a given purchaser 101 and communicate such EPI to payment management system 120 via a communication facility 1081.

In some embodiments, DEP Processing System 1000 utilizing payment management system 120 may record the details of a payment transaction including but not limited to; EPI, a transaction outcome indication, i.e., 'approved' or 'declined', and an "authorization code" (if any). In some embodiments, some or all of such recorded details, or an identifier for such recorded details, may be included in a multi-merchant token. Such a multi-merchant token may be communicated to POS terminal system 102, where it may be stored as described previously. In some embodiments, to protect a given purchaser 101's privacy, portions of a given transaction record included in a token may be redacted and/or encrypted.

In some embodiments, the EPI may be encrypted in part or in full at the reader head, or otherwise within a given POS input device(s) 1022, or by POS system software prior to access to the EPI by Payment Client 1025*a*. Furthermore, in some embodiments, portions or all of encrypted EPI may not be decrypted by payment management system 120, but rather communicated in raw encrypted and/or multi-merchant tokenized form as part of a given authorization request communicated to a given VEP entity system(s) 105 or given payment system(s) 106. In some embodiments, some or all of a given multi-merchant token may be exchanged with a given VEP entity system(s) 105 or given payment system(s) 106 and may be used in subsequent authorization requests such as for a refund transaction.

Given the rapid rate of advancement and cost reduction relative to display technology, some POS terminal systems 102 may utilize relatively primitive low-pixel count monochromatic POS display device(s) 1024 while other POS terminal systems 102 may utilize high-pixel density color POS display device(s) 1024 with display screens similar to those utilized in hundreds of millions of smart phones and tablet computers. Some POS input device(s) 1022 may utilize relatively crude pressure or proximity sensing technology while other POS input device(s) may utilize 'intelligent' touch sensors that automatically translate complex sets of purchaser movements into one or a series of 'gesture command' code(s). In some embodiments, a given purchaser 101 may utilize the purchaser's own personal communication device, such as a smart phone or tablet computer, as POS input and/or display device(s)—1022 and 1024 respectively. Such an increasingly broad range of innovative POS peripheral device technology potentially inter-mixed with relatively primitive legacy devices may place unwelcome development, support and security audit burdens on numerous third party developers of POS system software. Payment Client 1025*a* may decrease such burdens by assuming some or all of the direct control of such POS input and/or display device(s), including those devices dedicated specifically to payment processing such as 'pen pads'.

In some embodiments, "purchase item(s)" (not shown), i.e., good(s) and/or services(s), may be selected and paid for by a given purchaser 101. The purchase item(s) selected by a given purchaser 101 may be scanned utilizing POS terminal system 102 to create a "ticket" (not shown) listing the purchase item(s) and the amount of payment requested to compensate the transacting merchant in exchange for said purchase item(s).

In some embodiments, the purchaser 101 may combine several forms of payment to compensate the transacting merchant for the purchase item(s). For example, purchaser 101 may combine coupon(s), store credit voucher(s) and perhaps some cash along with virtual electronic payment. In some embodiments, payment may be made via more than one of: VEP entity system(s) 105 and/or payment system(s) 106. For example, a restaurant bill payment may be split between a Google Wallet account and a Visa credit card account.

In some embodiments, Payment Client 1025*a* may be utilized to facilitate pre-authorization of a contemplated purchase. In some embodiments, such a pre-authorization transaction request may include a requested payment amount, which may approximate the payment amount of an anticipated purchase, and that may be utilized to verify that a corresponding purchase payment transaction request with a similar requested payment amount may likely be approved. For example, a restaurant owning merchant may pre-authorize the estimated cost of drinks and dinner before running a tab for a given party of diners.

In some embodiments, a purchaser 101 may 'check in' with a chosen VEP entity by utilizing Payment Client 1025*a* to select said chosen VEP entity and communicate purchaser payment credential(s) via payment management system 120 to VEP entity system(s) 105 of said chosen VEP entity. VEP entity system(s) 105 may utilize the said purchaser payment credential(s) to authenticate purchaser 101 and subsequently communicate to payment management system 120 a transaction response approving or declining the check-in authorization request. The "transaction outcome" (i.e., approved or declined) communicated in said transaction response may be communicated by payment management system 120 to Payment Client 1025*a* where said transaction outcome may be displayed to purchaser 101 via POS display device(s) 1024.

In some embodiments, the transaction response communicated from a VEP entity system(s) 105 may include a "payment entity specified" (PES) token, which may include encrypted transaction related information for which the decryption key is held exclusively by said VEP entity system(s). Similar to a multi-merchant token exchanged between a POS terminal system 102 and the payment management system 120, a PES token may be utilized in subsequent related transaction request(s) and transaction response(s)—such as for a refund transaction—wherein the PES token is exchanged between payment management system 120 and VEP entity system(s) 105 in place of corresponding clear text transaction information. In some embodiments, the transaction information included in a multi-merchant token may be the same or different from the transaction information included in a PES token. In some embodiments, a multi-merchant token may include some or all of a corresponding PES token.

In some embodiments, a purchaser 101 may present previously purchased item(s) to the merchant for a refund or for a payment adjustment. Said purchaser 101 may also provide a receipt from the original transaction or provide detail(s) of the original transaction—such as SKU, transaction date, chosen payer and/or purchaser payment credential(s). Said merchant may use one or more of such details to retrieve a record of the original transaction via POS terminal system 102. For example, a transaction identifier taken from such a receipt may be utilized by Payment Client 1025*a* in order to retrieve a corresponding multi-merchant token that may have been stored by POS terminal system 102—as previously described—as part of the original transaction. Payment Client 1025*a* may communicate said multi-merchant token—included in a refund transaction request—to payment management system 120. Payment management system 120 may decrypt said multi-merchant token to extract EPI corresponding to the original transaction and/or to extract a transaction identifier corresponding to a stored transaction record from which EPI may be retrieved. EPI extracted thusly from a multi-merchant token or retrieved from a stored transaction record may be utilized by payment management system 120 to prepare an authorization request.

In some embodiments, Payment Client 1025*a* attempting to process a refund transaction may be unable to directly retrieve a record of the original purchase transaction from POS terminal system 102—perhaps because the original purchase was made at a different location. Consequently, Payment Client 1025*a* may communicate a refund transaction—including details of the original transaction supplied by purchaser 101 and/or a receipt—to payment management system 120. Payment management system 120 may utilize said details of the original transaction to search for a corresponding stored transaction record, which may be utilized to prepare an authorization request. In some embodiments, if unable to directly retrieve such a transaction record, payment management system 120 may query VEP entity system(s) 105 and/or payment system(s) 106 to retrieve a record of the original transaction. Such a retrieved record may contain only a portion of the EPI contained in the corresponding original authorization request. Also such a retrieved record of the original transaction may include encrypted information. In some embodiments, payment management system 120 may utilize information from such a retrieved record to prepare an authorization request. In some embodiments, payment management system 120 may utilize information from such a retrieved record to search for a corresponding transaction record stored previously by payment management system 120, which may be utilized by payment management system 120 to prepare an authorization request.

In some embodiments, Payment Client 1025*a* may facilitate utilization of a display device(s) 1024 to search for and view transaction records stored by payment system 120 so as to manually locate a transaction record(s) of an original transaction(s) corresponding to an intended refund transaction. EPI from such a transaction record(s), once located, may be utilized by payment management system 120 to prepare an authorization request for a refund transaction.

In some embodiments of DEP Processing System 1000, payment management system 120 may support interfaces to various VEP entity system(s) 105 wherein said VEP entity system(s) may utilize interface schemes that may vary from VEP entity to VEP entity. POS terminal system 102.

Referring to FIG. 11, in some embodiments, a given purchaser 101 may utilize Payment Client 1025*a*, via a given POS terminal system 102, to perform payment related transactions such as: check-in, pre-authorization, purchase payment, and refund. The ordering of steps in the processing of a payment related transaction may have numerous embodiments; therefore, FIG. 11 represents an exemplary embodiment.

Referring further to FIG. 11, at step 1110. POS terminal system 102 may determine the transaction type based on input from purchaser 101 utilizing POS input device(s) 1022.

At step 1120, in some embodiments POS terminal system 102 may utilize POS display device(s) 1024 to offer a given purchaser 101 a selection of one or more tender option(s) from a set of such tender option(s) supported by POS terminal system 102. POS terminal system 102 may use POS input Device(s) 1022 to determine a given purchaser's selection of tender option(s). Tender option(s) may include but not be limited to: cash, bank check, store credit, credit card, debit card, and/or VEP. In the example of a refund—the tender type may be determined automatically based on the tender utilized in the corresponding original transaction payment.

At step 1130, in some embodiments, a given purchaser 101 may select and/or cause to be automatically selected an electronic payment tender option that requires authorization from VEP entity system(s) 105 and/or payment system(s) 106 remote from POS terminal system 102. Alternatively, that purchaser 101 may opt for one or more forms of tender that do not require such remote authorization—say cash and/or store credit voucher(s) and/or coupon(s)—in which case POS terminal system 102 may process the payment locally and the electronic payment processing services accessed utilizing Payment Client 1025*a* and/or payment management system 120 may not be required for that processing.

Referring to step 1140, in some embodiments, Payment Client 1025*a* may utilize POS display device(s) 1024 and POS input device(s) 1022 to provide a given purchaser 101 a selection of payer(s) and determine said purchaser's choice of payer. In the descriptions that follow, whichever of VEP entity system(s) 105 or payment system(s) 106 that may be selected for a given authorization request—such choice may be referred to collectively as "chosen payer system(s)" in order to avoid the repeated recitation of the payer choice options cited above.

FIG. 12 provides an exemplary illustration of a payment control subscreen 1200 offering a list of payers from which a given purchaser 101 may choose. In that example, some of the payers include TCB payers: American Express 1250, MasterCard 1260, Visa 1270 and Discover 1280; and include some VEP entities: PayPal 1220, Google Wallet 1230, and Dwolla 1240. Purchaser 101 may decide not to choose any of the payers offered by Payment Client 1025*a* and may choose instead to exit payment control subscreen 1200 without choosing a payer. An 'exit' selection 1290 may be labeled in numerous ways such as 'cancel', 'exit', 'back' or other wording or symbology that may indicate to purchaser 101 that payment control subscreen 1200 may be exited without choosing a payer.

FIG. 13 provides an exemplary illustration of a payer list configuration facility screen 1300 whereby a merchant may configure which payers are displayed in the payer choice payment control subscreen 1200. In some embodiments, the payer list configuration facility (not shown) may generate a 'payer list' that may be stored in Payment Depository 1028 of POS terminal system 102 for use by Payment Client 1025*a* at such time as a payer choice payment control subscreen 1200 may be displayed to a given purchaser 101. In some embodiments, the payment list configuration facility may be accessed utilizing POS input devices(s) 1022 and POS display device(s) 1024. In some embodiments, the payment list configuration facility may be network accessible.

The payer choice payment control subscreen 1200 and the corresponding payment interpreter configuration screen 1300 may be pre-configurable and/or otherwise modifiable for a given POS terminal system 102 via network accessed updates such that the presence, ordering, visual prominence and/or visual representation of the various payers—as displayed via payer choice payment control sub-screen 1200—may be altered by the appropriate POS system vendor and/or POS system software developer(s).

In some embodiments, the persona pre-configuration facility—utilized by the appropriate supporting POS vendor and/or POS system software developer(s)—, may additionally facilitate the pre-configuration of the payer options subsequently configured by the merchant utilizing payment interpreter configuration screen 1300 and displayed via payer choice payment control sub-screen 1200.

Referring further to FIG. 11, at step 1150, in some embodiments. Payment Client 1025*a* may determine from POS terminal system 102 the requested payment amount and include it with the EPI. For a check-in transaction, in some embodiments, the requested payment amount need not be evaluated. For a pre-authorization transaction, the requested payment amount may commonly be the amount of an anticipated future purchase and corresponding purchase payment transaction request. For a purchase payment, the requested payment amount may be the cost of the purchased item(s). For a refund, the requested payment amount may be the amount of the full or partial refund.

Referring to step 1160, in some embodiments, Payment Client 1025*a* may utilize POS display device(s) 1024 and POS input device(s) 1022 to receive payment credential(s) from a given purchaser 101. Payment credential(s) may vary depending on said purchaser's chosen payer, therefore Payment Client 1025*a* may prompt for the appropriate payment credential(s) required by said chosen payer. In some embodiments, purchaser 101 may be offered more than one facility for providing payment credential(s) and Payment Client 1025*a* may receive said payment credential(s) from whichever POS input device(s) 1022 corresponds to a given purchaser's choice of input facility. For example, a given purchaser 101 may have the choice of payment card swipe, wireless communication from personal electronic device, optically scanned input of a bar code or QR code, or manually typed credential(s) entry using a keypad. In the example of a refund, transaction identifying information may be input to POS terminal system 102 and utilized by Payment Client 1025*a* to reference stored EPI from the corresponding original transaction information record (not shown)—including purchaser payment credential(s)—that may be retrieved and utilized by Payment Client 1025*a* for inclusion in the EPI.

Given that some merchants operate multiple physical locations—for example Home Depot—a purchaser 101 may make a purchase payment at one location and subsequently request a corresponding refund at a different location of the same merchant. Payment management system 120 may facilitate such a distributed sequence of transactions by providing centrality for the storage and subsequent retrieval of transaction records.

FIG. 14 describes step 1160 in greater detail by depicting some embodiments of receiving purchaser credential(s).

At step 1410, in some embodiments, for a transaction such as a refund, EPI including purchaser credential(s) may be retrieved in part or in whole from a stored transaction information record such as for a purchase payment.

At step 1420, if a previous related transaction(s) may be identified and successfully looked up, said previous related transaction(s)' retrieved EPI—including purchaser credential(s)—may be utilized in processing the current related transaction, instead of receiving purchaser credential(s) from purchaser 101.

At step 1430, in some embodiments, purchaser credential(s) may include account identifying information or purchaser identifying information depending on requirements of the chosen payer system(s). TCB payers utilize a unique primary account number as part or all of the purchaser payment credential(s). Similarly, some VEP entities may issue a card with a machine readable PAN. Typically paired with purchaser secret information—e.g., a PIN manually entered by purchaser 101 via POS input device(s) 1022—card sourced VEP purchaser payment credential(s) may appear very much like those of a debit card. However, numerous VEP entities may require or offer a given purchaser 101 the opportunity of providing purchaser payment credential(s) without the use of a payment card—for example utilizing a key pad on POS input device(s) 1022 to enter them manually or communicating purchaser payment credential(s) from a smartphone or similar personal electronic device.

At step 1440, in some embodiments, if account identifying information may be required by the chosen payer system(s), for example a 16-digit PAN, POS display device(s) 1024 may be utilized to prompt purchaser 101 for said account identifying information. POS input device(s) 1022 may be utilized by Payment Client 1025*a* to receive the identifying information from purchaser 101.

At step 1450, in some embodiments, if purchaser identifying information, for example a 10-digit telephone number, may be required by the chosen payer system(s), POS display device(s) 1024 may be utilized to prompt purchaser 101 for said purchaser identifying information. POS input device(s) 1022 may be utilized by Payment Client 1025*a* to receive the purchaser identifying information from purchaser 101.

At step 1460, in some embodiments, purchaser credential(s) may include purchaser secret information depending on requirements of the chosen payer system(s). Some chosen payer system(s) may not require a purchaser secret. For example, some credit card payers require only the PAN acquired at step 1440 above.

At step 1470, in some embodiments, if purchaser secret information may be required by the chosen payer system(s), for example a 4-digit PIN or perhaps a 5-digit billing zip code, POS display device(s) 1024 may be utilized to prompt purchaser 101 for said purchaser secret information. POS input device(s) 1022 may be utilized to receive purchaser secret information from purchaser 101.

Referring again to FIG. 11, at step 1170, in some embodiments. Payment Client 1025*a* may communicate a transaction request to payment management system 120 utilizing communication facility 1081. Said transaction request may include EPI received from purchaser 101 via POS input device(s) 1022 and/or EPI retrieved from transaction information record(s) stored at POS terminal system 102. Furthermore, said communicated transaction request may include the choice of payer and transaction type, which may be utilized by payment management system 120 in the preparation of a corresponding authorization request to be communicated to the chosen payer system(s). In addition to information included in said transaction request, such a corresponding authorization request may be prepared by payment management system 120 utilizing EPI retrieved from stored transaction information record(s) of payment management system 120. Furthermore, in the example of a refund transaction, payment management system 120 may include a retrieved PES token in such an authorization request, which may allow the chosen payer system(s) to retrieve EPI from said PES token or from corresponding stored record(s) of previous related transaction(s). Accordingly, purchaser payment credential(s) may be included directly in EPI included in such an authorization request; and/or purchaser payment credential(s) may be retrieved from stored record(s) by the chosen payer system(s) based on information such as PES token(s) included in such an authorization request.

At step 1180, in some embodiments, an attempt to process a payment related transaction may be made on behalf of POS terminal system 102 by payment management system 120 communicating an authorization request to the chosen payer system(s).

FIG. 15 describes step 1180 in greater detail by depicting some embodiments of requesting authorization of a payment related transaction.

At step 1540, in some embodiments, payment management system 120 may determine if the chosen payer system(s) may be communicative. For example, communicativity with a given chosen payer system(s) may be verified by communicating a given authorization request and receiving a corresponding transaction response; or by separate facilities that handshake or otherwise derive an indication of active communicativity with chosen payer system(s), including but not limited to a transaction response to a prior authorization request.

If the chosen payer system(s) may not be communicative, at step 1550 in some embodiments, payment management system 120 may process a given purchaser 101's transaction request directly. For example, particularly for high-volume payers such as Visa, payment management system 120 may 'stand-in' for the non-communicative chosen payer system(s)—i.e., approve the authorization request—and subsequently 'settle' with said non-communicative chosen payer system(s) when communication may be re-established. Alternatively, payment management system 120 may simply decline the authorization request and direct purchaser 101 via Payment Client 1025*a* to select a different payer choice utilizing POS display device(s) and POS input device(s)—1024 and 1022 respectively.

If the chosen payer system(s) may be communicative, at step 1560 in some embodiments, payment management system 120 may request processing of the payment related transaction by communicating a corresponding authorization request to the chosen payer system(s). As described previously, a given VEP entity or TCB payer may have unique requirements for the communication of an authorization request. For example: specific information included with an authorization request, communication protocol(s) and/or data format(s) utilized for an authorization request, PES token(s) utilized in an authorization request and/or in a corresponding transaction response, as well as additional security procedures. In an example where purchaser 101 may have chosen a VEP entity as payer, payment management system 120 may communicate with VEP entity system(s) 105 via communication facility 1085. Alternatively, where purchaser 101 may have chosen a TCB payer, payment management system 120 may communicate with payment system(s) 106 via communication facility 1087. The chosen payer system(s) may communicate to payment management system 120 in response to an authorization request with a transaction response approving or declining said authorization request. In the example of an approval, chosen payer system(s) may communicate a confirming authorization code possibly included in or represented by a PES token.

In some embodiments, transaction responses may be returned in a different order than the order in which authorization requests may have been communicated to a given VEP entity system(s) 105 or a given payment system(s) 106. Therefore, a given transaction response received by payment management system 120 may include an authorization request identifier peering said transaction response to said corresponding authorization request. For example, such an authorization request identifier may be a multi-merchant token created by payment management system 120, or perhaps a PES token created by a VEP entity system(s) 105 or a payment system(s) 106. The specific composition and format of such an authorization request indentifier may be determined by, and therefore vary according to, requirements of a given VEP entity or TCB payer.

In some embodiments, payment management system 120 may include a given transaction response in full or in part in a corresponding stored transaction record. Payment management system 120 may generate and utilize a unique transaction identifier so as to subsequently identify and retrieve such a stored transaction record. In some embodiments, such a transaction identifier may also include identifying subcomponents generated by or associated with POS terminal system 102, payment interpreter 1025a and/or the chosen payer system(s). In some embodiments such a transaction identifier may include part or all of a multi-merchant token and/or a PES token.

At step 1570, payment management system 120 may communicate a "transaction outcome response" including a 'transaction approved' indication or a 'transaction declined' indication to Payment Client 1025a. Payment Client 1025a may determine based on said indication what sort of "outcome message" to display to purchaser 101. Additionally, in some embodiments, such a transaction outcome response may include the identifier of a corresponding stored transaction record such that said transaction record identifier may be stored by a given transacting POS terminal system 102 and/or included in ticket information used to produce a receipt for a given purchaser 101. So for example, a transaction record of an approved purchase payment transaction may be stored by payment management system 120 and a corresponding transaction record identifier may be communicated to POS terminal system 102 via a transaction outcome response and included in a given purchaser's receipt. Said purchaser 101, for the purposes of acquiring a refund, may subsequently provide said transaction record identifier from said receipt and POS terminal system 102 may utilize said transaction record identifier to request a refund transaction via Payment Client 1025a as described previously. In some embodiments, such a transaction record may include the EPI from the corresponding authorization request, which may subsequently be utilized to prepare a new authorization request corresponding to a previous transaction, as in this example—a refund authorization request corresponding to a previous purchase payment transaction. Payment management system 120 may include a copy of a corresponding authorization code in a given transaction record. Payment management system 120 may forward a copy of said transaction record to Payment Client 1025a along with or including a transaction outcome indication (i.e., approved or declined), EPI and/or other transaction identifying information that may identify the corresponding payment related transaction to Payment Client 1025a and the POS terminal system 102.

At step 1580 in some embodiments, if 'transaction approved' is indicated, Payment Client 1025a may display an outcome message to purchaser 101 utilizing POS display device(s) 1024 indicating approval of the transaction. Furthermore, Payment Client 1025a may inform POS terminal system 102 of the status of the purchaser's transaction request (i.e., approved) and may provide a copy of the confirming authorization code should the authorization request be approved. POS terminal system 102 may utilize POS display device(s) 1024 such as a printer to produce a receipt for purchaser 101 that may serve as evidence of the transaction and may include a transaction identifier that may be utilized for subsequent related transactions such as a refund.

At step 1590, in some embodiments if 'transaction declined' is indicated—Payment Client 1025a may display an outcome message to purchaser 101 utilizing POS display device(s) 1024 indicating the transaction was declined. In some embodiments, payment management system 120 may store a transaction record for a given transaction response that declines a given authorization request.

Referring again to FIG. 11 at step 1190, in some embodiments, payment management system 120 may post-process the transaction. For example, payment management system 120 may store a record of a given transaction information including the EPI and/or the corresponding authorization request and transaction response in a data base such as data tier 114 and may associate a unique transaction identifier with said record. The information thus recorded may be analyzed subsequently for utilization in supplemental activities such as a loyalty program, targeted product marketing, or otherwise to develop measurements to help manage and improve DEP Processing System 1000.

Many additions and modifications are possible. In some embodiments, a POS terminal system 102 may be comprised of more than one POS terminal at a given merchant location, wherein said POS terminals may be networked together to operate within a single POS terminal system 102. Such a POS terminal system 102 with multiple POS terminals may utilize a centralized shared Payment Depository 1028 and communication facility 1081.

In some embodiments, a given purchaser 101 may provide purchaser payment credential(s) such as for a VEP entity account or a debit card account or a credit card account prior to making any purchases. For example, a pre-authorization may be run utilizing said credential(s) to verify the likelihood of payment for purchases that purchaser 101 may be anticipated to subsequently make. A multi-merchant token may be created, as described previously, and said token may be retained by Payment Client 1025a by storing it in Payment Depository 1028. The information encoded in said token and/or referenced by it may be utilized subsequently to submit an authorization request via payment management system 120 to a chosen payer system(s) without requiring purchaser 101 to provide purchaser payment credential(s) again. Operation such as this may sometimes be utilized for 'running a tab'.

In some embodiments, DEP Processing System 1000 may support a configuration facility such that Payment Client 1025a may be configured to operate with POS input device(s) 1022 and/or POS display device(s) 1024 different from those previously operated with a given POS terminal system 102.

In some embodiments, utilizing network accessed updates, Payment Client 1025a may provide operation and control support for new and enhanced POS input device(s) 1022 and POS display device(s) 1024. For example, an enhanced POS input device may facilitate purchaser credentialing and/or authentication by bio-metric measurement and/or reception of purchaser transported or embedded identification 'tags'. Such tags may be embedded in clothing, jewelry, body enhancements, or embedded sub-dermally or deeper. Nanotechnology and biomechanical tags may be supported as well. A number of biometric technologies are already available including finger print scans, retinal scans, and facial, vocal, and speech pattern recognition. It may be within reason to anticipate DNA sequencing based identification. In some embodiments, DEP Processing System 1000 may utilize payment management system 120 to record biometric measurements made of a given purchaser 101 at a given POS. Additionally, payment management system 120 may be utilized to authenticate said measurements against biometric information associated with said specific purchaser 101 that may have been premeasured or recorded previously—possibly utilizing other POS terminal system(s) 102. In some embodiments, such premeasured biometric information may be stored by payment management system 120 or for greater security may be stored by a third party system (not shown). In some embodiments, biometric measurements may be encrypted immediately at the reader head and via end to end (E2E) encryption be utilized by payment management system 120 in an encrypted form and/or communicated securely to an aforementioned third party system. In some embodiments, such a third party system may authenticate a given purchaser against biometric pre-measurements maintained securely by said third party system. Additionally, a given purchaser may be identified by a personal device that may serve to vouch for purchaser 101 and provide authentication, credentialing, and/or geo-position updates on a periodic basis. Many scanning sensor devices that may be utilized as POS input device(s) 1022 utilize various frequencies of radiation from sound up through visible light and higher to receive signals. Some such scanning devices may operate in multiple frequency ranges and may combine numerous readings and measurements into a composite identification/authentication.

In some embodiments, Payment Client 1025*a* may include an 'auto-configuration' facility whereby Payment Client 1025*a* may use one or more input/output operations to determine the identity of a given POS input device(s) 1022 and/or POS display device(s) 1024 and having identified such device(s), Payment Client 1025*a* may automatically configure itself to configure and/or operate said device(s).

In some embodiments, DEP Processing Systems 1000 may provide and/or facilitate a credential(s) translation service whereby a purchaser may enter purchaser payment credential(s) for a different payer other than the chosen payer—for example by swiping a Visa credit card when the chosen payer is Dwolla. In some embodiments, payment management system 120 may make and/or facilitate said translation using systems and methods including but not limited to: utilizing existing transaction information records from previous transactions stored in Payment Depository 1028 and/or payment management system 120 to prepare the purchaser payment credential(s) required by the chosen payer; or querying the chosen payer and requesting said chosen payer attempt a translation based on records they have access to. Such a credential(s) translation may yield a portion of purchaser payment credential(s) and still require a given purchaser 101 to directly provide additional purchaser payment credential(s). For example, the aforementioned Visa card may be read by POS input device(s) 1022 and a given purchaser 101's Visa account number read from said card may be translated to derive that purchaser's Dwolla primary account number or account referencing number such as a ten digit phone number. In this example, purchaser 101 may be required to input the PIN required by Dwolla. To protect a given purchaser's EPI, PES tokens with encrypted account information may be exchanged between payment management system 120 and the chosen payer system(s).

In some embodiments, applicable transaction fees if any may be deducted by DEP processing system 1000 from a given transaction payment and said transaction fees may be credited to the appropriate entity such as the operator of payment management system 120 and/or a given purchaser 101's chosen payer.

In some embodiments, DEP Processing System 1000 utilizing payment management system 120 and/or Payment Client 1025*a* may act as proxy for a chosen payer so as to conduct a dynamic authentication of a given purchaser 101 using for example a challenge/response sequence based on one of several purchaser pre-configured challenge/responses.

In some embodiments, DEP Processing System 1000 utilizing Payment Client 1025*a* may provide support at the POS for more than one human natural language—for example Spanish in addition to English. Similarly, in some embodiments, spoken language support may be available for visually impaired purchasers. In some embodiments, such 'supplemental' language features may be enabled or disabled utilizing a configuration facility analogous to the payer choice selection facility exemplified by FIG. 15.

In some embodiments, Payment Client 1025*a* may incorporate facilities for network-accessed feature updates. Such updates would allow for added feature support for new transaction types, technologies and/or related devices. For example, a Payment Client 1025*a* may be updated to control a newly introduced Near Field Communications (NFC) device.

In some embodiments, Payment Client 1025*a* may coordinate display and input control via interpretable language such as XML so as to allow POS system software and/or the developers of POS system software to modify portions of the XML or augment it with CSS or similar facilities allowing changes to features, such as fonts and colors, so as to allow a close match of 'look and feel' between screens controlled by POS system software and payment control subscreens controlled by Payment Client 1025*a*.

In some embodiments, the interface(s) used by Payment Client 1025*a* to communicate and interoperate with payment management system 120 may be exposed, e.g., with ongoing documented and maintained API(s), such that POS system software developers may directly access said interface(s). In some embodiments, a given POS developer may choose not to utilize or to integrate Payment Client 1025*a* into POS terminal system 102 and may choose instead to utilize said interface(s), which may otherwise provide access to services to Payment Client 1025*a*, thus allowing POS system software to perform the equivalent functions of Payment Client 1025*a*, but with more control by POS system software over the purchaser experience and the purchaser entered data.

In some embodiments, Payment Client 1025*a* may execute as a 'native app' or as a 'web app' on individual purchasers' 101 smart phones, tablet computers, and similar network connected personal communication and computing devices (not shown). In some embodiments, such an 'app version' Payment Client 1025*a* may communicate using a mechanism such as remote procedure call to expose an APIS) to POS system software. A 'docking facility' may provide support for credential(s) exchange and tokenization so as to provide trusted peering with a given 'app version' of Payment Client 1025*a* and to provide security against threats such as 'man in the middle' attacks.

In some embodiments, an app version of Payment Client 1025*a* may 'tunnel' POS terminal system 102 utilizing encrypted communications with payment management system 120.

In some embodiments, Payment Client 1025*a* may operate on payment management system 120, for example as a body of PHP code, with a generic agent (not shown) such as a browser integrated with POS system software. In alternative embodiments, Payment Client 1025*a* may operate on a network-accessible web server.

In some embodiments, an authorization request may be prepared by Payment Client 1025*a* (rather than payment management system 120) and communicated via payment management system 120 to the chosen payer system(s).

Referring to FIG. 11, in alternative embodiments, steps 1140, 1150, and 1160 may occur in varying permutations of ordering.

In some embodiments, DEP Processing System 1000 may provide unique fraud detection, fraud suppression and/or fraud alert facilities. Payment management system 120, as an aggregation and distribution facility between numerous merchant POS terminal systems 102 and a number of VEP entity systems 105 and payment systems 106 may be uniquely situated to collect, store, aggregate, analyze and distribute information regarding both legitimate and fraudulent payment related transactions. In particular, the distributed presence of Payment Clients 1025*a* within numerous POS terminal systems 102 may provide payment management system 120 the ability to acquire fraud related data from location(s) where fraud may actually be physically committed. For example, a given Payment Client 1025*a* may operate an imaging system as part of POS input device(s) 1022, allowing an image of a fraudulent purchaser to be acquired at the POS. More sophisticated biometric measuring POS input device(s) 1022 may be able to directly identify a given fraudulent purchaser. In another example, Payment Client 1025*a* may provide a facility for a given checking clerk to 'flag' a transaction as 'possibly fraudulent' should said clerk have a suspicion about the behavior of a given purchaser 101. Payment Client 1025*a* may also provide a fraud alert facility whereby an alert may be displayed on POS display device(s) 1024 of checking clerk(s) at a POS location where a given purchaser 101 may be attempting utilization of a payment account that may be suspected to be compromised. The cumulative effect of distributing fraud vigilance facilities to physical POS locations may be to suppress fraudulent payment attempts at merchant locations.

In some embodiments, DEP Processing System 1000 may record transaction information including but not limited to: EPI, purchase ticket information, and/or POS identifying information. Such recorded transaction information may be stored by Payment Client 1025*a* in Payment Depository 1028 and/or by payment management system 120. In some embodiments, payment management system 120 may be utilized as a store for aggregations of such recorded transaction information such that such records may be retained longer than may otherwise be practical or desirable for such records to be stored at a given POS terminal system 102.

In some embodiments, DEP Processing System 1000 may utilize POS display device(s) 1024 and POS input device(s) 1022 to provide payment related services sourced from payment management system 120 directly. For example, following a check-in transaction establishing the identity of a given purchaser 101, payment management system 120 may provide electronic coupons as partial payment for a given purchase. In some embodiments, for example, DEP Processing System 1000 may thusly facilitate 'turn-key' merchant loyalty programs.

In some embodiments, the operation of Payment Client 1025*a* and/or the 'look and feel' of Payment Client 1025*a* payment control subscreens may configured after Payment Client 1025*a* may be executing on POS terminal system 102. In some embodiments, Payment Client 1025*a* may be configured via "configuration subscreens" operated by Payment Client 1025*a* utilizing POS input device(s) 1022 and POS display device(s) 1024. The resulting configuration changes may be stored utilizing Payment Depository 1028. In alternate embodiments, configuration may be facilitated via network accessible configuration software executing on a system remote and separate from POS terminal system 102—for example, the payment management system 120. Such a remote configuration system may support numerous POS terminal systems 102 such that one configuration may be applied to one or more POS terminal systems 102— facilitating configurations that may differ between POS terminal systems or may be the same for two or more POS terminal systems. In some embodiments, a given configuration configured utilizing such a remote configuration system may be stored so as to be accessible via payment management system 120 and may be communicated to a given POS terminal system 102 utilizing communication facility 1081.

In some embodiments, the payment management system 120 may encrypt a given stored transaction record and include the corresponding decryption key in a multi-merchant token communicated to the transacting POS terminal system 102. Payment system 120 may discard its copy of the plain text decryption key, such that the decryption key from the multi-merchant token may be required in order to subsequently decrypt the transaction record stored at payment system 120.

V. Additional Enhancements— Arbitraged Enhanced Payment

The Arbitraged Enhanced Payment Processing System (AEPPS) is directed to novel methods and systems for processing electronic payments including but not limited to: securing, aggregating, prioritizing, directing, payment processing and post-processing electronic payment transactions. Electronic payment transactions may include electronic payment information (EPI). The AEPPS may support virtual electronic payment (VEP) as well as credit card and debit card payment transactions. The AEPPS may augment the Distributed Enhanced Payment System, which in turn may augment a System for Multi-merchant Tokenization.

AEPPS services utilized by merchants include, but are not limited to: prioritization of transaction processing and choice of payment processor entity(s). In some embodiments AEPPS services may include advance on receivables. Numerous additional AEP services may be provided and the services provided may vary based on factors such as merchant preference, governmental regulation, and payment transaction characteristics. The arbitrage for such services may be derived in part from the differential between the cost of money for a given merchant and the cost of money for that merchant's chosen payment processor. Other factors as well may allow for arbitrage, for example, the effective cost of services or cost efficiencies derived from processing substantial volumes of payment transactions.

The speed with which a payment transaction is processed may be readily apparent to the purchaser utilizing the merchant's POS system. The speed of authorization may have a real impact on the purchaser's satisfaction with the purchase experience. Payment management entities may aggregate very large flows of payment transactions. By prioritizing the processing of some payment transactions over other payment transactions, the apparent processing time of some payment transactions may be decreased while the apparent processing time of other payment transactions may be increased. A customer-conscious merchant may pay a premium for higher priority processing, whereas a cost-concerned merchant may receive a discount for choosing lower priority processing. Other merchants may choose base-line priority processing with neither an associated premium nor a discount.

Payment management entities and payment processing entities are service intermediaries interposed between merchants and VEP payers and/or TCB payers. Each additional service provider in the payment transaction processing chain may add costs. Furthermore, the fees charged and the services provided may vary from entity to entity. Consequently, there may be incentives for a given merchant to lessen the number of such intermediaries. A given payment management entity may aggregate payment transactions and then direct the flow of such payment transactions to a third party payment processing entity rather than performing payment processing in-house. The AEPSS may provide the means for a given payment management entity to process payment transactions in-house, i.e., directing payment transactions directly to VEP payers and TCB payers thus operating as a payment processing entity and supplanting the services provided by third party payment processing entity(s). Furthermore, a payment processing entity utilizing such an AEPSS may offer payment processing services to third party payment management services and/or combined payment management and payment processing services to third party independent sales organizations (ISOs).

A given merchant may have an established business relationship with an incumbent payment processing entity and therefore may be disinclined to switch services to a payment management entity offering to provide their own payment processing services. The AEPPS may accommodate such an election by a given merchant by directing payment transactions from such a merchant to a chosen third party payment processing entity as opposed to directing them to be processed in-house or by a payment processing affiliate, thus preserving the status quo relationship with said merchant as that merchant's payment management entity rather than expanding the relationship and displacing the third party payment processing entity.

From time to time, a VEP payer(s) and/or a TCB payer(s) may undergo service outages. In such situations, so as to avoid an interruption in payment transaction processing service, a payment management entity may "stand-in", i.e., directly assume responsibility for authorizing the acceptance of a given purchaser's payment. In essence, this may serve as a form of service guarantee protecting merchants from service outages. A payment management entity may provide a similar but broader service providing an advance on receivables. Such a service in effect may stand-in regardless of a service outage by a VEP payer(s) and/or a TCB payer(s). The payment processing entity may thus take responsibility for payment to the merchant and settling the correspondingly assigned payment transaction independently with the appropriate VEP payer or TCB payer.

To facilitate discussion, FIG. 16 shows an exemplary structural block diagram of an Arbitraged Enhanced Payment Processing System (AEPPS) 1600, which in some embodiments may be utilized by a given merchant's point of sale (POS) system 102 to facilitate processing of electronic payment transactions on behalf of a given purchaser 101. In some embodiments, the AEPPS 1600 may be utilized without modifications or additions to legacy payment transaction formats utilized by POS systems 102 to transact electronic payments utilizing the AEPSS. The AEPPS 1600 may thus be compatible with legacy POS systems without requiring modifications to the hardware or operating software of said POS systems.

In some embodiments, the AEPPS 1600 may provide a facility (not shown) for pre-configuration of the AEPPS's processing of AEP. In some embodiments, the merchant's POS system 102 may be utilized to access said pre-configuration facility. In some embodiments, a separate network-accessing system (not shown)—such as a laptop computer system with web browser software—may be utilized to provide "out of band access" support for said AEPPS pre-configuration facility. Such an out of band accessed pre-configuration facility may enable older legacy POS systems 102 to transparently utilize features of the AEPPS without modification, updating or reconfiguration of said legacy POS systems.

In some embodiments, a given merchant's POS system 102 may be updated to utilize AEPPS 1600 services. In some embodiments, a merchant's POS system 102 may utilize enhancements to electronic payment transaction communication protocols (not shown) to provide "in-band access" support for the AEPPS pre-configuration facility. Such an in-band AEPSS pre-configuration facility may enable a merchant's POS system 102 to periodically revise the service configuration of the AEPPS. For example, a POS system 102 may detect an exceptionally large payment and accordingly raise the processing priority before said large payment transaction is processed by the AEPPS.

In some embodiments, such an in-band AEPSS pre-configuration facility may be additionally enhanced to provide an "immediate-mode" AEPSS configuration facility such that the service configuration information accompanying a given transaction may apply solely to that transaction. Effectively, such an immediate-mode AEPSS configuration facility may allow POS system 102 control of payment processing on a per payment transaction basis. Numerous other configuration granularities may be possible. For example, a POS system 102 may service configure a given AEPSS to process a whole class of said POS system's payment transactions in a specific way. A specified class may for example be "all payments in excess of $500" or "all American Express Card payments". The combinations of granularity and class specificity may be near infinite.

In some embodiments, AEPPS processing features that may be configured via out of band, in-band or immediate mode configuration or otherwise configured may include, but not be limited to; 1) priority processing of electronic payment transaction(s); 2) directing of electronic payment transaction(s) to a specific payment processing entity; and/or 3) advancing payment of receivables.

Referring further to FIG. 16, in some embodiments an AEPPS 1600 may facilitate access to payment services including AEP services for a given merchant's POS system 102 via a communication facility 1081 wherein said merchant has a direct business relationship with the payment management entity providing said payment services utilizing payment management system 120. Such an AEPPS 1600 may additionally provide payment services including AEP services for an unaffiliated merchant's POS system 1610 via a communication facility 1615 wherein said merchant has a business relationship with a third party ISO or third party payment management entity rather than a direct relationship with the payment management entity providing said payment services utilizing payment management system 120.

In some embodiments, a given unaffiliated POS system 1615 may utilize communication facility 1615 to communicate with a given ISO feeder system 1620. A given ISO feeder system 1620 may utilize communication facility 1625 to communicate with payment processing system 120.

In some embodiments, payment management system 120 may support a multiplicity of payment transaction communication protocols via payment service(s) 104. Such payment transaction communication protocols may utilize encryption to secure EPI and may exchange encrypted EPI, i.e., token(s), with POS system(s) 102 as described above. A tokenizer encryption service 110 may be utilized to encrypt and decrypt EPI as described above. Encryption keys and tokens may be recorded and retrieved utilizing data tier 114 as described above. Payment service(s) 104 may be augmented to support enhancements to various payment transaction communication protocols so as to support additional services such as in-band and/or immediate mode access support for AEPPS configuration.

In some embodiments, payment arbitraging servicer 1640 may facilitate AEPPS services including, but not limited to: prioritization of transaction processing, choice of payment processor entity(s), and advance on receivables.

In some embodiments, payment arbitraging servicer 1640 may support a multiplicity of payment processing communication protocols utilized for communication with third party processing system(s) 1650 via communication facility 1645. Such payment processing communication protocols may utilize encryption to secure EPI and may exchange encrypted EPI with third party processing system(s) 1650.

In some embodiments, a given third party processing system(s) 1650 may utilize a communication facility 1655 to communicate with payment system(s) 106.

In some embodiments, payment processing servicer 1640 may support a multiplicity of payment entity communication protocols utilized for communication with VEP system(s) 105 and payment system(s) 106 via communication facilities 1086 and 1087 respectively. Such payment entity communication protocols may utilize encryption to secure EPI and may exchange encrypted EPI with said system(s) 105 and/or 106.

In some embodiments, analytics 116 may facilitate post-processing services including but not limited to merchant accounting. Information required for processing by analytics 116 or resulting from analytics processing may be recorded in a data base such as data tier 114.

FIG. 17 depicts some embodiments of payment arbitraging servicer 1640. At step 1710, in some embodiments, a service control directive(s) corresponding to a given payment transaction may be retrieved so as to affect said transaction.

FIG. 18 further details step 1710. At step 1810, in some embodiments, for a given transaction, a configuration key(s) may be prepared so as to be utilized to retrieve an associated recorded configuration(s) such that said recorded configuration(s) may be utilized to control AEP services corresponding to said transaction. In some embodiments, more than one key and associated recorded configurations may be thusly utilized—for example, a key associated to the recorded configuration for a specific POS system 102 operated by a given merchant corresponding to the payment transaction and another key associated to a separate recorded configuration for all of said merchant's locations (not shown).

At step 1820, in some embodiments a given payment transaction may be considered to see if it may contain configuration information.

At step 1830, in some embodiments, configuration(s) updating information that may be contained in a given payment transaction may be considered to see if it may be intended to apply solely to the corresponding transaction. Such single use configuration(s) updating information may be referred to as "immediate mode" configuration information. In some embodiments, such immediate mode configuration information may utilized without updating recorded configuration information.

At step 1840 in some embodiments, configuration updating information contained in a transaction and utilized to update recorded configuration(s) may be recorded in a data base such as data tier 114. In some embodiments, such configuration updating information may be utilized in processing the corresponding transaction as well as to update recorded configuration(s).

At step 1850, in some embodiments, configuration key(s) corresponding to a given transaction may be utilized to determine if there may be recorded configuration(s) corresponding to said transaction.

At step 1860, in some embodiments, a configuration key may fail to facilitate the retrieval of any recorded configuration(s) and thusly a default configuration(s) may alternatively be utilized.

At step 1870, in some embodiments, a configuration key(s) may facilitate retrieval of recorded configuration(s). In some embodiments, recorded configuration(s) may be set to default(s) such that recorded default configuration(s) may be retrieved utilizing a configuration key(s) corresponding to a given payment transaction.

At step 1880, in some embodiments, the results of processing to retrieve recorded configuration(s) corresponding to a payment transaction may be considered to determine if more than one configuration information corresponding to said transaction may have been retrieved. Furthermore, such considering may include detecting immediate mode configuration information that may correspond to said transaction.

At step 1890, in some embodiments, conflicts between recorded configuration(s) and/or conflicts between recorded configuration(s) and immediate mode configuration information may be reconciled to eliminate said conflicts by determining and subsequently utilizing a reconciled configuration. For example, a recorded configuration may indicate that a corresponding given payment transaction may be assigned a payment processing priority that is lower than base-line while an immediate mode configuration may indicate that said corresponding transaction may be assigned a payment processing priority that is higher than base-line.

In some embodiments, the payment arbitraging servicer 1640 may include facilities to reconcile conflicting configuration information corresponding to a given payment transaction so as to result in reconciled configuration information. In some embodiments, different payment transactions may have different numbers of recorded configurations thusly retrieved. So for example, a given payment transaction may have a recorded configuration corresponding to a POS system 102 that sourced said payment transaction, whereas, a different payment transaction sourced say from a different merchant—may utilize a recorded configuration corresponding to said different merchant's ISO feeder system 1620 as well as a recorded configuration corresponding to said different merchant. In some embodiments, the facilities for such reconciliation may utilize rules-based logic to derive reconciled configuration information. In some embodiments, random-like or otherwise arbitrary processes may be utilized in part or in whole to derive reconciled configuration information. In some embodiments, neural networks, human or other biological systems and/or third party assistance may be utilized in part or in whole to derive reconciled configuration information.

At step 1895, in some embodiments, a service control directive(s) is retrieved utilizing configuration information corresponding to a given payment transaction. Such a service control directive(s), for example in the form of information and/or executable code, may control the services applied to a given payment transaction by or under the control of payment management system 120. For example, a service control directive may be a vector pointing to a given payment processing executable code segment. In some embodiments, in addition to being retrieved utilizing configuration information corresponding to a given payment transaction, a service control directives(s) may be enhanced utilizing analytics, signals and measurements such as communication facility congestion and least cost routing, percentage of compliance to service guarantees, accessibility of an affiliated payment processing servicer(s) or a third party payment processing system(s).

Referring again to FIG. 17, at step 1720, the prioritization of a given payment transaction is determined utilizing the corresponding service control directive(s) corresponding to said transaction. In some embodiments, such prioritization may be relative to the priority of other transactions, thus allowing a given transaction to be processed sooner or perhaps later than some other payment transaction(s) also awaiting processing. In some embodiments, such prioritization may be based in part or in whole on service guarantees that in some embodiments may utilize specific performance metrics to demonstrate compliance. In some embodiments in order to support a desired prioritization for a given transaction, said transaction may be directed to an affiliated party payment processing servicer or third party payment processing entity. In some embodiments, statistics may also be recorded to provide metrics relative to prioritization of payment transactions. Said statistics may be processed by analytics 116 and utilized to refine prioritization to attain goals such as improved service guarantee performance, lowered costs, greater processing efficiencies.

FIG. 19 further details step 1720. At step 1910, in some embodiments, the service control directive(s) for a given transaction may be considered to determine if a higher than base-line prioritization may be accorded by said service control directive(s). Such a higher prioritized transaction may be termed a "preferred" transaction.

At step 1920, in some embodiments a given payment transaction may be assigned a higher priority than base-line priority based on the corresponding service control directive(s).

At step 1930, in some embodiments, the service control directive(s) for a given payment transaction may be considered to determine if a lower than base-line priority may be accorded by said service control directive(s). Such a lower prioritized transaction may be termed a "discounted" transaction.

At step 1940, in some embodiments a given payment transaction may be assigned a lower priority than base-line priority based on the corresponding service control directive(s).

At step 1950, in some embodiments a given payment transaction may be assigned a base-line priority based on the corresponding service control directive(s). In some embodiments, base-line priority(s) may be consistent for all payment transactions or may vary between classes of transactions. A given base-line priority may remain static for long periods of time or may be adjusted on a more frequent basis. Adjustments to a base-line priority may for example be arbitrary and/or may be the result of analysis of processing metrics.

Referring again to FIG. 17 at step 1730, in some embodiments, a given payment transaction is directed for payment processing based on the service control directive(s).

FIG. 20 further details step 1730. At step 2040, in some embodiments, a VEP indicator corresponding to a given payment transaction may be considered to determine if it is a VEP transaction.

At step 2050, in some embodiments, the service control directive(s) corresponding to a given payment transaction may be considered to determine if said transaction may be processed directly.

At step 2060, in some embodiments, a given transaction may be forwarded to a third party payment processing system(s) for processing. Such a transaction may be termed a "forwarded transaction".

At step 2070, in some embodiments, a given transaction may be retained for processing—for example "in-house" utilizing payment processing servicer 1660 or by some other affiliated payment processing servicer (not shown). Such a transaction may be termed a "retained transaction".

Referring again to FIG. 17, at step 1740, a given retained transaction may be processed in-house in accordance with the service control directive(s) corresponding to said payment transaction. Such an in-house processed transaction may be forwarded to a VEP entity system(s) 105 or payment system(s) 106 as appropriate. In some embodiments, should a VEP entity system(s) 105 or payment system(s) 106 be off-line or otherwise unavailable for payment processing, payment management system 120 utilizing payment processing servicer 1660 may stand-in for a given transaction as described previously above. In some embodiments, payment processing servicer 1660 may be utilized to process a given transaction directly so as to provide a given merchant an advance on receivables. In some embodiments, a given payment transaction may be processed by a remote third party payment processing system(s) 1650 in accordance with the service control directive(s) corresponding to said payment transaction. Such a remote third party payment processing system(s) 1650 may output to payment management system 120 a transaction outcome indication (not shown) corresponding to said payment transaction.

At step 1750, in some embodiments, payment management system 120 utilizing payment service(s) 104 may return a transaction outcome indication—corresponding to a given processed transaction—to the source of said transaction, i.e., a POS system 102 or an ISO feeder system 1620.

At step 1760, in some embodiments, payment management system 120 may post-process a given transaction. For example, payment management system 120 may store a record of a given transaction information including the EPI and/or the corresponding authorization request and transaction response in a data base such as data tier 114 and may associate a unique transaction identifier with said record. In some embodiments, such a transaction record may include some or all of the configuration information and or service control directive(s) corresponding to said transaction. In some embodiments, sensitive portions of a transaction record may be secured using encryption. In some embodiments, transaction records may be utilized to generate account reports for merchants and/or ISOs. In some embodiments, transaction records may be analyzed for utilization in supplemental activities such as a loyalty program, targeted product marketing, or otherwise to develop measurements to help manage and improve transaction configuration reconciliation, transaction prioritization and transaction processing.

VI. Additional Enhancements—Expedited Automated Merchant Boarding

Expedited automated merchant boarding (EAMB) may utilize systems and methods to create an operational enhanced payment management system (EPMS) embodiment for a given newly recruited merchant customer of a payment management service provider. Such an embodiment may include a corresponding operational context within the EPMS, commonly referred to as a "merchant account". The merchant account may be utilized to support payment management services for the corresponding merchant including arbitraged enhanced payment (AEP) services as well as support for acquisition, accumulation, analysis, and recording of information that may be utilized to bring up and sustain the interoperable communication and processing of payment transactions and other related transactions between the merchant's point of sale (POS) terminal system (or systems) and the newly selected payment management service provider's EPMS.

Merchant boarding as currently practiced may be a mixture of manual and automated processes, but manual processes may be critical and mandatory parts of the overall process. The steps for merchant boarding may often be distributed across time, across multiple organizations and across multiple systems. Additionally, the order in which some steps occur may be difficult to control. Merchant boarding may be detail laden, potentially time consuming, and may require systematic consideration and complex analysis to complete. Therefore, the merchant boarding process is an excellent, but challenging, candidate for computerized system automation. With many potential obstacles to automation, any automated merchant boarding solution may require adaptability, reliance on existing automation when possible, and simple and easy to understand processes for conversion and use.

From the perspective of the payment management service provider it may be desirable to automate merchant boarding within said provider's EPMS so as to lessen the time between the merchant's decision to use that provider and the instant when services from that provider go live. For example, in situations where the merchant has a previously installed an operational POS terminal system and may be switching to a new payment management service provider, there may be a dearth of POS system installation activities to mask the time required for merchant boarding. Additionally from the perspective of the payment management service provider, automation of the merchant boarding process within the EPMS allows for economies of scale as automation costs (and benefits) may be spread over a multiplicity of merchant customers. Moreover, automating the EPMS portion of merchant boarding may help increase the quantity of new merchant customers that may be boarded concurrently to the EPMS. This may be particularly desirable during busy and time-critical commercial periods such as Valentine's Day, Halloween or the Christmas holiday.

To facilitate discussion, FIG. 21 shows an exemplary structural block diagram of an Expedited Automated Merchant Boarding System EAMBS 2100, which in some embodiments may be utilized to facilitate boarding of a newly recruited merchant's POS terminal system(s) including but not limited to POS terminal system(s) component identification and corresponding determination of pre-boarding certification, association of POS terminal system(s) to the merchant's account, risk assessment and underwriting verification, service turn-up and payment management service validation. (Note: for brevity in the description that follows, the term "POS system" is used to connote point of sale terminal system. Additionally, to avoid excess verbiage, descriptions of POS system 102 and/or communication facility 1081 apply equally to POS system 1610 and/or communication facility 1625 respectively, unless stated explicitly otherwise.)

There may be a multiplicity of POS system configurations ranging from single stand-alone POS terminals to sprawling multi-lane mega-store installations and even to geographically distributed POS systems. The equipment within a given POS system 102 may be manufactured by and further integrated by a variety of organizations resulting in the utilization of (and therefore need to support) a broad range of payment transaction communication protocols (not shown). For example, a given merchant may have multiple locations as well possibly as an e-commerce web site and each of these may utilize different system components and communicate utilizing different payment transaction communication protocol, (e.g., DSI, Global Text, Vital).

A payment transactions aggregating intermediary, such as an independent sales organization (ISO) feeder system 1620, may modify or augment transactional content exchanged with a given POS system 1610. Additionally, such an intermediary may translate payment transaction communication protocols between a given POS system 1610 and the EPMS 120. For example, the POS system 1610 may use Global Text to communicate with the ISO's feeder system 1620 and the ISO's feeder system 1620 may use DSI or ISO 8583 to communicate with the EPMS 120. More subtly, the intermediary feeder system may utilize the same protocol between both the systems 1610 and 120, but alter protocol utilization and/or transported content. (Note: regarding ISO 8583, the "ISO" in this term stands for International Standards Organization not "independent sales organization" as ISO does otherwise in the description.)

FIG. 22 depicts some embodiments of an EAMBS. At step 2210 it may be advantageous for the payment management service provider to "front load" the merchant boarding process by anticipating and preparing for merchant boarding requirements starting prior to or during the period the new merchant may be recruited. Such front loading may help the payment management service provider to offer a competitively expeditious low hassle and low surprise boarding experience for the newly recruited merchant. In particular, major time consuming processes related to EPMS-to-POS system integration and interoperability testing may be undertaken before or during recruiting of the new merchant customer.

Referring further to step 2210, such an anticipatory interoperability determination process may be termed "POS system pre-boarding". In some embodiments, POS system pre-boarding may be conducted in concert with POS developers and/or POS vendors. It may involve sharing interoperability specifications and conducting compliance reviews and testing such that various embodiments of POS systems 102—including hardware, software and communication facilities—may be determined in advance to be interoperable with the EPMS 120.

FIG. 23 further details step 2210. At step 2310, in some embodiments, a payment management service provider may consider the POS system 102 of the prospective merchant customer to determine if it may include POS system component(s)—such as a POS input device 1022, a POS output device 1024, or a POS processor 1025—that may require pre-boarding. A POS system component may require pre-boarding because this may be the first pre-boarding attempt, or perhaps it may have been pre-boarded previously, but at a different upgrade version level.

Referring to FIG. 21 as relates to step 2310, in some embodiments an ISO feeder system 1620 may be interposed, between the prospective merchant customer's POS system(s) 1610 and the payment management service provider's EPMS 120. Such an ISO feeder system 1620 may have already have been pre-boarded, but in the instance of a newly recruited ISO, such an ISO feeder system 1620 may require pre-boarding in addition to the merchant's POS system 1610. For example, pre-boarding for such a newly recruited ISO may include verifying correct interoperation between ISO feeder system 1620 and EPMS 120 such that the payment management service provider may perform "stand-in" authorizations on behalf of the ISO.

At step 2320, the payment management service provider may include in the pre-boarding process the assessment of POS system component(s). Such assessment may be conducted in cooperation with the merchant's POS developer and/or vendor. The assessment may include but not be limited to sharing and reviewing: interoperability specifications, sample code known to interoperate with EPMS 120, POS system component design specifications and code segments. Additionally, the assessment may include but not be limited to: joint design and code walkthroughs, POS system integration planning, and planning for third party certifications such as Payment Application Data Security Standard (PA-DSS).

At step 2330, POS system pre-boarding may be further leveraged by providing POS system technology—including but not limited to software, hardware and system integration assistance, development tools and test facilities—that may be utilized by POS system developers to integrate "turn-key" system components (not shown) that may reliably interoperate with the payment management service provider's EPMS 120. The turn-key system components may be provided by the payment management service provider as part of an embodiment of a distributed enhanced payment (DEP) processing system 1000 as described previously above. Utilizing facilities such as encryption and EPMS-sourced POS display content insertion, security related system functions and facilities may be shifted away from the POS system 102 and to the payment management service provider's EPMS 120. The corresponding technical burden, time investment, and testing cost for third party certifications such as PA-DSS may thusly be shifted from individual POS developers to the payment management service provider. In some embodiments, the payment management service provider may provide similar turn key technology and technical assistance to a payment aggregating intermediary such as an ISO such that the ISO's feeder system 1620 may securely exchange payment transactions with the payment management service provider's EPMS 120 in such a way as to similarly off-load the burden of third party certifications.

At step 2340, the payment management service provider may test a given POS system component to assure that the POS system component may be interoperable with the payment management service provider's EPMS 120. Testing may also be conducted to assess likely compliance with PA-DSS and/or similar security requirements. Testing may be automated utilizing test scripts, which may for example be written in markup language such as XML. Test facilities including test scripts may be made available by the payment management service provider to POS developers/vendors to facilitate EPMS interoperability testing prior to POS system component testing by said payment management service provider.

At step 2350, a POS system component may successfully pass testing for interoperability with the payment management service provider's EPMS 120. Such a successfully tested POS system component may be termed to be "EPMS certified" and may be included in a list of EPMS certified, i.e., pre-boarded, POS system components. Such a list may be recorded, say on data tier 114, for subsequent automated retrieval. There may be more than one level of EPMS certification. For example, one level of certification may be "EPMS interoperable" whereas a different level of certification may be "EPMS interoperable and PA-DSS pre-screened". Additionally, such a list may include "auto-boarding signature" information such that a POS system component may be subsequently auto-boarded by the EPMS 120. For example, subsequently during auto-boarding, such auto-boarding signatures from the EPMS certification list may be compared by the EPMS 120 against auto-boarding information received from the POS system 102. This may be done in order to search for a EPMS certification list match for the POS component.

In some embodiments, a "virtual composite component" may be tested. For example, such a virtual composite component may be a specific make/model/version POS input device 1022 operating behind an interposed POS processor 1025, wherein the specific make/model/version of the POS processor may alter the apparent behavior of the POS input device as measured at the test communication interface (not shown). Such a test communication interface may emulate and/or utilize the communication facility 1081 or 1625 of the EPMS 120. Virtual composite components may be composed of multiple devices and/or systems to an arbitrary depth. Pre-boarding a previously untested POS system component may be an iterative process wherein the component itself may be tested as a stand-alone POS system component and then as one or more virtual composite components. Consequently, virtual composite component testing may allow numerous potential POS system component configurations to be pre-boarded. Such pre-boarded configurations may range for example from a single stand alone POS terminal (not shown) to a multi-device multi-vendor POS system (not shown) integrated with an ISO feeder system 1620.

Referring again to FIG. 22, at step 2220, a merchant account may be established within EPMS 120 for the newly recruited merchant. New merchant customers may be recruited directly by the payment management service provider or via a variety of intermediaries including but not limited to ISOs and POS system developers and vendors.

Referring further to step 2220, the initial information acquiring dialog with a prospective merchant customer for payment management services may be conducted for example by an ISO. A given ISO may be disinclined to directly expose automated merchant account records, e.g., CRM records, to the EPMS of the payment management service provider. This may be motivated by security concerns or may simply be due to the lack of manpower to implement such an interface to the EPMS 120. Accordingly, the release of new merchant account information may be manually initiated, perhaps by posting records on an FTP server or emailing a spreadsheet. Or for some ISOs the release of new merchant account information may be automatic. Regardless of the approach, automating the transfer of merchant account records to the payment management service provider's EPMS 120 may be a straight forward technical exercise well understood by one skilled in the art. In some embodiments, the payment management service provider may supply application programming interface (API) specifications, sample code, loadable software (e.g. binary files), documentation, and testing assistance to facilitate the automated transfer of merchant account information in a pre-determined record data format to the EPMS.

FIG. 24 further details step 2220. At step 2410 in some embodiments, the EPMS 120 may receive merchant account information for the prospective new merchant customer. Such information may be received from an ISO or other third party. Or the EPMS 120 may obtain merchant account information directly from the prospective merchant customer utilizing an account servicer 2110, which for example may be accessed remotely facilitated by any of a multiplicity of technologies including but not limited to: a POS system, a mobile device application or a web-accessed application. Furthermore, the account servicer 2110 may be utilized during and subsequent to merchant boarding to monitor the progress of merchant boarding and more in general monitor merchant account status. In addition to monitoring, the account servicer 2110 may also be used to modify, correct and/or update merchant account information during and subsequent to merchant boarding. So for example the merchant may utilize the account servicer, facilitated perhaps by a web-accessed application, to modify the "service set", i.e., the payment management services provided to the merchant via the EPMS 120. Additionally, subsequent to successful merchant boarding, the merchant may utilize the account servicer 2110 to view payment transaction information including but not limited to associated debits and credits to the merchant's settlement account. In some embodiments, third parties such as POS developers may access the merchant's account via the account servicer 2110 on the merchant's behalf.

Referring further to step 2410, merchant identifying information, which may be included in the merchant account information, may be key to creating a new merchant account; subsequently accessing the merchant account; as well as helping secure access to the account. Examples of merchant identifying information may include but not be limited to: social security number, tax payer ID, date of birth and mother's maiden name. More mundane information such as business address, zip code, email address and telephone number may also be included in merchant identifying information. The EPMS 120 may also supplement the merchant identifying information with synthesized merchant identifying information such as a merchant account user name and a user account password. Portions of the merchant account information may be scanned and received electronically in a manner similar to the popular "digital snapshot" depositing of checks, which utilizes the camera of a smart phone. In this way information such as the merchant's business name, address, telephone number, settlement account routing number and corresponding account number may be read from a check or deposit slip. Merchant account information may also include but not be limited to POS terminal system descriptive information pertaining to the merchant's business facilities such as the count of POS system(s), POS system location(s), POS system lane(s) and POS system operators (e.g., check-out clerks, managers, maintenance technicians). Merchant account information may also include identification of the service set selected for and/or by the new merchant customer. In some embodiments, merchant account information may include information associating the merchant with one or more other merchants so as to share utilization of multi-merchant tokenized information between the merchant and those other merchants.

FIGS. 26a and 26b provide exemplary screen shots utilized for inputting and displaying portions of merchant account information.

Referring further to FIG. 24, at step 2410, the EPMS 120 may receive merchant account information that includes "archival payment transaction records". The new merchant customer may have access to a multiplicity of such archival payment transaction records resulting from relationship(s) with one or more payment management service providers and/or other payment processors prior to the relationship with the new payment management service provider of EPMS 120. Archival payment transaction records may be encoded without encryption. However, such unencrypted archival payment transaction records may have been recorded in a format different from the format of payment transaction records utilized by the EPMS 120. For example, an archival payment transaction record may have been formatted with a different ordering and sizing of its record fields. Reformatting archival payment transaction records may require processes including but not limited to: reordering the record fields, resizing a record field(s), translating encoding of data within record field(s), deleting any extraneous record field(s) and synthesizing content of data record field(s) not present in a given archival payment transaction record. For example, the archival payment transaction records may be accessible to the POS system 102 and therefore the payment transaction information within them may be extracted, reformatted and communicated via communication facility 1081 for further utilization by the new payment management service provider's EPMS 120 for subsequent new payment transactions such as returns. Such received archival payment transaction records may be tokenized by EPMS 120 (similar to a newly received payment transaction as exemplified by FIG. 10 and described previously above) with an encryption key (which may facilitate subsequent decryption for example via the hardware security module 108) and an encrypted transaction separately recorded and a token returned to the POS system 102 corresponding individually to each of the archival payment transaction record(s) received by EPMS 120. In some embodiments, the tokens returned may be encrypted utilizing the tokenizer encryption service 110. Also, in some embodiments two or more archival payment transaction records may be received by EPMS 120 in a single "batch". Accordingly, EPMS 120 may transmit a "batch tokenization" response of two or more batched tokens to the POS system 102 with a corresponding token for each of the batched archival payment transactions. Additionally, as with any token(s) transmitted by EPMS 120 to POS system 102, each token returned in a batch response or individually may include a primary account number and an expiration. Furthermore, any such tokenization response by EPMS 120 to received archival payment transaction(s), whether received batched or individually, may utilize multi-merchant tokenization such that each returned token additionally includes a group ID.

At step 2420, the EPMS 120 may create a merchant account by assigning a unique merchant account number to the new merchant customer and by recording said account number in addition to the merchant account information the EPMS has received—perhaps on a data tier 114 within the EPMS 120. Sensitive merchant account information such as account identifiers, date of birth, social security number and tax payer identification number may be recorded in an encrypted form. A group ID may be assigned to the merchant account so as to facilitate multi-merchant tokenization and in some embodiments the group ID may be included in the merchant ID. The group ID associates two or more merchants in such a way that they may share in the utilization of multi-merchant tokens corresponding to their common group ID. Merchant logs may be created; and the merchant ID and any such group ID may be recorded in the merchant logs. The group ID may be updated. For example the merchant may enter their business into a larger multi-merchant franchise organization. Any updated group ID may be recorded in the merchant logs as well.

Referring further to step 2420, a POS terminal system ID may be assigned and unique POS operator identifiers may be created for each of POS system operators 2101 (e.g., check-out clerks, managers, merchant, service technicians, etc.)

and corresponding log-on credentials (e.g., passwords). POS system lane IDs may also be created corresponding to each POS terminal system check-out station. A data base—perhaps recorded in data tier 114—may include merchant configuration information such as various POS terminal system related IDs. Furthermore, merchant account information, for example merchant settlement account identifying information, may be included in such merchant configuration information. Identifiers including but not limited to merchant ID, group ID, POS terminal system ID, POS operator identifiers and POS system lane IDs may be transmitted by the EPMS 120 to the POS system 120 so that such identifiers may be utilized subsequently in payment transactions and other communications exchanged between the POS system and the EPMS. In some embodiments, prior to or during the merchant boarding process, EPMS 120 via account servicer 2110 may provide a facility whereby the merchant (or merchant's agent, e.g., ISO or POS developer) may "reserve" specific identifiers—including but not limited to merchant JD, POS terminal system ID, POS operator identifiers (including user names and passwords) and POS system lane IDs. The EPMS 120 may verify the appropriate construct and other characteristics (e.g., uniqueness) of such identifiers and if acceptable to the payment management service provider may record the identifiers (say in data tier 114) such that they may be created/assigned utilizing the reserved values at such time as the merchant may be subsequently boarded. Reserving such identifiers also serves to prevent them from being assigned to other merchants.

At step 2430, the EPMS 120 may verify that the new merchant customer has been risk-assessed and has been awarded underwriting approval. Such risk assessment and underwriting may be performed by the payment management service provider (for example to allow in-house payment processing service) or by a third party payment processor such as Global Payment Systems. From a technical perspective, such assessment and approval may be conducted by an expert system and be fully automated, but as a matter of business practice it may include some component of human-conducted assessment and approval. However, even with a partially manual approach, automation may assist the process. For example, the merchant's archival transaction records plus payment transaction records and credit performance records of similar merchant customers may be analyzed by EPMS 120 to synthesize an experience-based assessment of likely risk. Additionally, supplemental data and assessments may be obtained from one or more third-party credit rating agencies such as TransUnion. Therefore automated analysis may be used to assist (or potentially supplant) humans in making the final risk assessment and underwriting approval decision(s). Assessment and underwriting approval information, including an indicator of acceptance or denial, may be recorded in a data base such as data tier 114 where it may be verified by the EMPS 120.

At step 2440, the payment management service provider may review the payment services selected for utilization by the new merchant customer. Such a review may be conducted with the merchant directly as well as with third parties such as an ISO or a POS system developer or vendor who may be familiar with the merchant's requirements or intended POS system utilization. Such a review of said requirements and utilization may lead to the revision of the set of selected services that may be provided for the new merchant. Any such revision in selected services may be recorded as an updated service set utilizing a facility such as a data tier 114. Certain of the selected payment management services or combinations of such services may correspond to cost differentials such that those services may be subject to arbitrage and may be provided utilizing the facilities of the EPMS's payment arbitraging servicer 1640. In some embodiments, the service set review process may be automated facilitated by the account servicer 2110.

FIG. 25 further details step 2440. At step 2510 in some embodiments, "blended cost" profiles may be displayed that may assist the merchant (and/or merchant agent(s) such as a POS developer or an ISO) in reviewing the service set selected for the merchant. Such a review may be concerned with the cost of the service set and what alternative cost-benefit trade-offs may be available to the merchant. The cost of utilizing a given service set may be transaction dependent. Fees may accumulate on a services-per-transaction basis and may vary based on the characteristics of the subject transactions. The multi-transaction cumulative cost to the merchant may result from a blend of payment transactions processed and the corresponding fees for the services applied, i.e., the "blended cost". As an example, blended cost may be computed by averaging numerous transaction fees over the count of corresponding transactions. So for example, blended cost may be calculated as the average service fee per transaction over a three month time frame. It may be apparent to one skilled in the art that the time frame for such a calculation may be shortened or lengthened depending on desired determination of correspondingly shorter or longer term cost trends, histories and projections. By way of analogy, one may think of the charts produced on a financial web site where the yield (cumulative loss/gain plus blended costs) of a mutual fund may be viewed utilizing various timeframes. A blended cost profile may be devised in a multiplicity of ways so as to represent blended costs in such ways as to provide insight into those blended costs, including but not limited to the source, nature and/or composition.

It may be a complex task to project the future blended costs of the merchant's service set. As may be the case with the above mutual fund yield graphing analogy, having an index (or indices) to compare against may be desirable. A payments management service provider may have a multi-year data store of processed payment transaction records for a multiplicity of merchants. Such a data store may be processed to compute blended cost indices based on various subsets of stored transactions. So for example, the EPMS 120 may compute a 1-year "Chinese take-out restaurant" blended cost index so that the merchant who owns a Chinese take-out restaurant may get some idea of what competitors pay in blended costs. Such indices may in turn be utilized in establishing a "blended cost target".

A blended cost index may be decomposed so as to display the constituent fees and the corresponding services that generated the fees. In other words, a service set may be displayed in such a way as to characterize the nominally 'typical' service set corresponding to a given blended cost index. Such a service set decomposing display may be compared against the merchant's current service set, which may be similarly decomposed and displayed. In one embodiment, such service set cost decompositions may be represented as pie charts wherein the different pie slivers represent services and the volume of a sliver represents the corresponding 'normalized' fee cost. It may be apparent to one skilled in the arts that a multiplicity of techniques for normalization may be applied (e.g., mean, median, weighted average, etc.).

Displaying blended cost indices may be especially useful to a new merchant customer since the merchant may not have an established fee history with their newly selected payment management service provider. However, any merchant's archival payment transactions received by the EPMS 120 may be utilized to synthesize an 'as if' fee history for the merchant as if the merchant had processed those archival payment transactions with the newly selected payment management service provider. Such a synthesized fee history may then be further decomposed for analysis and represented utilizing blended cost profiles, which may be compared against various blended cost indices.

At step 2520, having displayed various blended cost profile(s) and/or blended cost index(s), the merchant or the merchant's authorized agent(s) may utilize EPMS 120 via the account servicer 2110 to select a "strawman" service set such that corresponding projected blended cost profiles may be displayed for a given strawman service set. This may allow the potential cost impact of various revised service sets to be considered so as to assist in selecting a newly revised service set for the merchant (or reinforcing the retention of the merchant's current service set selection).

A key underlying cost of payment processing is fraud loss and prevention. A potential level of risk may nominally be ascribed to a given payment transaction based on the quality and quantity of purchaser identifying information included in the transaction's electronic payment information (EPI). Such purchaser identifying information that may be utilized to limit fraud risk may be termed "risk mitigating information". In some embodiments, the EPMS 120 may display blended cost profiles with costs associated with risk mitigating information specifically detailed. Consequently, the merchant may revise the service set so that the EPMS 120 may utilize greater or lesser quantities of risk mitigating information included in the EPI for the processing of a given payment transaction. So for example, the account servicer 2110 may facilitate the selection of one or more types of "risk mitigating information" that may be included in a payment transaction request corresponding to a specific service(s) within the service set. Correspondingly, at the time of acquiring payment information from the purchaser, the merchant (or the merchant's POS system) may request additional information from the purchaser such that the POS system may include it in the payment transaction. For example, if the merchant is accepting payment by phone, a CCV code may be requested; or at a gas station, the POS terminal in the pump may request a zip code.

At step 2530, having considered various strawman service set revisions, the EPMS 120 via account servicer 2110 facilitates the confirmation of the service set selected by the merchant or the merchant's agent(s) to be utilized by EPMS 120 to provide payment management services. Furthermore, subsequent to merchant boarding, the merchant may similarly review and revise the service set repeatedly as desired. In some embodiments, the merchant may be charged a fee by the payment management service provider for revising the service set.

In some embodiments, the EPMS 120 may include transaction cost information in some or all transaction responses to the merchants POS system 102. For example, each payment transaction response may include transaction cost information specific to that transaction. In another example, a payment transaction response may include transaction cost information that corresponds to more than one of the merchant's transactions perhaps in the form of a cost average. Additionally, a payment transaction response may also include transaction cost information derived from the payment transactions of other merchants. The transaction cost information included in transaction responses may be utilized by communication intermediaries such as ISO feeder system 1620 and/or by POS system 102 to record, analyze and display accumulated cost information to the merchant (or merchant agent). The POS system 102 as part of a distributed enhanced payment (DEP) processing system may receive down-loadable technology from the EPMS 120 such that the POS system 102 may display blended cost profiles utilizing transaction cost information recorded at the POS or down-loaded from the EPMS or both. Furthermore, the POS system 102 via account servicer 2110 of EPMS 120 may facilitate reviewing, revising and updating of the merchant's service set. A merchant agent such as a POS developer may aggregate transaction cost information corresponding to multiple merchants in order to analyze transaction cost trends. The merchant may be charged a service fee by the payment management service provider for providing transaction cost information.

At step 2540, having received confirmation of the service set, EPMS 120 may transmit "transaction guidance" to POS system 102. Such transaction guidance may include but not be limited to information that indicates risk mitigating information that may be included in payment transactions such that the merchant may gain access to potentially more favorable transactions fees. Transaction guidance may similarly be utilized by communication intermediaries such as ISO feeder system 1620 so as to facilitate communication of risk mitigating information from POS system 102 to EMPS 120.

The acquisition and communication of risk mitigating information in a given payment transaction may be a distributed process potentially involving the POS system operator 2101, POS system 102, communication intermediary(s) (e.g., ISO feeder system 1620), and the EPMS 120. Therefore, revising the service set may be necessary, but not necessarily sufficient in altering the risk mitigating information utilized by the EPMS 120 in effecting processing of a given payment transaction. For example, an additional item of risk mitigating information may be the purchaser's driver license number (DLN). Typically, a DLN may not be encoded onto a payment card; therefore some level of POS system operator 2101 involvement may be required to separately input the DLN. Additionally, the POS system must both support a means to input the DLN and also encode the DLN in the EP of a corresponding payment transaction. Such encoding must be interoperable with communication intermediaries and with the EPMS 120. Furthermore, communication intermediaries must forward the EPI-encoded DLN without adulterating it or filtering it out. And the EPMS 120, must include the DLN as part of the payment transaction request utilized to initiate payment processing.

The payment management service provider, may utilize the facilities of the EPMS 120 as a distributed enhanced payment (DEP) processing system to propagate down-loadable technology to DEP-compatible POS systems so as to support reception and utilization of transaction guidance and/or the inputting and encoding of risk mitigating information. Additionally, the payment management service provider may propagate risk mitigating information acquisition technology "out of band" to POS developers and vendors and to communication intermediaries—for example in the form of source code software and API documentation.

The merchant's blended costs for payment transactions may be altered and perhaps lowered utilizing "cost sharing partnership(s)" whereby one or more additional parties shares in bearing a portion of the blended cost of (and perhaps the revenues of) a given payment transaction. Potential cost sharing partners may be parties who have an interest in the merchant's utilization of payment management services including but not limited to: the payment management service provider, ISO, POS developer, POS vendor, payment processor. TCB and VEP payers, Cost sharing may for example be in the form of discount(s), rebate(s) and/or revenue sharing. So for example, a VEP payer may share a portion of any given transaction cost wherein the corresponding payment transaction utilizes that VEP payer's services. So further by example, a VEP payer (say Dwolla) pays a portion of the merchant's cost for any transaction that utilizes that VEP payer for purchase payments. Such a cost sharing partnership may motivate the merchant to utilize and or participate in promoting the services of a given cost sharing partner.

In some embodiments, cost sharing partner(s) may include one or more non-merchant-vendor third parties such as charities or promotional organizations. So for example a charity may become a cost sharing partner of the merchant in exchange for the merchant requesting donations for that charity from purchasers. Such purchaser donations may be facilitated at the merchant's point of sale similar to a purchase and may perhaps share a payment transaction with a given purchase. In some embodiments, such a payment transaction may be partially or fully automated by the merchant's POS system. Technology to facilitate such automation may be propagated utilizing the distributed enhanced payment (DEP) facilities of the EPMS 120. There may be a multiplicity of cost sharing formulas, well known to one skilled in the arts, which may be applied to transaction cost sharing partnerships with merchant customers of payment management services. The EPMS 120 may facilitate a given cost sharing partnership by applying the corresponding cost sharing formula(s) so as to determine the share of costs (and or revenues) effecting each of the parties of the cost sharing partnership. Additionally, the EPMS 120 via the payment arbitraging servicer 1640 may facilitate the electronic brokering of individual cost sharing partnerships in such a way as may create a market for cost sharing partnerships. In some embodiments, a given cost sharing partnership may be applied to a non-blended cost or costs. Additionally, in some embodiments, the merchant may enter into one or more cost sharing partnerships. Therefore, one or more cost sharing partnerships may apply to a given payment transaction. Furthermore, the applicable cost sharing partnerships may vary from transaction to transaction of the merchant.

Referring again to FIG. 22 at step 2230, "auto-boarding" refers to systems and methods whereby the EPMS 120 may identify one or more components of the merchant's POS system 102 so as to facilitate successful interoperation between EPMS 120 and POS system 102. A given component of the POS system 102 may be apparent to the EPMS 120 due to auto-boarding information that the POS component (or an intermediary) transmits to the EPMS 120. The auto-boarding information may be compared by the EPMS 120 against pre-boarding EPMS certification list records so as to confirm any pre-boarding of that component type. Thereby, it may be determined whether or not the detected POS system component may be presumed to be interoperable with the EPMS 120. Additionally, the received auto-boarding information may include (or imply) the POS system component's version information so as to determine that the POS system component has been upgraded to a known interoperable version level as indicated by pre-boarding certification list records. If not so upgraded, the POS system 102 may be upgraded so as to achieve an interoperable version level. In some embodiments, such an upgrade process may be automated, for example via a down-loaded software upgrade. Also, such an upgrade process may be part of a DEP processing system 1000 (as detailed previously above). In some embodiments, one or more upgrade versions may await pre-boarding, therefore a POS component may be downgraded to a known interoperable version level until such time as additional upgrade version(s) pass EPMS certification.

Referring to FIG. 10 (detailed previously above), so as to further illustrate step 2230, in some embodiments a POS system 102 may be comprised of one or more POS system components. For example, POS system 102 may include POS input device(s) 1022, POS output device(s) 1024 and POS processor 1025. POS processor 1025 may operate as a communication intermediary for POS input device(s) 1022 and POS output device(s) 1024. In some embodiments, POS processor 1025 may operate as a communication proxy for such POS component (s) in such a way that only Electronic Payment Information (EPI) from those POS component(s) may be forwarded to the EPMS 120. In a similar fashion, an ISO feeder system 1620 may facilitate direct or proxied communication between a given POS system 1610 and the EPMS 120. Regardless of the operation of POS processors and ISO feeder systems as communication intermediaries and potentially as proxies, EPI may be communicated via a given POS input device within a given POS system, and via (an optional) ISO feeder system, so as to be communicated to EPMS 120 with the EPI preserved. Consequently, regardless of the interposition of such communication intermediaries, the EPI content of a payment transaction effectively may tunnel all communication intermediaries. Therefore, such EPI content may provide an unobstructed signal path from a given POS input device 1024, or from a given POS system 102, to the EPMS 120 such that that signal path may be utilized to facilitate auto-boarding by encoding auto-boarding information in the EPI of payment transaction(s). Such auto-boarding information (effectively masquerading as EPI) may be passed unobstructed by intermediaries, but may be detected and determined by the EPMS 120 to be auto-boarding information rather than the EPI of a legitimate payment transaction. Therefore, existing payment transaction communication protocols may be utilized without modification or extension to support auto-boarding.

FIG. 27 further details step 2230. At step 2710, the EPMS 120 may receive a payment transaction including EPI wherein that EPI includes auto-boarding information (as opposed to EPI representing a legitimate payment transaction). For example, a specially devised payment card with auto-boarding information in the card's magnetic reader strip may be scanned at a POS input device 1022 so as to communicate such EPI-encoded auto-boarding information to the EPMS 120 in order to facilitate auto-boarding by the EPMS. Additionally, auto-boarding information may also be entered manually, for example via a PIN pad of a POS input device 1022. In some embodiments, a given POS system component—say a POS output device 1024—may lack the facility to transmit transactions to the EPMS 120 in such a way that said component may be apparent to the EPMS 120. Nonetheless, such a "non-transacting" POS component may be auto-boarded. For example, a payment transaction including EPI-encoded auto-boarding information may be generated utilizing a mag-strip "auto-boarding card" read via a POS input device 1022. In that way, such a POS input device 1022 may be made manually to proxy in the auto-boarding process for one or more non-transacting component(s).

Clearly a multiplicity of EPI encodings of auto-boarding information may be readily apparent to one skilled in the arts. For example, a payment transactions including the auto-boarding information of a POS system component may be synthesized by a POS processor 1025 rather than reading it from a POS input device 1022. In some embodiments, the information contents of transactions other than payment transactions may be utilized to facilitate a signal path to convey auto-boarding information to the EPMS 120. Furthermore, auto-boarding information may be communicated utilizing mechanisms (in part or in full) other than existing payment transaction communication protocol implementations. For example, auto-boarding information may be communicated utilizing adaptation and/or extension of ISO 8583. However, a given legacy POS component—particularly if operated without an intermediary acting as a proxy may lack support for such protocol adaptations or extensions. Additionally, interposed communication intermediaries such as an ISO feeder system 1620 may alter or filter such auto-boarding information.

Automating the EPMS side of the POS system boarding process, i.e., auto-boarding, may be immediately attainable based solely on the initiative of a given payment management service provider, whereas automating the POS side of the POS system boarding process may require the coordinated initiative of POS system vendors, POS developers, and merchants who may need to contemplate discarding legacy POS system components that may lack support for automatic POS system side boarding. Additionally, the operation of interposed payments aggregating feeder systems as communication intermediaries may further complicate and delay such automation. Nonetheless, an EPMS side auto-boarding solution may interoperate with newly developed or enhanced POS systems such that the whole process—both EPMS side and POS system side—may be fully automated.

At step 2720, a given POS component identified by auto-boarding (at step 2710 above) may be checked against a list of pre-boarded POS components to determine if said component may have been EPMS certified for interoperation with the EPMS 120 as previously detailed above at step 2210.

At step 2730, a given POS component identified by auto-boarding (at step 2710 above) and checked against a pre-boarding certification list (at step 2720 above) may be determined to be absent from said list. In some embodiments, the payment management service provider may undertake to certify such a non-certified POS system component such that it may subsequently be auto-boarded. Such a post-merchant-recruitment certification effort may be time consuming and may potentially result in an extended inability to certify EPMS interoperability with said component. In some embodiments, such a lack of certification may require the exclusion or replacement of a non-certified POS system component or may require a carefully considered manual over-ride of auto-boarding for that non-certified component. Sub-optimal auto-boarding outcomes may potentially be avoided by considering the POS system component make-up of each prospective new merchant customer so as to expeditiously identify non-certified POS system components well in advance of the auto-boarding process. Auto-boarding may operate as a fail-safe mechanism should such precautions fail. In some embodiments, auto-boarding may be performed one or more times—as new POS system components may be integrated as part of the installation of a POS system—up to the point where all new POS components may be successfully auto-boarded. In some embodiments, an auto-boarding emulation or "dry-run" facility may be included as part of the pre-boarding testing described previously at step 2210.

In some embodiments, a POS processor 1025 or an ISO feeder system. 1620—interposed between a given POS system component and the EPMS 120—may serve as a proxy for said POS system component such that the operation of said system component may effectively be masked from the EPMS 120. Such an interposed proxy, perhaps filtering and/or translating transactions between said system component and the EPMS 120, may render moot any issue of direct pre-boarding certification of said system component by essentially virtualizing and therefore altering said component's apparent operation from the perspective of the EPMS 120. So for example, a POS processor 1025 may proxy for a non-certified POS input device 1022 such that payment transactions sourced from said device 1022 appear to the EPMS 120 to be sourced from a certified POS system component device or from a pre-boarded virtual composite component as described previously above. Conversely, in this example, POS processor 1025 may proxy for the EPMS 120 such that payment transaction responses sourced from EPMS 120 may be made compatible with said POS input device 1022. Such proxied virtual device operation may sometimes be referred to as device emulation and may use techniques such as spoofing that well understood by one skilled in the art. Consequently, changes made to an interposed communication intermediary may be adequate to create a "work-around" solution to problems with pre-boarding certification of a given POS system component. In other words, rather than altering the direct operation of the component, alter its apparent proxied operation. This may be a preferred approach for "orphaned" legacy devices that may be poorly supported or not supported at all or that may be deemed not worth upgrading.

At step 2740, upon auto-boarding the POS system components of the POS system 102, EPMS 120 may record a roster of said POS system components (with successfully auto-boarded components indicated as such). In some embodiments, that roster may be recorded and subsequently retrieved utilizing a data tier 114. Such a roster may be updated from time to time as the addition, alteration, or removal of POS system components may be detected during interoperation of the EPMS 120 and the POS system 102.

Referring again to FIG. 22 at step 2240, having established an account for the new merchant customer including recording the payment management services, i.e., the service set, selected by and/or for the new merchant customer, and having auto-boarded the merchant's POS system(s) 102, the selected payment management services may be "turned-up", i.e., enabled to operate on EPMS 120. Turning up a given service may include but not be limited to configuring that service's operation based on the characteristics determined from the merchant's account information and/or characteristics of the merchant's POS system 102 as determined by auto-boarding and subsequent interoperation. Such "service configuration" information may be recorded, say in data tier 114, for ongoing utilization and potential update by EPMS 120.

At step 2250, having turned up the selected payment management services at EPMS 120, a series of one or more "validating" payment transactions (and perhaps other transactions as well) may be conducted by an operator 2101 utilizing POS input device 1022 (or virtually by POS system 102) so as to determine that the selected payment management services operate successfully. Such a series of transactions may be referred to as a "validating transaction script". For example, a validating transaction script 2105 may include but not be limited to: debit card transaction(s), credit card transaction(s), VEP transaction(s)(e.g., PayPal, Dwolla, etc.), purchase transaction(s), return transaction(s), payment reversal transaction(s), pre-authorization transaction(s). Other non-payment validating transactions may include but not be limited to: POS system sign-on(s) and sign-off(s), POS lane operator sign-on(s) and sign-off(s), privileged operator (e.g., manager) over-ride(s).

At step 2260, having validated POS system 102 interoperation with EPMS 120, operation of the selected payment services may be enabled thus allowing the new merchant customer to utilize the EPMS 120 in the course of the merchant's day-to-day commercial activities, which in turn may result in service fee revenues for the payment management service provider.

At step 2270, by recording information at each of the preceding steps of EAMB, a large set of data may be accumulated to establish a "base-line data set" for a new merchant customer. The base-line data set may include: statistics, choices, changes, errors, upgrades. POS system configuration(s), service configuration(s), archival payment transactions and many other items of information reflecting the new merchant's POS system interaction with EPMS 120 during EAMB. Such a base-line data set may be updated and augmented over time as the merchant utilizes the payment management services of EPMS 120 thus creating one or more "operational data set(s)". Base-line data sets and operational data sets may be compared and analyzed so as to determine opportunities to offer improved or additional services to merchants. They may also be used in comparative analyses performed by the analytics 116 servicer for risk assessments in support of underwriting additional new merchant customers. Such analytical information may also be shared—assuming appropriate care—with third parties.

Many additions and modifications are possible. In some embodiments, for example new merchant account information may be obtained utilizing an ATM or debit card swipe. Information such as routing number and account number may be absent from the card, but potentially may be obtained via a secure communication facility (not shown) with the card-issuing financial institution. Just as a PIN may be utilized to securely authorize a payment transaction; it may also authorize such a merchant customer account information transaction.

Additionally, in some embodiments, auto-boarding may also be utilized separate from merchant boarding so as to detect version level(s) and thusly support upgrades to an existing merchant customer's POS system 102, including but not limited to the addition of new POS system component(s).

VII. Additional Enhancements—Cost Altering Payment Services

Cost altering payment services ("CAPS") may enable merchants to potentially acquire additional information that may be processed so as to lessen costly payment errors and fraud.

Nominally, a potential level of risk may be ascribed to a given payment transaction based on the quality and quantity of "risk mitigating payment transaction information" included in the transaction's electronic payment information ("EP") received from a merchant's point of sale terminal system ("POS system"), which in turn may potentially be augmented from additional sources. Risk mitigating payment transaction information includes purchaser and POS terminal system identifying information and payment transaction describing information that may be utilized to limit fraud risk may be termed. Three types of risk mitigating payment transaction ("RMPT") information may help limit errors and fraud: "purchaser primary credential(s)"; "purchaser supplemental credential(s)"; and "payment incidental qualifier(s)". Taken together, purchaser primary credential(s) and purchaser supplemental credential(s) may at times be referred to as purchaser payment credential(s).

Purchaser primary credential(s) may identify the payment account and name a "legitimate payment account user" (i.e., the account owner or authorized account user), but may lack specific information to identify the purchaser as the named legitimate payment account user. A credit card, for example, may encode purchaser primary credentials including the primary account number, account owner's name and expiration date. With the increased use of credit cards on-line (where payment card information may be stolen virtually invisibly), the traditional reliance on the physical security of a payment card may increasingly fail as an impediment to payment fraud. Therefore, purchaser primary credential(s) may serve mostly in limiting errors as opposed to mitigating fraud.

As an augmentation to purchaser primary credential(s), purchaser supplemental credential(s) may validate the purchaser's authority to transact a payment by providing additional information that typically may be pre-associated with the payment account and/or legitimate payment account user, but commonly may be absent from any encoding electronically readable from a physical "payment implement" (e.g., payment card or payment facilitating device). Examples of purchaser supplemental credential(s) include but are not limited to: address verification service (AVS) information (e.g., billing zip code), PIN code, and payment account password. Purchaser supplemental credential(s) commonly comprise information known to the legitimate payment account user, but not easily known to a fraudster even if the payment implement may be in the fraudster's possession. In many instances, purchaser supplemental credential(s) may relate to the identity of the legitimate payment account user.

Purchaser supplemental credential(s) may be subject to compromise by fraudster tactics including eavesdropping and on-line gambits (e.g., 'phishing') whereby the legitimate payment account user may unwittingly divulge purchaser supplemental credential(s) to a fraudster. Therefore, relying on purchaser supplemental credential(s) that may be difficult to change if compromised (such as date of birth or billing zip code) may be less risk mitigating than utilizing readily changeable shared secrets such as a PIN or a password. The ability to migrate to more secure and more reliable and more easily revised purchaser supplemental credential(s) may depend in large measure on the ability to adapt POS systems to accept new and changing forms of supplemental credential(s). POS systems that operate as components of a distributed enhanced payment ("DEP") processing system may provide such an automated adaptable capability. Alternatively, POS systems may also be updated by POS developers, but such solutions may likely be piecemeal and may take significantly longer to deploy over the diverse range of POS systems.

Payment incidental qualifier(s) may provide information about the circumstances of a given payment transaction that may be indicative of the occurrence or absence of fraud. Payment incidental qualifiers may include any information measurable or derivable about the circumstances of a purchase. So for example, a payment card or other identification bearing a photograph of the legitimate payment account user may be presented by the purchaser. A POS system operator may in turn indicate via the POS system that the purchaser has been validated against that photograph. This may indicate the likelihood of the physical presence of the legitimate payment account user.

Incidental payment qualifier(s) included with a payment transaction may be combined with records of prior payment transactions in order to detect potential fraud. An incidental payment qualifier may describe something(s) about the circumstances of the purchase payment including but not limited to: the purchase (purchase location, item, quantity, etc.); the payment (payment implement, payment implement presence, payment amount, etc.); and the purchaser (geo-location, signature, sensor image, etc.). For example, the location of the POS system may serve as an indicator of unusual activity if that location may be substantially distant from the legitimate payment account user's typical areas of payment activity. As another example, a large payment attempt may be preceded by one or two smaller payment transactions in quick succession. These earlier purchases may be taken as potential 'dry runs' to be followed by an attempt at a large fraudulent purchase.

As payment becomes more virtualized, personal electronic devices such as smart phones may assume the role of virtual payment implements. In some mobile payment applications, a personal electronic device may transact payment with a POS terminal system or possibly even bypassing the POS terminal system. Additionally, payment transaction requests may increasingly be communicated over shared networks such as a LANs, intranet, or internet such that the bona fides of the communicating devices may not be reliably inferred from the communication connection or path utilized. Therefore, explicit device and system credentialing may be utilized increasingly to mitigate risk of fraud; and such credential(s) may be included as purchaser primary credential(s), purchaser supplemental credential(s); and/or derived from incidental payment qualifier(s) in payment transaction requests.

Payment processors and payment entities may utilize numerous algorithms to combine immediate incidental qualifier(s) and recorded payment transaction records in order to mitigate fraud risk. Communication technology such as GPS, Wi-Fi and cellular networks may enable near continuous tracking of the location of individual purchasers. The advent of small embeddable low power communication devices (e.g., NFC) may enable the tracking of purchasers, their payment implements, as well as many of their purchases. Additionally the growing governmental and private investment in security technologies such as ubiquitous public security video coverage, biometrics, as well as terrestrial, airborne and space-based tracking platforms may provide a very powerful and reliable means to track and instantaneously locate both purchasers and their payment implements. And of course, the growth of self reporting of location through social media and internet communication, and the explosive growth of civilian posting of audio recordings, snap shots and videos to third party web sites (often in near real-time) may provide a huge source of time-correlated location information. Such tracking information acquired by third party tracking enterprises may provide a growing source of incidental payment qualifiers that may be combined with incidental payment qualifier(s) acquired directly or indirectly from POS system(s). Incidental qualifiers may include coincidental information potentially related to but not necessarily directly incidental to the purchase payment. For example, the geo-location of the account owner's automobile at the time of the purchase payment.

The nominal classification of components of payment transaction related information into categories such as purchaser primary credential(s), purchaser supplemental credential(s), and payment incidental qualifier(s) may vary depending on the payment processor and/or payment entity for a given payment transaction. Regardless of the particulars of such classification, the quantity and quality of RMPT information included in a given payment transaction (or recorded or third-party RMPT information that may additionally be associated with the payment transaction) may serve to decrease the likelihood of error and fraud. Accordingly, payment processors and/or payment entities may provide more favorable payment transaction rates in exchange for increased quantity and/or quality of such RMPT information. Such lowered costs may potentially be shared with the merchant customer in exchange for providing such additional RMPT information and may thereby alter payment transaction costs.

A base-line (i.e., essential minimum) amount of RMPT information may be required for processing a given payment transaction. Such "base-line RMPT information" may for example include required purchaser primary credential(s) such as: a payment account number, a corresponding legitimate account user's name, and a corresponding expiration date. Base-line RMPT information may vary from payment transaction to payment transaction based on other characteristics of a given payment transaction—perhaps requiring differing purchaser supplemental credential(s) and/or payment incidental qualifier(s). For instance, processing a credit card payment transaction may additionally require a billing address zip code; whereas processing a debit card payment transaction may additionally require a PIN.

In some embodiments, a received payment transaction request that lacks the required base-line RMPT information may be declined. In other embodiments, a response may be provided, back to the POS system to notify the POS system of missing base-line RMPT information.

RMPT information in excess of the base-line may be termed "additional RMPT information". In some embodiments, additional RMPT information may be read automatically from a payment implement. However, in some embodiments, additional RMPT information may be acquired facilitated by a prompt, which may for example be displayed by the POS system or spoken by the POS system operator. And in some embodiments, some additional RMPT information for a given payment transaction may be read automatically while other additional RMPT information for the same transaction may be acquired utilizing a prompt to the POS system operator, the purchaser, or both.

To facilitate discussion. FIG. 28 shows an exemplary structural block diagram of a CAPS system 2800, which in some embodiments may facilitate a given merchant customer (not shown) to provide additional RMPT information 2805 (for example acquired from or ascertained about purchaser 101) so as to potentially obtain altered payment transaction cost(s). The relative difference between the payment management service provider's transaction costs and the payment transaction costs charged to the merchant may be viewed as a form of arbitrage. In some embodiments, such payment transaction cost arbitrage may be included as part of the arbitraged enhanced payment services provided by a payment arbitraging servicer 1640. (Note: to avoid excess verbiage, descriptions of POS system 102 and/or communication facility 1081 apply equally to POS system 1610 and/or communication facility 1625 respectively, unless stated explicitly otherwise. The term "merchant" may refer to a merchant customer of a payment management service provider and/or to intermediaries or agent(s) of such a merchant acting on the merchant's behalf. A merchant agent may for example be a POS developer, a POS vendor, or an independent sales organization ("ISO"). For brevity, the term "transaction cost" may be used interchangeably with payment transaction cost.)

FIG. 29 depicts some embodiments of a CAPS system. At step 2910, an enhanced payment management system ("EPMS") 120 of a payment management service provider may receive additional RMPT information.

FIG. 30 details some embodiments of step 2910 of FIG. 29. At step 3010, a EPMS 120 may facilitate acquisition of additional RMPT information.

In other embodiments, the EPMS may provide additional RMPT information-based payment transaction cost altering automatically. This may be more 'POS developer friendly'—particularly for more primitive POS terminals—by limiting the POS system's added functionality to the acquiring and providing of additional RMPT information without the additional need to specifically support or coordinate corresponding payment management service(s). Such embodiments may allow basic and generic POS systems 102 to intemperate with a CAPS system 2800.

FIG. 31 further details some embodiments of step 3010. At step 3110, "cost profiles" may be provided that may assist the merchant in considering the transaction costs associated with payment management services selected for the merchant (i.e., "the service set"). The cost to the merchant of utilizing a given service set may be transaction dependent. Fees may be accrued on a service(s)-per-transaction basis and may vary based on the characteristics of the corresponding transactions. The multi-transaction cumulative cost to the merchant may result from a blend of payment transactions processed and the corresponding fees for the services applied, i.e., the "blended cost". As an example, blended cost may be computed by averaging numerous transaction fees over the count of corresponding transactions. So for example, blended cost may be calculated as the average service fee per transaction over say a three month time frame. The time frame for such a calculation may be shortened or lengthened depending on desired determination of correspondingly shorter or longer term cost trends, histories and/or projections. By way of analogy, one may think of the charts produced on a financial web site where the yield (cumulative loss/gain plus blended costs) of a mutual fund may be viewed utilizing various timeframes. A cost profile may be devised in a multiplicity of ways so as to represent costs in such ways as to provide insight into those costs, including but not limited to history, composition and/or event correlation.

It may be a complex task to project the future costs corresponding to a service set. As may be the case with the above mutual fund yield graphing analogy, having an index (or indices) to compare against may be desirable. A payment management service provider may have a multi-year data store of processed payment transaction records and corresponding fees for a multiplicity of merchants. Such a data store may be processed to compute cost index(s) based on blended costs derived from various subsets of stored transactions. So for example, the EPMS 120 may compute a 1-year 'Chinese take-out restaurant cost index' so that the merchant who owns a Chinese take-out restaurant may get some idea of what competitors pay in costs. Such an "industry segment cost index" (or several cost indices) may in turn be utilized in estimating a cost target, which may serve as an approximate cost goal as the merchant considers various possible alternative service sets.

At step 3120, having considered various cost profile(s) and/or cost index(s) characterizing the potential cost of the existing service set, the merchant may utilize EPMS 120 via the account servicer 2110 to consider the potential cost benefit of an alternative "contingent service set". Such a contingent service set, if selected, may potentially cause the EPMS 120 to utilize greater or lesser quantities of RMPT information (as available) for the processing of a given payment transaction which may in turn alter the payment transaction cost. To assist the merchant in considering the potential cost benefit of a given contingent service set, the EPMS 120 may provide corresponding "projected cost profile(s)" based on projected transaction costs for that contingent service set. The account servicer 2110 of EPMS 120 may be utilized by the merchant to repeatedly revise and consider contingent service sets so as to facilitate selecting the contingent service set (or retaining the merchant's current service set). As part of the process of merchant boarding, in some embodiments, the merchant may consider one or more contingent service sets so as to select the service set. In some embodiments, subsequent to merchant boarding, the merchant may consider one or more contingent service sets so as to select a new service set or retain the service set.

A cost index derived from blended costs may be decomposed so as to display the constituent fee components and the corresponding services. In other words, a service set may be profiled in such a way as to characterize the nominally 'typical' set of payment management services corresponding to a given cost index. Such a service set decomposing cost profile may be compared against the merchant's current service set cost profile, which may be similarly decomposed. In one embodiment, such a service set decomposing cost profile may be represented as a pie chart wherein the different pie slivers represent services and the volume of a sliver represents the corresponding 'normalized' fee cost. A multiplicity of techniques for normalization may be applied (e.g., mean, median, weighted average, etc.).

Providing cost indices may be particularly useful to a new merchant customer. Unfortunately, the typical new merchant customer may not have an established transaction cost history with their newly selected payment management service provider. However, any archival payment transaction records (i.e., records of transactions with other payment management service provider(s)) of that merchant received by the EPMS 120 may be utilized to synthesize "virtual fee history" for that merchant—as if, hypothetically, the merchant had processed those archival payment transactions with the newly selected payment management service provider utilizing the service set. Such a virtual fee history may then be further analyzed and represented utilizing cost profiles, which may be further compared against various cost indices as described above.

FIG. 32 provides an exemplary screen shot of a cost profile provided in a pie chart format, which may represent the transaction costs corresponding to a merchant such as a restaurant owner. Cost profiles may characterize archival, recorded and/or potential transaction costs utilizing a multiplicity of representations. Some representations, for example FIG. 32, may include components of transaction costs that may be attributable to factors other than RMPT information. A broader understanding of the components of transaction costs may help the merchant further revise the service set to alter transaction costs. In some embodiments, transaction costs may be represented in a cost profile as a statistical distribution of characteristics of numerous payment transactions with each represented cost-contributing characteristic having a frequency represented by a percentage. It may be possible that multiple characteristics apply to a given payment transaction; therefore the sum of percentages may nominally exceed 100%. However, by totaling occurrence percentage figures and dividing 100 by that total, a normalizing factor may be computed and applied to the percentages used to create the pie chart such that they total to 100%.

FIG. 33 provides an exemplary screen shot of a comparative cost profile provided in a bar chart format, which may represent the blended transaction costs of the service set of a merchant such as a Chinese take-out restaurant owner. The comparative cost profile may facilitate the comparison of potential transaction costs corresponding to an industry segment typical service set, the service set (i.e., the current operational service set), and a contingent service set.

Referring again to FIG. 31 at step 3130, the EPMS 120 via account servicer 2110 may facilitate the confirmation of the service set (either contingent or current operational) selected by the merchant to be utilized by EPMS 120 to provide payment management services.

The acquisition and communication of additional RMPT information in a given payment transaction request may be a distributed process potentially involving the POS system operator (not shown), POS system 102, communication intermediary(s) (e.g., ISO feeder system 1620), and the EPMS 120. As a consequence, revising the service set in and of itself may not be sufficient to result in actually acquiring additional RMPT information to be utilized by the EPMS 120 in effecting processing of a given payment transaction. For example, an additional item of RMPT information may be the purchaser's driver license number ("DLN"). Typically, a DLN may not be encoded into a payment implement; therefore some level of POS system operator involvement may be required to separately acquire the DLN. So, in an example of a successful transaction, a chain of events may occur: the POS system 102 inputting the DLN (perhaps keyed in by the POS operator) and encoding the DLN in the EPI of a corresponding payment transaction request; the encoded EPI being interoperable with any communication intermediaries such that they may forward the EPI-encoded DLN without adulterating it or filtering it out; and the EPMS 120 including the DLN as part of the payment transaction request utilized to effectuate payment processing. In order to facilitate such a chain of events, in some embodiments, the EPMS 120 may generate and propagate information (i.e., "transaction guidance") that may potentially facilitate the subsequent acquisition of RMPT information that may be utilized by a given service set.

At step 3140, having received confirmation of the service set, EPMS 120 may provide transaction guidance for utilization by POS system 102. The transaction guidance may include but not be limited to information that indicates additional RMPT information that may be included in payment transactions by the POS system so as to potentially result in altered transaction costs. Transaction guidance may also be utilized by communication intermediaries such as ISO feeder system 1620 so as to facilitate communication of RMPT information from POS system 102 to EPMS 120. Transaction guidance may vary depending on the service set selected and the corresponding additional RMPT information that service set may support.

Furthermore, transaction guidance may be propagated in numerous ways. For example, the payment management service provider, may utilize the facilities of the EPMS 120 within a DEP processing system to propagate down-loadable technology to a DEP-compatible POS system 102 so as to facilitate the inputting and encoding of additional RMPT information. Additionally, the payment management service provider may propagate risk mitigating information acquisition technology "out of band", i.e., separate from the facilities of a DEP processing system, to POS developers and vendors and to communication intermediaries such as ISOs—for example in the form of source code software and API documentation.

Returning to FIG. 30 at step 3020, having facilitated the acquisition of additional RMPT information utilizing for example transaction guidance, the EPMS 120, in accordance with the service set, may utilize such additional RMPT information included in a payment transaction request to effectuate payment processing. In some embodiments, additional RMPT information may be included in a single payment transaction request received from the POS system 102. In other embodiments, additional RMPT information may be included in a series of two or more associated payment transaction requests received from the POS system 102. In some embodiments, additional RMPT information acquired from the POS system 102 may be augmented by additional RMPT information provided by and/or aggregated by the EPMS 120. EPMS 120 may include additional RMPT information sourced from a third party, for example geo-location information from a cell phone provider.

For some payment transactions, the POS 102 may attempt but be unable to provide additional RMPT information. However, the inclusion of the required base-line RMPT information may be sufficient for the EPMS 120 to effectuate processing of the payment transaction.

Returning to FIG. 29 at step 2920, the EPMS 120 may alter the payment transaction cost based on additional RMPT information received from the POS 102.

FIG. 34 further details some embodiments of step 2920. At step 3410, having effectuated payment processing of a payment transaction request that may include additional RMPT information, the EPMS 120 may derive a transaction cost delta based on the additional RMPT information received from the POS 102, so as to alter the transaction cost based on such additional RMPT information. In some embodiments, the EPMS 120 may alter the transaction costs corresponding to more than one payment transaction such that the alteration may not be specifically attributable to the characteristics of an individual payment transaction. For example, providing additional RMPT information may result in altered costs of payment transaction processing for the payment management service provider such that the payment management service provider may alter the merchant's transaction costs in aggregate, perhaps in the form of a block discount. In some embodiments, the altered payment transaction cost may be based on numerous factors including but not limited to: the additional RMPT information included in a given payment transaction; the aggregate quantity and/or quality of additional RMPT information included in multiple payment transactions from the merchant; the proportion of payment transactions including additional RMPT information (versus those with base-line RMPT information); the measured change in transaction costs for the payment management service provider. Additionally, in some embodiments, the payment management service provider may alter payment transaction costs to a given merchant based on the aggregate performance of multiple merchant customers. In some embodiments, the payment management service provider may initially provide an additional "bonus cost delta" so as to enhance the motivating effect on the merchant of altering payment transaction costs. Such an additional bonus cost delta may possibly diminish with subsequent payment transactions so as to taper off and possibly end.

At step 3420, the EPMS 120 may provide transaction cost information to the POS system 102. In some embodiments, the EPMS 120 may include transaction cost information in some or all transaction responses to the POS system 102. For example, a payment transaction response may include transaction cost information specific to the corresponding transaction. In another example, a payment transaction response may include transaction cost information that corresponds to more than one of the merchant's payment transactions perhaps in the form of a cost average. Additionally, a payment transaction response may also include transaction cost information derived from the payment transactions of other merchants. In some embodiments, the transaction cost information included in transaction responses may be utilized by a communication intermediary such as ISO feeder system 1620 and/or by POS system 102 to record, analyze and provide accumulated cost information to the merchant.

In some embodiments, the POS system 102 as part of a DEP processing system may receive down-loadable technology from the EPMS 120 such that the POS system 102 may display cost profiles to the merchant utilizing transaction cost information recorded at the POS or provided from the EPMS or both. Furthermore, the POS system 102 via account servicer 2110 of EPMS 120 may facilitate reviewing, revising and updating of the merchant's service set during or subsequent to merchant boarding. A merchant intermediary such as a POS developer may aggregate transaction cost information corresponding to multiple merchants in order to analyze transaction cost trends.

Additionally, in some embodiments, the POS system 102 as part of a DEP processing system may receive down-loadable transaction guidance technology from the EPMS 120 that may be utilized in relation to transaction information in addition to, or other than, additional RMPT information.

Furthermore, in some embodiments, a CAPS system may provide transaction cost analysis and/or service set revision and review facilities related to components of the merchant's transaction costs other than additional RMPT information.

In some embodiments, the merchant may utilize a terminal device other than a POS terminal system, such as a PC connected via the internet, to access and utilize facilities provided by the account servicer 2110 of EPMS 120 for example, service set review and revision facilities; or transaction cost analysis.

In sum, the present invention provides systems and methods for cost altering payment services (CAPS). Such systems and methods enable the altering of payment transaction costs based on receiving additional risk mitigating payment transaction (RMPT) information from POS terminal systems. Such systems and methods may include facilities: enabling the merchant to review and alter the service set so as to effectuate processing of payment transactions including additional risk mitigating transaction information so as to alter payment transaction costs; providing transaction guidance that may facilitate the acquisition of additional RMPT information via the POS terminal system; and providing information to POS terminal systems describing transaction costs including altered transaction cost(s).

While this invention has been described in terms of several embodiments, there are alterations, modifications, permutations, and substitute equivalents, which fall within the scope of this invention.

It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. A method for enhancing security of an electronic transaction, the method comprising:
   collecting, by a point of sale terminal system, sensitive information pertaining to the electronic transaction according to parameters of a service set chosen by a merchant of the point of sale terminal system, wherein the collecting comprises: receiving, in response to a prompt by the point of sale terminal system for one or more predetermined types of security information as dictated by transaction guidance, the one or more predetermined types of security information;
   encrypting the sensitive information at reader head of the point of sale terminal system utilizing an encryption protocol comprising one or more of: a merchant ID, a transaction amount, and a password;
   transmitting, by the point of sale terminal system, the encrypted sensitive information to a payment service associated with the tokenization and payment management system;
   conducting, by the payment service, an encryption check on the encrypted sensitive information;
   decrypting, by the tokenization and payment management system, the encrypted sensitive information, wherein the decrypting comprises:
      transferring, from the payment service, the encrypted sensitive information to a tokenizer encryption service;
      validating, using the tokenizer encryption service, at least one credential and at least one key for the encrypted sensitive information, wherein the validating comprises utilizing a data tier populated by analytics;
      transferring, from the tokenizer encryption service, the validated encrypted sensitive information to a hardware security module; and
      decrypting, using the hardware security module, the validated encrypted sensitive information;
   tokenizing, by the tokenization and payment management system, the decrypted sensitive information to produce a token, wherein the token comprises a primary account number (PAN), a group ID (GID), a token expiration date, and a payment card expiration date, wherein the token expiration date is variable and is dependent upon a predetermined token designation, wherein the predetermined token designation is one of: a single use token or a recurring token;
   encrypting, by the tokenization and payment management system, the tokenized information including at least the PAN and the group ID;
   transmitting, by the tokenization and payment management system, the encrypted tokenized information to the payment service;
   transmitting, from the payment service, clear text associated with the encrypted tokenized information to a payment system;
   receiving, by the point of sale terminal system, the encrypted tokenized information and a transaction authorization response from the payment system, wherein the encrypted tokenized information is stored in a local database;

receiving, at the tokenization and payment management system, an indication of another electronic transaction associated with another merchant;

determining whether another merchant ID associated with the another merchant is present in the data tier and is correlated with the GID; and accessing, by the tokenization and payment management system and from the local database, the encrypted tokenized information for processing of the another electronic transaction upon determining that the another merchant ID is correlated with the GID.

2. The method of claim 1, further comprising:

determining, via the tokenization and payment management system, configuration information of a user to the electronic transaction to perform a tokenization, wherein the electronic transaction is routed to a tokenization logic upon determining a match between the configuration information of the user and a token indicator.

3. The method of claim 2, further comprising:

assigning a group identification information to one or more users of the electronic transaction, wherein the group identification information is assigned to accounts of the one or more users, included in identification information of each of the one or more users, or a combination thereof;

storing, by a data tier system, the group identification information and correlating the group identification information to the configuration information of the user; and authorizing, by the tokenization and payment management system, the one or more users for utilizing the encrypted tokenized information upon determining a match between the group identification information and the configuration information of the user.

4. The method of claim 1, further comprising:

generating, by a payment management system, transaction guidance for utilization by the point of sale terminal system, wherein the transaction guidance includes risk mitigating payment transaction information for altering cost related information of the electronic transaction, and wherein the transaction guidance varies based upon service selected by a user.

5. The method of claim 4, wherein the risk mitigating payment transaction information includes at least one of: primary credential information to identify account information, supplemental credential information to validate the user by providing additional information pre-associated with the account information, or a payment incidental qualifier to indicate an occurrence of a fraud by providing information on circumstances during a payment transaction.

6. The method of claim 1, wherein the electronic transaction includes update information for the encrypted tokenized information, further comprising:

updating the encrypted tokenized information based upon a schedule, a user request, or an expiration date, wherein the update includes replacing the encrypted tokenized information with a new encrypted tokenized information, and wherein the new encrypted tokenized information accompanies the transaction authorization response.

7. The method of claim 1, further comprising:

recording, by a payment management system, at least one biometric measurement of the user at the point of sale terminal system to authorize a user for the electronic transaction, wherein the at least one biometric measurement includes fingerprint scanning, retinal scanning, facial recognition, vocal recognition, speech pattern recognition, or a combination thereof; and authenticating, by the payment management system, the user for the electronic transaction upon matching the at least one biometric measurement with stored biometric information of the user.

8. The method of claim 7, wherein the at least one biometric measurement is encrypted during recording at a reader head of the point of sale terminal system, and wherein an end to end encryption is utilized to securely communicate the at least one biometric measurement.

9. A system for enhancing security of an electronic transaction, the system comprising:

one or more processors; and a storage device storing instructions which, when executed by the one or more processors, cause the one or more processors to perform operations comprising:

collecting, by a point of sale terminal system, sensitive information pertaining to the electronic transaction according to parameters of a service set chosen by a merchant of the point of sale terminal system, wherein the collecting comprises: receiving, in response to a prompt by the point of sale terminal system for one or more predetermined types of security information as dictated by transaction guidance, the one or more predetermined types of security information;

encrypting the sensitive information at reader head of the point of sale terminal system utilizing an encryption protocol comprising one or more of: a merchant ID, a transaction amount, and a password;

transmitting, by the point of sale terminal system, the encrypted sensitive information to a payment service associated with the tokenization and payment management system;

conducting, by the payment service, an encryption check on the encrypted sensitive information;

decrypting, by the tokenization and payment management system, the encrypted sensitive information, wherein the decrypting comprises:

transferring, from the payment service, the encrypted sensitive information to a tokenizer encryption service;

validating, using the tokenizer encryption service, at least one credential and at least one key for the encrypted sensitive information, wherein the validating comprises utilizing a data tier populated by analytics;

transferring, from the tokenizer encryption service, the validated encrypted sensitive information to a hardware security module; and decrypting, using the hardware security module, the validated encrypted sensitive information;

tokenizing, by the tokenization and payment management system, the decrypted sensitive information to produce a token, wherein the token comprises a primary account number (PAN), a group ID (GID), a token expiration date, and a payment card expiration date, wherein the token expiration date is variable and is dependent upon a predetermined token designation, wherein the predetermined token designation is one of: a single use token or a recurring token;

encrypting, by the tokenization and payment management system, the tokenized information including at least the PAN and the group ID;

transmitting, by the tokenization and payment management system, the encrypted tokenized information to the payment service;
transmitting, from the payment service, clear text associated with the encrypted tokenized information to a payment system;
receiving, by the point of sale terminal system, the encrypted tokenized information and a transaction authorization response from the payment system, wherein the encrypted tokenized information is stored in a local database;
receiving, at the tokenization and payment management system, an indication of another electronic transaction associated with another merchant;
determining whether another merchant ID associated with the another merchant is present in the data tier and is correlated with the GID; and
accessing, by the tokenization and payment management system and from the local database, the encrypted tokenized information for processing of the another electronic transaction upon determining that the another merchant ID is correlated with the GID.

10. The system of claim 9, the operations further comprising:
determining, via the tokenization and payment management system, configuration information of a user to the electronic transaction to perform a tokenization, wherein the electronic transaction is routed to a tokenization logic upon determining a match between the configuration information of the user and a token indicator.

11. The system of claim 10, the operations further comprising:
assigning a group identification information to one or more users of the electronic transaction, wherein the group identification information is assigned to accounts of the one or more users, included in identification information of each of the one or more users, or a combination thereof;
storing, by a data tier system, the group identification information and correlating the group identification information to the configuration information of the user; and
authorizing, by the tokenization and payment management system, the one or more users for utilizing the encrypted tokenized information upon determining a match between the group identification information and the configuration information of the user.

12. The system of claim 9, the operations further comprising:
generating, by a payment management system, transaction guidance for utilization by the point of sale terminal system,
wherein the transaction guidance includes risk mitigating payment transaction information for altering cost related information of the electronic transaction, and wherein the transaction guidance varies based upon service selected by a user.

13. The system of claim 12, wherein the risk mitigating payment transaction information includes at least one of: primary credential information to identify account information, supplemental credential information to validate the user by providing additional information pre-associated with the account information, or a payment incidental qualifier to indicate an occurrence of a fraud by providing information on circumstances during a payment transaction.

14. The system of claim 9, wherein the electronic transaction includes update information for the encrypted tokenized information, the operations further comprising:
updating the encrypted tokenized information based upon a schedule, a user request, or an expiration date, wherein the update includes replacing the encrypted tokenized information with a new encrypted tokenized information, and wherein the new encrypted tokenized information accompanies the transaction authorization response.

15. The system of claim 9, the operations further comprising:
recording, by a payment management system, at least one biometric measurement of the user at the point of sale terminal system to authorize a user for the electronic transaction, wherein the at least one biometric measurement include fingerprint scanning, retinal scanning, facial recognition, vocal recognition, speech pattern recognition, or a combination thereof; and
authenticating, by the payment management system, the user for the electronic transaction upon matching the at least one biometric measurement with stored biometric information of the user.

16. The system of claim 15, wherein the at least one biometric measurement is encrypted during recording at a reader head of the point of sale terminal system, and wherein an end to end encryption is utilized to securely communicate the at least one biometric measurement.

17. A non-transitory computer readable medium for enhancing security of an electronic transaction, the non-transitory computer readable medium storing instructions which, when executed by one or more processors, cause the one or more processors to perform operations comprising:
collecting, by a point of sale terminal system, sensitive information pertaining to the electronic transaction according to parameters of a service set chosen by a merchant of the point of sale terminal system, wherein the collecting comprises: receiving, in response to a prompt by the point of sale terminal system for one or more predetermined types of security information as dictated by transaction guidance, the one or more predetermined types of security information;
encrypting the sensitive information at reader head of the point of sale terminal system utilizing an encryption protocol comprising one or more of: a merchant ID, a transaction amount, and a password;
transmitting, by the point of sale terminal system, the encrypted sensitive information to a payment service associated with the tokenization and payment management system;
conducting, by the payment service, an encryption check on the encrypted sensitive information;
decrypting, by the tokenization and payment management system, the encrypted sensitive information, wherein the decrypting comprises:
transferring, from the payment service, the encrypted sensitive information to a tokenizer encryption service;
validating, using the tokenizer encryption service, at least one credential and at least one key for the encrypted sensitive information, wherein the validating comprises utilizing a data tier populated by analytics;
transferring, from the tokenizer encryption service, the validated encrypted sensitive information to a hardware security module; and decrypting, using the hardware security module, the validated encrypted sensitive information;

tokenizing, by the tokenization and payment management system, the decrypted sensitive information to produce a token, wherein the token comprises a primary account number (PAN), a group ID (GID), a token expiration date, and a payment card expiration date, wherein the token expiration date is variable and is dependent upon a predetermined token designation, wherein the predetermined token designation is one of: a single use token or a recurring token;

encrypting, by the tokenization and payment management system, the tokenized information including at least the PAN and the group ID;

transmitting, by the tokenization and payment management system, the encrypted tokenized information to the payment service;

transmitting, from the payment service, clear text associated with the encrypted tokenized information to a payment system;

receiving, by the point of sale terminal system, the encrypted tokenized information and a transaction authorization response from the payment system, wherein the encrypted tokenized information is stored in a local database;

receiving, at the tokenization and payment management system, an indication of another electronic transaction associated with another merchant;

determining whether another merchant ID associated with the another merchant is present in the data tier and is correlated with the GID; and accessing, by the tokenization and payment management system and from the local database, the encrypted tokenized information for processing of the another electronic transaction upon determining that the another merchant ID is correlated with the GID.

18. The non-transitory computer readable medium of claim 17, the operations further comprising:

determining, via the tokenization and payment management system, configuration information of a user to the electronic transaction to perform a tokenization, wherein the electronic transaction is routed to a tokenization logic upon determining a match between the configuration information of the user and a token indicator.

19. The non-transitory computer readable medium of claim 18, the operations further comprising:

assigning a group identification information to one or more users of the electronic transaction, wherein the group identification information is assigned to accounts of the one or more users, included in identification information of each of the one or more users, or a combination thereof;

storing, by a data tier system, the group identification information and correlating the group identification information to the configuration information of the user; and authorizing, by the tokenization and payment management system, the one or more users for utilizing the encrypted tokenized information upon determining a match between the group identification information and the configuration information of the user.

20. The non-transitory computer readable medium of claim 17, the operations further comprising:

generating, by a payment management system, transaction guidance for utilization by the point of sale terminal system, wherein the transaction guidance includes risk mitigating payment transaction information for altering cost related information of the electronic transaction, and wherein the transaction guidance varies based upon service selected by a user.

* * * * *